(12) United States Patent
Dou et al.

(10) Patent No.: US 10,560,132 B2
(45) Date of Patent: Feb. 11, 2020

(54) RECONFIGURABLE TRANSMITTER AND RECEIVER, AND METHODS FOR RECONFIGURING

(71) Applicant: Huawei Technologies Co., Ltd., Shenzhen (CN)

(72) Inventors: Yunfu Dou, Chengdu (CN); Tingjian Tian, Chengdu (CN); Yanqing Zhao, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 124 days.

(21) Appl. No.: 15/369,532

(22) Filed: Dec. 5, 2016

(65) Prior Publication Data
US 2017/0085281 A1 Mar. 23, 2017

Related U.S. Application Data

(63) Continuation of application No. PCT/CN2014/079270, filed on Jun. 5, 2014.

(51) Int. Cl.
*H04B 1/04* (2006.01)
*H04B 17/13* (2015.01)
*H04W 88/08* (2009.01)

(52) U.S. Cl.
CPC ........... *H04B 1/0475* (2013.01); *H04B 17/13* (2015.01); *H04W 88/085* (2013.01)

(58) Field of Classification Search
CPC .............. H04B 1/04; H04B 2001/0408; H04B 2001/045; H04B 2001/0425; H04B 1/48;
(Continued)

(56) References Cited

U.S. PATENT DOCUMENTS

| | | | | |
|---|---|---|---|---|
| 6,539,052 B1 * | 3/2003 | Hessel | ................... | H03G 3/345 370/505 |
| 2011/0151819 A1 * | 6/2011 | Dickey | ................. | H04B 15/02 455/310 |

(Continued)

FOREIGN PATENT DOCUMENTS

| | | |
|---|---|---|
| CA | 2306835 A1 | 5/1999 |
| CN | 101257482 A | 9/2008 |

(Continued)

*Primary Examiner* — David C Payne
*Assistant Examiner* — Sarah Hassan
(74) *Attorney, Agent, or Firm* — Leydig, Voit & Mayer, Ltd.

(57) ABSTRACT

The present application discloses a reconfigurable transmitter and receiver, and methods for reconfiguring the same. A system adaptive control circuit generates a control signal according to frequency band information of an input signal; a system clock circuit generates a system clock; a preprocessing circuit preprocesses a received baseband signal according to the system clock and the control signal, to generate a frequency band signal; a digital intermediate frequency processing circuit processes the frequency band signal according to the system clock and the control signal, to generate a digital intermediate frequency signal; a digital-to-analog conversion circuit processes the digital intermediate frequency signal according to the system clock and the control signal, to generate an analog signal; and an analog transmitting circuit transmits the analog signal.

8 Claims, 39 Drawing Sheets

(58) Field of Classification Search
CPC .......... H04B 2001/0491; H04B 7/0617; H04B 1/0057; H04B 17/11; H04B 17/12; H04B 17/13; H04B 1/0003; H04B 1/0007; H04B 1/0017
USPC .......................................... 375/297; 370/311
See application file for complete search history.

(56) References Cited

U.S. PATENT DOCUMENTS

| | | | | |
|---|---|---|---|---|
| 2012/0306558 A1* | 12/2012 | Singvall | ................ | H03K 3/02 327/298 |
| 2014/0301498 A1* | 10/2014 | Rimini | .................... | H04B 1/12 375/285 |

FOREIGN PATENT DOCUMENTS

| | | | |
|---|---|---|---|
| CN | 201260165 Y | 6/2009 | |
| CN | 102098063 A | 6/2011 | |

* cited by examiner

RECONFIGURABLE TRANSMITTER AND RECEIVER, AND METHODS FOR RECONFIGURING

CROSS-REFERENCE TO RELATED APPLICATIONS

This application is a continuation of International Application No. PCT/CN2014/079270, filed on Jun. 5, 2014, the disclosure of which is hereby incorporated by reference in its entirety.

TECHNICAL FIELD

The present application relates to the communications field, and in particular, to a reconfigurable transmitter and receiver, and methods for reconfiguring.

BACKGROUND

As a radio frequency technology gradually matures, device costs are decreasing, and analog devices such as power amplifiers and digital-to-analog converters continuously develop towards a direction of broadband, digitization of an analog part of a radio remote unit (RRU) and support for ultra-wideband, multiple bands, and multiple standards are becoming mainstream development trends. To adapt to these trends, a digital intermediate frequency processing function of a transceiver is increasingly complex, so as to replace some analog processing functions and satisfy processing requirements of ultra-wideband, multiple bands, and multiple standards. An existing transceiver is generally configured according to a maximum digital intermediate frequency processing rate required by a system, to support a change in a bandwidth, a quantity of frequency bands, and a standard of a processed signal. This method is simple and easy, but has some problems, that is, regardless of a standard, a bandwidth, and a quantity of frequency bands that are of an input signal, the transceiver always maintains a relatively high digital intermediate frequency processing rate, which definitely causes increases in a delay and power consumption of the RRU and a hardware resource waste in a scenario of a narrowband or a relatively small quantity of frequency bands.

SUMMARY

In view of this, embodiments of the present invention provide a reconfigurable transmitter and receiver, and methods for reconfiguring same, so as to effectively reduce a digital intermediate frequency processing rate, reduce a system delay, and save resources while ensuring processing performance.

A first aspect provides a reconfigurable transmitter, including: a system adaptive control circuit, configured to generate a control signal according to frequency band information of an input signal, where the control signal includes configuration information required for reconfiguring the transmitter; a system clock circuit, configured to generate a system clock according to the control signal generated by the system adaptive control circuit; a preprocessing circuit, configured to preprocess a received baseband signal according to the system clock and the control signal, to generate a frequency band signal; a digital intermediate frequency processing circuit, configured to process, according to the system clock and the control signal, the frequency band signal generated by the preprocessing circuit, to generate a digital intermediate frequency signal; a digital-to-analog conversion circuit, configured to process, according to the system clock and the control signal, the digital intermediate frequency signal generated by the digital intermediate frequency processing circuit, to generate an analog signal; and an analog transmitting circuit, configured to transmit the analog signal generated by the digital-to-analog conversion circuit.

With reference to the first aspect, in a first possible implementation manner, the configuration information required for reconfiguring the transmitter includes at least one of the following:
 the system clock; or
 a digital intermediate frequency processing rate; or
 a digital-to-analog conversion sampling rate; or
 an analog-to-digital conversion sampling rate.

With reference to the implementation manner of the first aspect, in a second possible implementation manner, the transmitter further includes a feedback analog-to-digital conversion circuit, configured to process a fed-back analog signal according to the system clock and the control signal, to generate a digital intermediate frequency signal.

With reference to the second possible implementation manner of the first aspect, in a third possible implementation manner, the digital intermediate frequency processing circuit includes a digital predistortion coefficient training circuit, configured to: perform, according to the system clock and the control signal, digital predistortion coefficient training on the digital intermediate frequency signal generated by the feedback analog-to-digital conversion circuit, to generate a digital predistortion coefficient.

With reference to the third possible implementation manner of the first aspect, in a fourth possible implementation manner, the digital intermediate frequency processing circuit further includes a digital predistortion circuit, configured to: perform, according to the system clock, the control signal, and the digital predistortion coefficient, digital predistortion processing on the frequency band signal generated by the preprocessing circuit, to generate a digital intermediate frequency signal.

With reference to the implementation manner of the first aspect, in a fifth possible implementation manner, if the frequency band information of the input signal includes frequency band information of at least two frequency bands, the system adaptive control circuit separately generates configuration information according to the frequency band information of the at least two frequency bands.

With reference to the fifth possible implementation manner of the first aspect, in a sixth possible implementation manner, if the system adaptive control circuit separately generates different configuration information according to the frequency band information of at least two frequency bands, the preprocessing circuit is further configured to: generate, according to a system clock corresponding to any baseband signal of the at least two baseband signals and according to a control signal corresponding to any baseband signal of the at least two baseband signals, a frequency band signal corresponding to the any baseband signal.

A second aspect provides a method for reconfiguring a transmitter, including: generating a control signal according to frequency band information of an input signal, where the control signal includes configuration information required for reconfiguring the transmitter; generating a system clock according to the control signal; preprocessing a received baseband signal according to the system clock and the control signal, to generate a frequency band signal; processing the frequency band signal according to the system clock and the control signal, to generate a digital intermediate frequency signal; processing the digital intermediate frequency signal according to the system clock and the control signal, to generate an analog signal; and transmitting the analog signal.

With reference to the implementation manner of the second aspect, in a first possible implementation manner, the configuration information required for reconfiguring the transmitter includes at least one of the following:
the system clock; or
a digital intermediate frequency processing rate; or
a digital-to-analog conversion sampling rate; or
an analog-to-digital conversion sampling rate.

With reference to the implementation manner of the second aspect, in a second possible implementation manner, the method further includes: processing a fed-back analog signal according to the system clock and the control signal, to generate a digital intermediate frequency signal.

With reference to the second possible implementation manner of the second aspect, in a third possible implementation manner, the method further includes: performing digital predistortion coefficient training on the digital intermediate frequency signal according to the system clock and the control signal, to generate a digital predistortion coefficient.

With reference to the third possible implementation manner of the second aspect, in a fourth possible implementation manner, the step of processing the frequency band signal according to the system clock and the control signal, to generate a digital intermediate frequency signal includes: performing digital predistortion processing on the frequency band signal according to the system clock, the control signal, and the digital predistortion coefficient, to generate a digital intermediate frequency signal.

With reference to the implementation manner of the second aspect, in a fifth possible implementation manner, if the frequency band information of the input signal includes frequency band information of at least two frequency bands, the step of generating a control signal according to frequency band information of an input signal includes: separately generating configuration information according to the frequency band information of the at least two frequency bands.

With reference to the fifth possible implementation manner of the second aspect, in a sixth possible implementation manner, if different configuration information is separately generated according to the frequency band information of the at least two frequency bands, the step of preprocessing a received baseband signal according to the system clock and the control signal, to generate a frequency band signal includes: generating, according to a system clock corresponding to any baseband signal of the at least two baseband signals and according to a control signal corresponding to any baseband signal of the at least two baseband signals, a frequency band signal corresponding to the any baseband signal.

A third aspect provides a reconfigurable receiver, including: a system adaptive control circuit, configured to generate a control signal according to frequency band information of an input signal, where the control signal includes configuration information required for reconfiguring the receiver; a system clock circuit, configured to generate a system clock according to the control signal generated by the system adaptive control circuit; an analog receiving circuit, configured to receive an analog signal; a receiving analog-to-digital conversion circuit, configured to process, according to the system clock and the control signal, the analog signal received by the analog receiving circuit, to generate a digital intermediate frequency signal; and a post-processing circuit, configured to process, according to the system clock and the control signal, the digital intermediate frequency signal generated by the receiving analog-to-digital conversion circuit, to generate a baseband signal.

With reference to the implementation manner of the third aspect, in a first possible implementation manner, the configuration information required for reconfiguring the receiver includes at least one of the following:
the system clock; or
a digital intermediate frequency processing rate; or
a digital-to-analog conversion sampling rate; or
an analog-to-digital conversion sampling rate.

With reference to the implementation manner of the third aspect, in a second possible implementation manner, if the frequency band information of the input signal includes frequency band information of at least two frequency bands, the system adaptive control circuit separately generates configuration information according to the frequency band information of the at least two frequency bands.

A fourth aspect provides a method for reconfiguring a receiver, including: generating a control signal according to frequency band information of an input signal, where the control signal includes configuration information required for reconfiguring the receiver; generating a system clock according to the control signal; receiving an analog signal; processing, according to the system clock and the control signal, the analog signal received by an analog receiving circuit, to generate a digital intermediate frequency signal; and processing, according to the system clock and the control signal, the digital intermediate frequency signal generated by a receiving analog-to-digital conversion circuit, to generate a baseband signal.

With reference to the implementation manner of the fourth aspect, in a first possible implementation manner, the configuration information required for reconfiguring the receiver includes at least one of the following:
the system clock; or
a digital intermediate frequency processing rate; or
a digital-to-analog conversion sampling rate; or
an analog-to-digital conversion sampling rate.

With reference to the implementation manner of the fourth aspect, in a second possible implementation manner, if the frequency band information of the input signal includes frequency band information of at least two frequency bands, the step of generating a control signal according to frequency band information of an input signal includes: separately generating configuration information according to the frequency band information of the at least two frequency bands.

According to the present application, a system adaptive control circuit generates a control signal according to frequency band information of an input signal, where the control signal includes configuration information required for reconfiguring a transmitter, and a system clock circuit generates a system clock according to the control signal. Therefore, a system clock and a digital intermediate frequency processing rate can be flexibly configured according to carriers, bandwidths, and the like of different frequency band signals. A preprocessing circuit preprocesses a received baseband signal according to the system clock and the control signal, to generate a frequency band signal; a digital intermediate frequency processing circuit processes, according to the system clock and the control signal, the frequency band signal generated by the preprocessing circuit, to generate a digital intermediate frequency signal; a digital-to-analog conversion circuit processes, according to the system clock and the control signal, the digital intermediate frequency signal generated by the digital intermediate frequency processing circuit, to generate an analog signal; and an analog transmitting circuit transmits the analog signal generated by the digital-to-analog conversion circuit. In this way, in any scenario, each frequency band signal is processed at a lowest possible digital intermediate frequency processing rate, which can effectively reduce a digital intermediate frequency processing rate, reduce a system delay, and save resources while ensuring processing performance.

BRIEF DESCRIPTION OF DRAWINGS

To describe the technical solutions in the embodiments of the present invention more clearly, the following briefly introduces the accompanying drawings required for describing the embodiments or the prior art. Apparently, the accompanying drawings in the following description show some embodiments of the present invention, and a person of ordinary skill in the art may still derive other drawings from these accompanying drawings without creative efforts.

DESCRIPTION OF EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present application.

Figure 1:
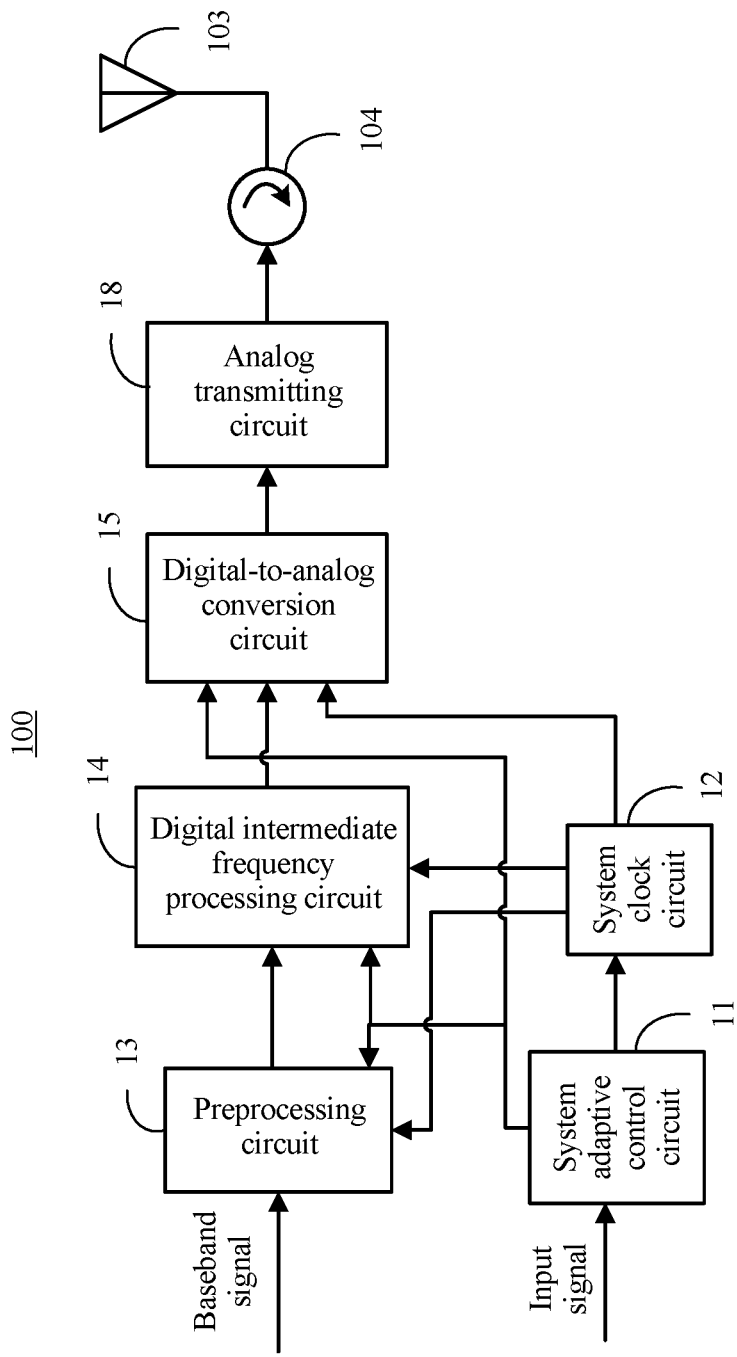
FIG. 1 is a schematic structural diagram of a transmitter according to a first embodiment of the present invention.

Referring to FIG. 1, FIG. 1 is a schematic structural diagram of a reconfigurable transmitter according to a first embodiment of the present invention. As shown in FIG. 1, the reconfigurable transmitter 100 includes: a system adaptive control circuit 11, a system clock circuit 12, a preprocessing circuit 13, a digital intermediate frequency processing circuit 14, a digital-to-analog conversion circuit 15, an analog transmitting circuit 18, an antenna 103, and a circulator 104. The system adaptive control circuit 11 is configured to generate a control signal according to frequency band information of an input signal, where the control signal includes configuration information required for reconfiguring the transmitter 100. The system clock circuit 12 is configured to generate a system clock according to the control signal generated by the system adaptive control circuit 11. The preprocessing circuit 13 is configured to preprocess a received baseband signal according to the system clock and the control signal, to generate a frequency band signal. The digital intermediate frequency processing circuit 14 is configured to process, according to the system clock and the control signal, the frequency band signal generated by the preprocessing circuit 13, to generate a digital intermediate frequency signal. The digital-to-analog conversion circuit 15 is configured to process, according to the system clock and the control signal, the digital intermediate frequency signal generated by the digital intermediate frequency processing circuit 14, to generate an analog signal. The analog transmitting circuit 18 is configured to transmit the analog signal generated by the digital-to-analog conversion circuit 15.

The system clock includes a clock required for digital intermediate frequency processing and a clock required for digital-to-analog conversion and analog-to-digital conversion. After the digital-to-analog conversion circuit 15 converts the digital intermediate frequency signal into the analog signal, the analog transmitting circuit 18 performs analog processing, including filtering, an attenuation amount, and the like, on the analog signal, and a processed analog signal is controlled by the circulator 104 to be transmitted through the antenna 103.

In this embodiment of the present invention, the input signal may be a single-band signal, or a dual-band signal, or even a multiband signal, that is, the frequency band information of the input signal includes frequency band information of at least one frequency band, for example, includes frequency band information of a single frequency band, or frequency band information of two frequency bands, or even frequency band information of multiple frequency bands, and system clocks and digital intermediate frequency processing rates corresponding to frequency band information of different frequency bands may be different. A control signal generated by a system adaptive control circuit 11 according to frequency band information of an input signal includes a system clock and a digital intermediate frequency processing rate that are required for reconfiguring the transmitter 100 and that are corresponding to the frequency band information. A preprocessing circuit 13 preprocesses a received baseband signal according to the system clock and the control signal, to generate a frequency band signal, so that a digital intermediate frequency processing circuit 14 performs subsequent digital intermediate frequency processing. In this way, according to the present application, a system clock and a digital intermediate frequency processing rate can be flexibly configured according to different frequency band signals, so that in any scenario, each frequency band signal is processed at a lowest possible digital intermediate frequency processing rate, which can effectively reduce a digital intermediate frequency processing rate, reduce a system delay, and save resources while ensuring processing performance.

Figure 2:
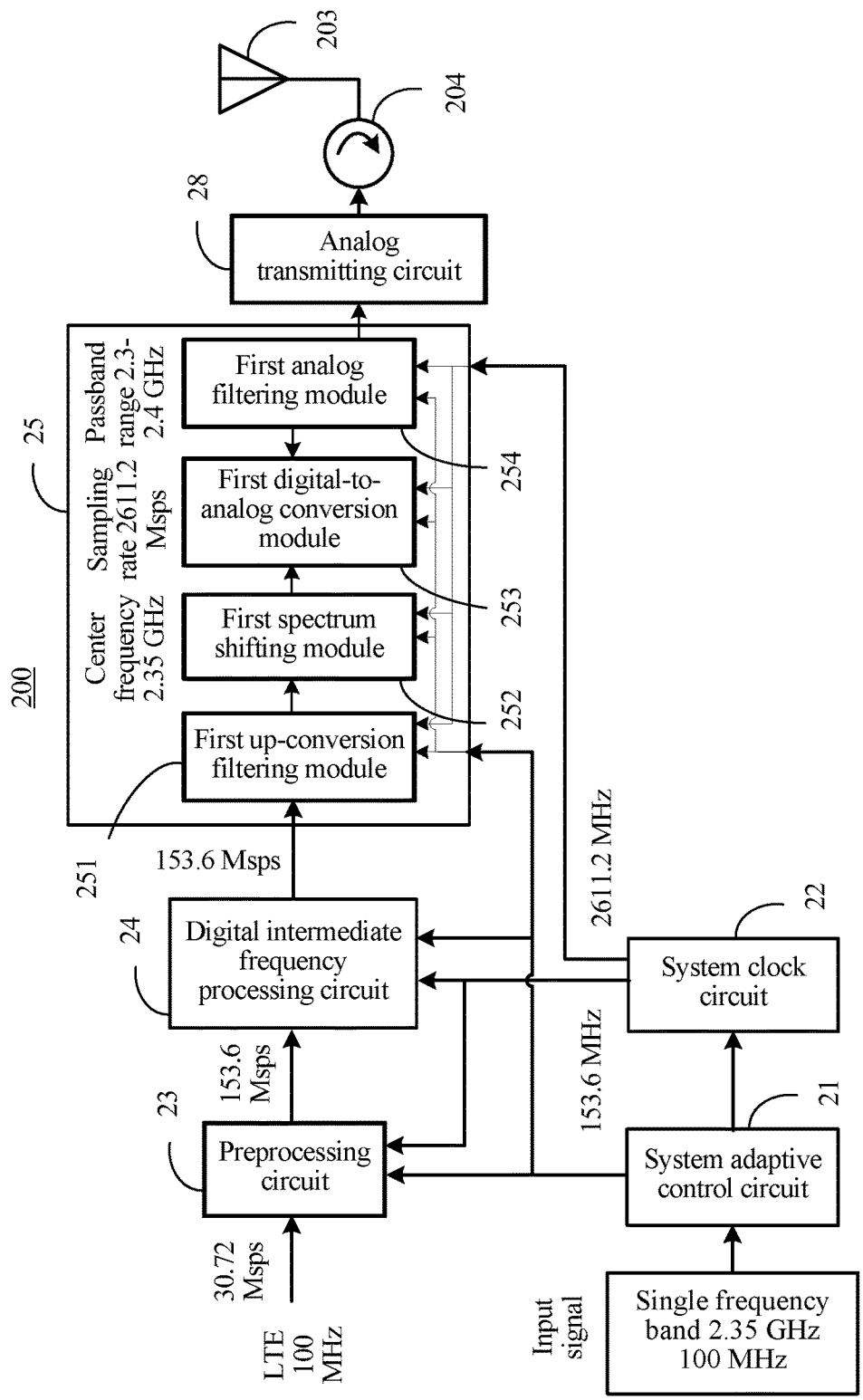
FIG. 2 is a schematic structural diagram of a transmitter according to a second embodiment of the present invention.

Specifically, frequency band information of an input signal includes frequency band information of at least one frequency band. For example, the input signal is an LTE (Long Term Evolution) single-band signal. As shown in FIG. 2, a bandwidth of an input signal is 100 MHz, and a center frequency is 2.35 GHz; in a case in which predistortion processing is not performed on the signal, a transmitter 200 includes: a system adaptive control circuit 21, a system clock circuit 22, a preprocessing circuit 23, a digital intermediate frequency processing circuit 24, a digital-to-analog conversion circuit 25, an analog transmitting circuit 28, an antenna 203, and a circulator 204. A process of configuring the transmitter 200 is described as follows:

Because the input signal is a 100 MHz LTE signal, a digital intermediate frequency processing rate should be greater than 100 Msps. To use an integer multiple of an LTE baseband signal rate 30.72 Msps and reserve a sufficient transition band for a digital filter, the digital intermediate frequency processing rate is set to 153.6 Msps. A digital-to-analog conversion sampling rate and an analog-to-digital conversion sampling rate should be greater than the center frequency of the signal. In consideration of an integer multiple of 30.72 Msps and a transition band of an analog filter, the digital-to-analog conversion sampling rate and the analog-to-digital conversion sampling rate are set to 2611.2 Msps. The system adaptive control circuit 21 determines, according to frequency band information of the input signal, the foregoing configuration information required by the transmitter 200, and generates a corresponding control signal. The configuration information includes at least one of the following: a system clock, or a digital intermediate frequency processing rate, or a digital-to-analog conversion sampling rate, or an analog-to-digital conversion sampling rate. Specifically, the digital intermediate frequency processing rate is 153.6 Msps, and the digital-to-analog conversion sampling rate and the analog-to-digital conversion sampling rate are 2611.2 Msps. The system adaptive control circuit 21 may obtain the foregoing configuration information by using a method such as table lookup or online computing. The control signal may be a gating signal or a configuration signal. The system clock circuit 22 outputs two types of system clocks: a 153.6 MHz system clock and a 2611.2 MHz system clock according to the control signal.

Figure 3:
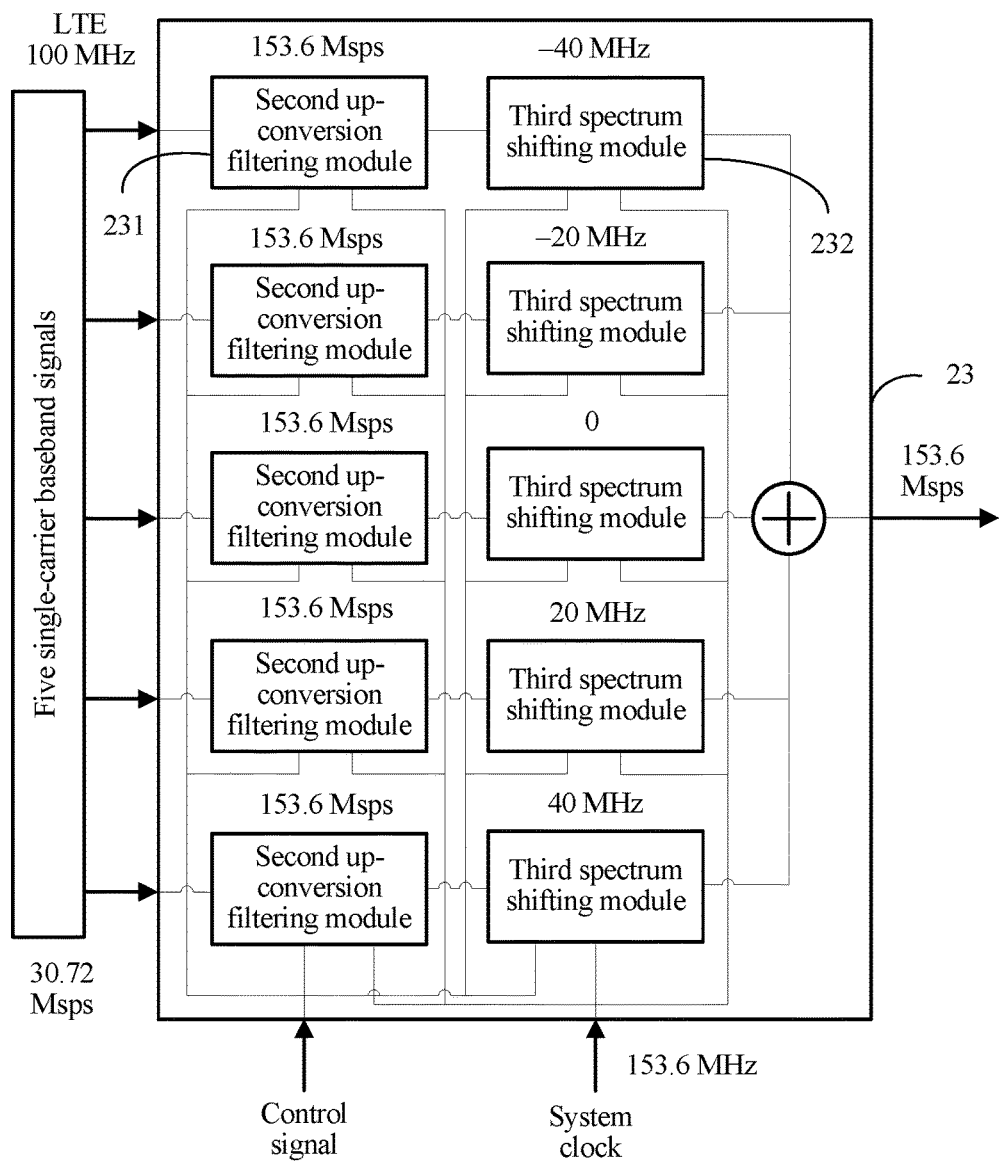
FIG. 3 is a schematic structural diagram of a preprocessing circuit of the transmitter according to the second embodiment of the present invention.

The preprocessing circuit 23 preprocesses a received baseband signal according to the system clock and the control signal, to generate a frequency band signal. Specifically, as shown in FIG. 3, the preprocessing circuit 23 includes a second up-conversion filtering module 231 and a third spectrum shifting module 232. Quantities of second up-conversion filtering modules 231 and third spectrum shifting modules 232 are related to a bandwidth of the input signal and a bandwidth of the baseband signal. In this embodiment of the present invention, the bandwidth of the baseband signal is 20 MHz and the bandwidth of the input signal is 100 MHz. Therefore, the preprocessing circuit 23 has five second up-conversion filtering modules 231 and five third spectrum shifting modules 232. In another embodiment of the present invention, if the input signal has a different bandwidth, the preprocessing circuit 23 may have other quantities of second up-conversion filtering modules 231 and third spectrum shifting modules 232. In this embodiment of the present invention, the five second up-conversion filtering modules 231 respectively up-convert rates 30.72 Msps of five single-carrier LTE baseband signal to a sampling rate 153.6 Msps according to the system clock and the control signal, to ensure a sufficient processing rate after subsequent combining. The LTE baseband signals are transmitted from a building baseband unit (BBU), and have bandwidths of 20 MHz. Before up-converting the LTE baseband signals, the five second up-conversion filtering modules 231 first perform 5× upsampling, and then perform filtering. During filtering, a passband of a filter may be set to [−10 MHz, 10 MHz], a stopband is set to [−70 MHz, 70 MHz], and an attenuation amount is 80 dBc. After filtering is completed, the five third spectrum shifting modules 232 respectively shift the five single-carrier baseband signals to center frequencies [−40 MHz, −20 MHz, 0, 20 MHz, 40 MHz] according to the system clock and the control signal, and then perform combining. A bandwidth of the frequency band signal generated by means of combining changes to 100 MHz. The digital intermediate frequency processing circuit 24 processes the foregoing combined frequency band signal according to the system clock and the control signal, and mainly performs peak clipping processing, to obtain a 100 MHz digital intermediate frequency signal. In this embodiment of the present invention, a peak clipping method is not limited, and may be any method in the prior art, as long as the digital intermediate frequency processing circuit 24 works under the 153.6 MHz system clock according to the control signal.

The digital-to-analog conversion circuit 25 processes, according to the 153.6 MHz system clock and the control signal, the digital intermediate frequency signal generated by the digital intermediate frequency processing circuit 24, to generate an analog signal. Specifically, the digital-to-analog conversion circuit 25 includes a first up-conversion filtering module 251, a first spectrum shifting module 252, a first digital-to-analog conversion module 253, and a first analog filtering module 254. The first up-conversion filtering module 251 up-converts the digital intermediate frequency signal to a radio frequency processing rate according to the system clock and the control signal, that is, up-converts 153.6 Msps to 2611.2 Msps. Specifically, the first up-conversion filtering module 251 first performs 17× upsampling, and then performs filtering. A passband of a filter is set to [−50 MHz, 50 MHz], and a stopband is set to [−1250 MHz, 1250 MHz]. The radio frequency processing rate includes the digital-to-analog conversion sampling rate and the analog-to-digital conversion sampling rate. The first spectrum shifting module 252 shifts a signal obtained by means of filtering to a center frequency of 2.35 GHz. The first digital-to-analog conversion module 253 performs, under the 2611.2 MHz system clock, digital-to-analog conversion on a signal obtained by the first spectrum shifting module 252. The first analog filtering module 254 performs filtering on a signal output by the first digital-to-analog conversion module 253, to filter out a clock image. A passband of a filter is [2300 MHz, 2400 MHz]. To filter out images at 2611.2 MHz and 1305.6 MHz, a stopband of the filter is [2100 MHz, 2600 MHz], and an attenuation amount of at least 30 dBc at the images is ensured. In this way, the digital-to-analog conversion circuit 25 generates the analog signal after processing the digital intermediate frequency signal generated by the digital intermediate frequency processing circuit 24. The analog transmitting circuit 28 performs analog processing, including amplification, filtering, and the like, on the analog signal generated by the digital-to-analog conversion circuit 25, and then transmits a processed analog signal by using the circulator 203 and the antenna 204. In this way, configuration of the transmitter 200 is completed. In this embodiment of the present invention, the transmitter 200 uses a direct radio frequency (DRF) architecture, and certainly, another radio frequency architecture may be used in another embodiment of the present invention.

In this embodiment of the present invention, if predistortion processing is performed on the signal, the transmitter 200 may further include a feedback analog-to-digital conversion circuit (not shown in the figure), configured to process, according to the system clock and the control signal, the analog signal generated by the analog transmitting circuit 28, to generate a digital signal, and down-convert the digital signal into a digital intermediate frequency signal of a corresponding frequency band, so that the digital intermediate frequency processing circuit 24 performs digital predistortion processing. Correspondingly, the digital intermediate frequency processing circuit 24 further includes a digital predistortion coefficient training circuit and a digital predistortion circuit. The digital predistortion coefficient training circuit performs, according to the system clock and the control signal, digital predistortion coefficient training on the digital intermediate frequency signal generated by the feedback analog-to-digital conversion circuit, to generate a digital predistortion coefficient. The digital predistortion circuit performs peak clipping processing and then performs, according to the system clock, the control signal, and the digital predistortion coefficient, digital predistortion processing on the frequency band signal generated by the preprocessing circuit, to generate a digital intermediate frequency signal.

Figure 4:
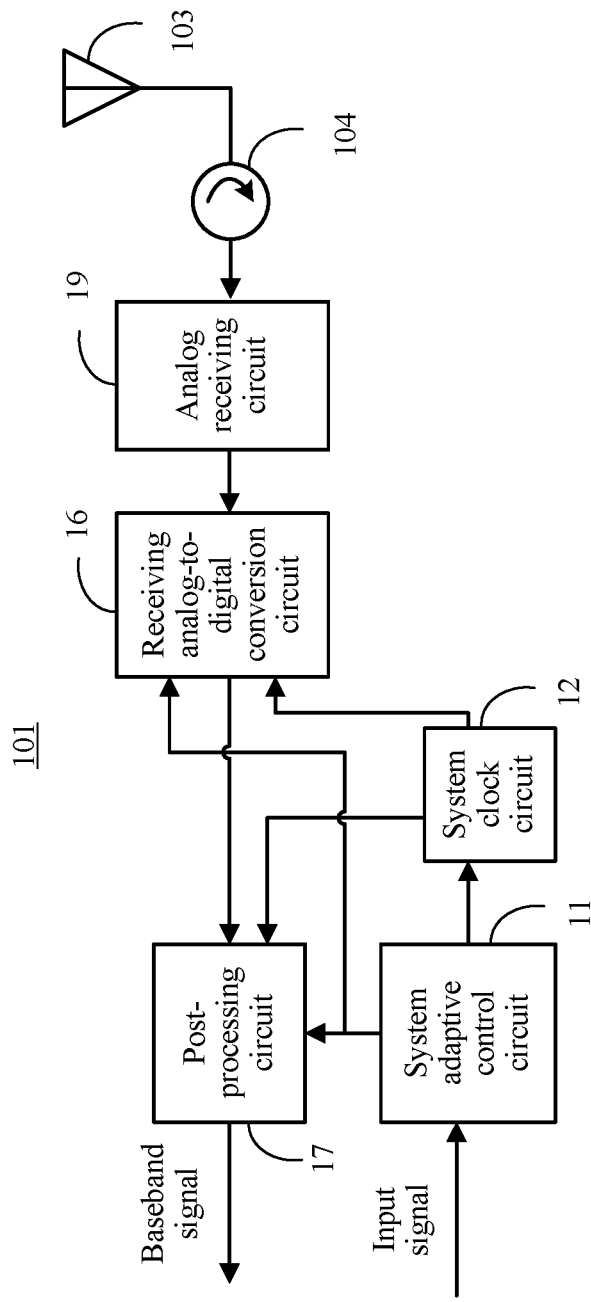
FIG. 4 is a schematic structural diagram of a receiver according to the first embodiment of the present invention.

Referring to FIG. 4, FIG. 4 is a schematic structural diagram of a reconfigurable receiver according to the first embodiment of the present invention. As shown in FIG. 4, the reconfigurable receiver 101 includes: a system adaptive control circuit 11, a system clock circuit 12, a receiving analog-to-digital conversion circuit 16, a post-processing circuit 17, an analog receiving circuit 19, an antenna 103, and a circulator 104. The system adaptive control circuit 11 is configured to generate a control signal according to frequency band information of an input signal, where the control signal includes configuration information required for reconfiguring the receiver 101. The system clock circuit 12 is configured to generate a system clock according to the control signal generated by the system adaptive control circuit 11. The analog receiving circuit 19 is configured to receive an analog signal. The receiving analog-to-digital conversion circuit 16 is configured to process, according to the system clock and the control signal, the analog signal received by the analog receiving circuit 19, to generate a digital intermediate frequency signal. The post-processing circuit 17 is configured to process, according to the system clock and the control signal, the digital intermediate frequency signal generated by the receiving analog-to-digital conversion circuit 16, to generate a baseband signal.

The system clock includes a clock required for analog-to-digital conversion and a clock required for post-processing. The received analog signal is received from the antenna 103, and is controlled by the circulator 104 to be transmitted to the analog receiving circuit 19. The analog receiving circuit 19 performs analog processing, including filtering, amplification, and the like, on the analog signal includes, and transmits a processed analog signal to the receiving analog-to-digital conversion circuit 16 for further processing.

In this embodiment of the present invention, the input signal may be a single-band signal, or a dual-band signal, or even a multiband signal, that is, the frequency band information of the input signal includes frequency band information of at least one frequency band, for example, includes frequency band information of a single frequency band, or frequency band information of two frequency bands, or even frequency band information of multiple frequency bands, and system clocks and digital intermediate frequency processing rates corresponding to frequency band information of different frequency bands may be different. A control signal generated by a system adaptive control circuit 11 according to frequency band information of an input signal includes a system clock and a digital intermediate frequency processing rate that are required for reconfiguring the receiver 101 and that are corresponding to the frequency band information. In this way, according to the present application, a system clock and a digital intermediate frequency processing rate can be flexibly configured according to different frequency band signals, so that in any scenario, each frequency band signal is processed at a lowest possible digital intermediate frequency processing rate, which can effectively reduce a digital intermediate frequency processing rate, reduce a system delay, and save resources while ensuring processing performance.

Figure 5:
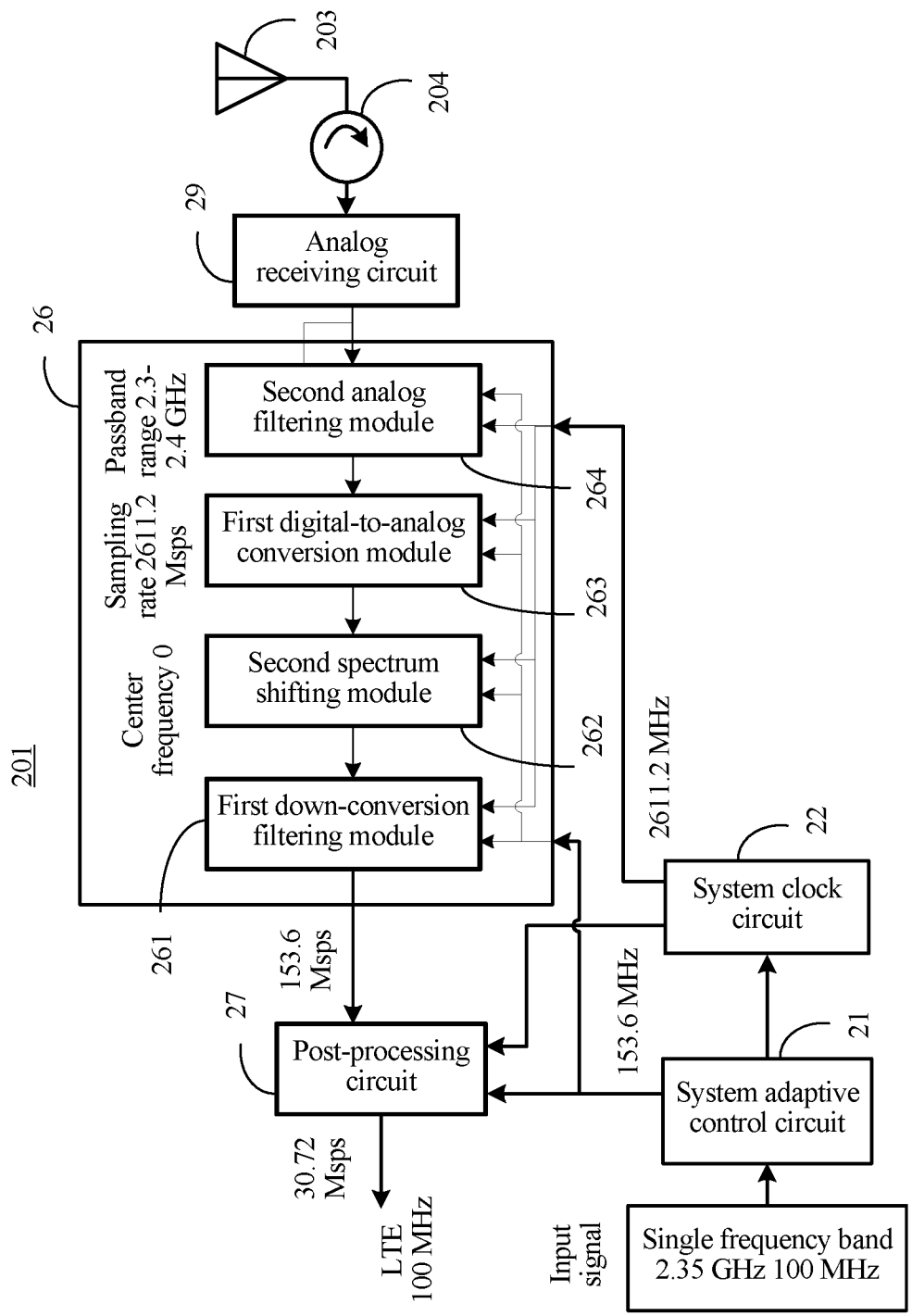
FIG. 5 is a schematic structural diagram of a receiver according to the second embodiment of the present invention.

Specifically, for example, an input signal is an LTE single-band signal. As shown in FIG. 5, a bandwidth of an input signal is 100 MHz, a center frequency is 2.35 GHz, and a receiver 201 includes: a system adaptive control circuit 21, a system clock circuit 22, a receiving analog-to-digital conversion circuit 26, a post-processing circuit 27, an analog receiving circuit 29, an antenna 203, and a circulator 204. A process of configuring the receiver 201 is described as follows:

Because the input signal is a 100 MHz LTE signal, and an analog-to-digital conversion sampling rate should be greater than the center frequency of the signal, in consideration of an integer multiple of an LTE baseband signal rate 30.72 Msps and a transition band of an analog filter, a digital-to-analog conversion sampling rate and the analog-to-digital conversion sampling rate are set to 2611.2 Msps. The system adaptive control circuit 21 determines, according to frequency band information of the input signal, the foregoing configuration information required by the receiver, and generates a corresponding control signal. The configuration information includes at least one of the following: a system clock, or a digital intermediate frequency processing rate, or a digital-to-analog conversion sampling rate, or an analog-to-digital conversion sampling rate. Specifically, the digital intermediate frequency processing rate is 153.6 Msps, and the analog-to-digital conversion sampling rate is 2611.2 Msps. The system adaptive control circuit 21 may obtain the foregoing configuration information by using a method such as table lookup or online computing. The control signal may be a gating signal or a configuration signal. The system clock circuit 22 outputs two types of system clocks: a 153.6 MHz system clock and a 2611.2 MHz system clock according to the control signal.

When the receiver 201 receives a signal, an analog signal received by using the antenna 203 is transmitted to the analog receiving circuit 29 through the circulator 204, and the analog receiving circuit 29 performs analog processing, including filtering, amplification, and the like, on the received analog signal. Then the receiving analog-to-digital conversion circuit 26 converts the analog signal received by the analog receiving circuit 29 into a digital signal according to the system clock and the control signal, and performs down-conversion processing, to generate a digital intermediate frequency signal. The receiving analog-to-digital conversion circuit 26 includes: a first down-conversion filtering module 261, a second spectrum shifting module 262, a first analog-to-digital conversion circuit 263, and a second analog filtering module 264. The second analog filtering module 264 performs analog filtering on the analog signal obtained by means of processing by the analog receiving circuit 29. An analog filtering function is the same as that of the first analog filtering module 254 in the first digital-to-analog conversion circuit 25, a parameter setting is also the same, and details are not described herein again. The first analog-to-digital conversion circuit 263 performs, according to the 2611.2 MHz system clock and the control signal, analog-to-digital conversion on an analog signal obtained by means of analog filtering. The second spectrum shifting module 262 shifts a digital signal that is obtained by means of sampling and that is on a 2.35 GHz carrier to a zero frequency. The first down-conversion filtering module 261 down-converts the digital signal on the zero frequency to the processing rate 153.6 Msps. During down-conversion, the first down-conversion filtering module 261 first performs filtering, and then performs 17× extraction, to obtain the digital intermediate frequency signal. A bandwidth of the digital intermediate frequency signal is 100 MHz, a passband of a filter is [−50 MHz, 50 MHz], a stopband is set to [−70 MHz, 70 MHz], and an attenuation amount is 80 dBc.

Figure 6:
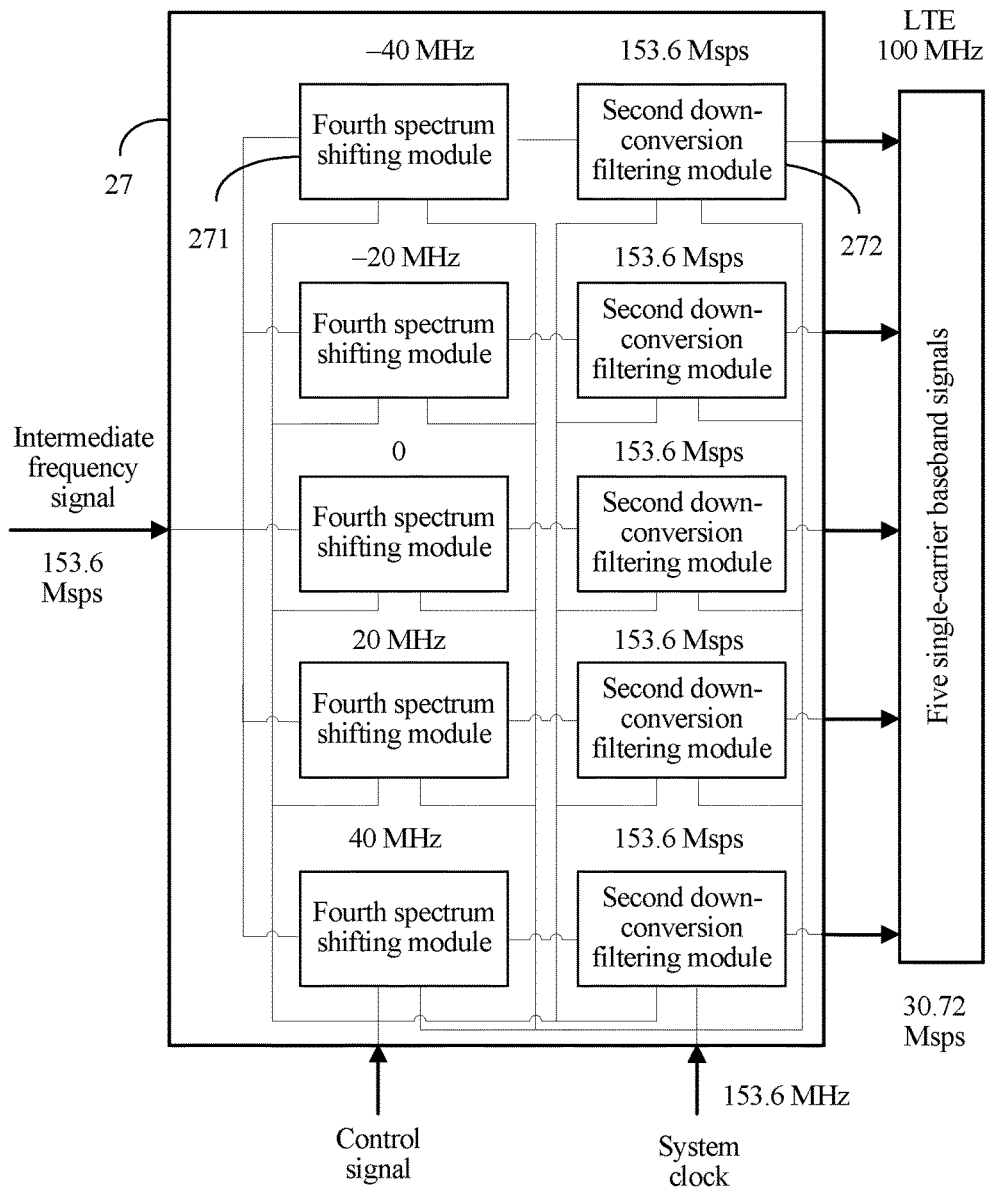
FIG. 6 is a schematic structural diagram of a post-processing circuit of the receiver according to the second embodiment of the present invention.

The post-processing circuit 27 is configured to process, according to the system clock and the control signal, the digital intermediate frequency signal generated by the receiving analog-to-digital conversion circuit 26, to generate a baseband signal. As shown in FIG. 6, the post-processing circuit 27 includes a fourth spectrum shifting module 271 and a second down-conversion filtering module 272. Quantities of fourth spectrum shifting modules 271 and second down-conversion filtering modules 272 are related to a bandwidth of the input signal and a bandwidth of the baseband signal. In this embodiment of the present invention, the bandwidth of the baseband signal is 20 MHz, and the bandwidth of the input signal is 100 MHz. Therefore, the post-processing circuit 27 has five fourth spectrum shifting modules 271 and five second down-conversion filtering modules 272. In another embodiment of the present invention, if the input signal has a different bandwidth, the post-processing circuit 27 may have other quantities of fourth spectrum shifting modules 271 and second down-conversion filtering modules 272. The second down-conversion filtering module 272 performs signal splitting on the 100 MHz digital intermediate frequency signal generated by the receiving analog-to-digital conversion circuit 26. That is, the five second down-conversion filtering modules 272 separately perform spectrum shifting on the digital intermediate frequency signal, with center frequencies being [−40 MHz, −20 MHz, 0, 20 MHz, 40 MHz] respectively after spectrum shifting, and then respectively perform filtering on five signals, to filter out other carrier signals, so as to obtain five single-carrier signals. A passband of a filter is [−9.015 MHz, 9.015 MHz], a stopband is [−10 MHz, 10 MHz], and an attenuation amount is 80 dBc. The five fourth spectrum shifting modules 271 respectively perform 5× extraction on the five single-carrier signals, and down-convert the signals to the baseband processing rate 30.72 Msps, to obtain baseband signals for transmission to a BBU. In this way, configuration of the receiver 201 is completed.

Figure 7:
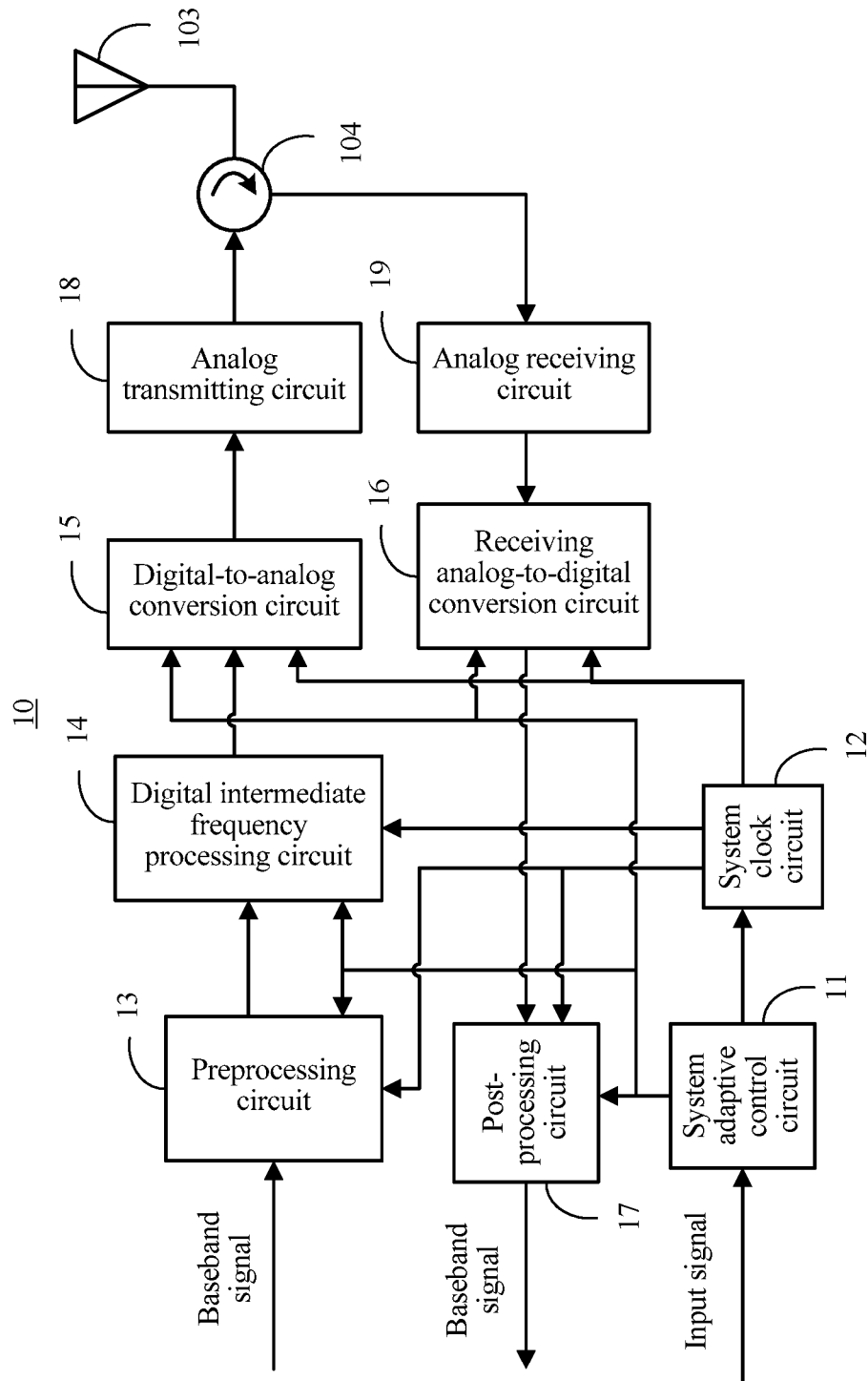
FIG. 7 is a schematic structural diagram of a transceiver according to the first embodiment of the present invention.
Figure 8:
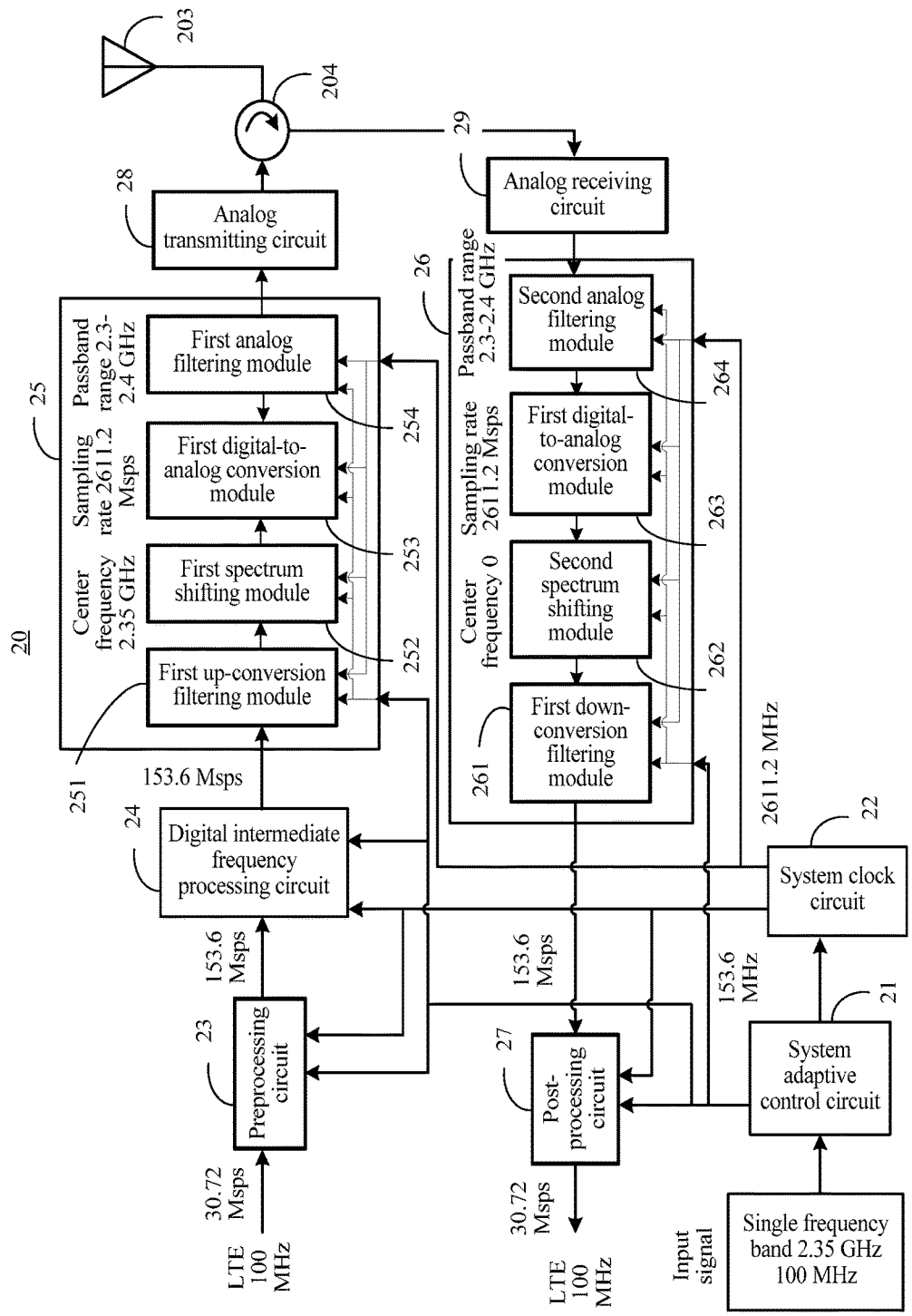
FIG. 8 is a schematic structural diagram of a transceiver according to the second embodiment of the present invention.

In the present application, a transmitter and a receiver may be integrated into a transceiver. As shown in FIG. 7, the transmitter 100 and the receiver 101 are integrated into a transceiver 10. The system adaptive control circuit 11 generates a control signal according to frequency band information of an input signal, where the control signal includes configuration information required for reconfiguring the transceiver 10, which specifically includes a system clock and a digital intermediate frequency processing rate that are required for reconfiguring the transceiver 10 and that are corresponding to the frequency band information. The system clock circuit 12 generates the system clock according to the control signal generated by the system adaptive control circuit 11. The system clock includes a clock required for digital intermediate frequency processing and a clock required for digital-to-analog conversion and analog-to-digital conversion. For reconfiguration of the transceiver 10, refer to the transmitter 100 and the receiver 101, and details are not described herein again. When a bandwidth of an input signal is 100 MHz and a center frequency is 2.35 GHz, in a case in which predistortion processing is not performed on the signal, a structure of a transceiver 20 is shown in FIG. 8. The system adaptive control circuit 21 generates a control signal according to frequency band information of the input signal, where the control signal includes configuration information required for reconfiguring the transceiver 20. The system clock circuit 22 generates a system clock according to the control signal generated by the system adaptive control circuit 21. For reconfiguration of the transceiver 20, refer to the transmitter 200 and the receiver 201, and details are not described herein again.

Figure 9:
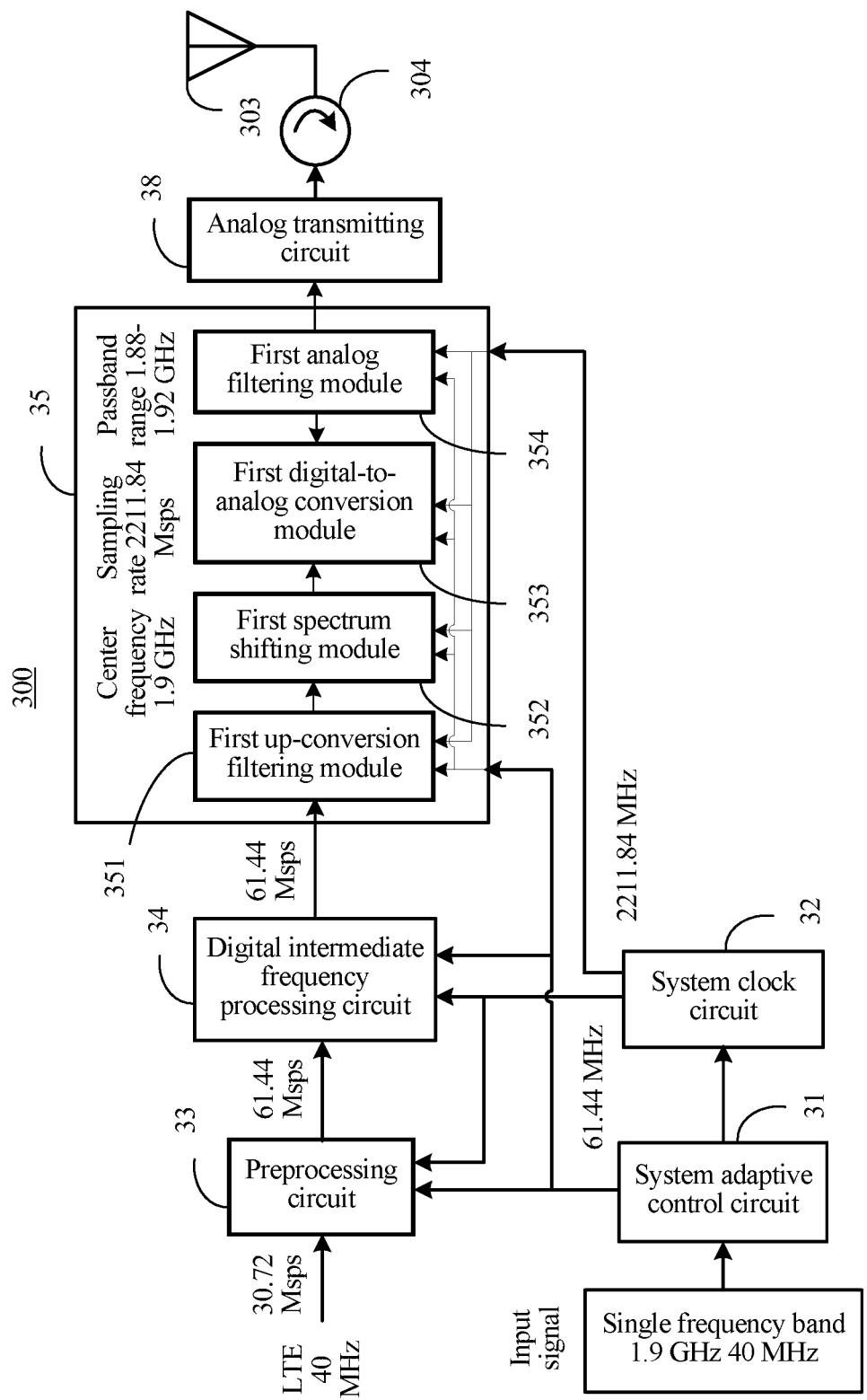
FIG. 9 is a schematic structural diagram of a transmitter according to a third embodiment of the present invention.
Figure 10:
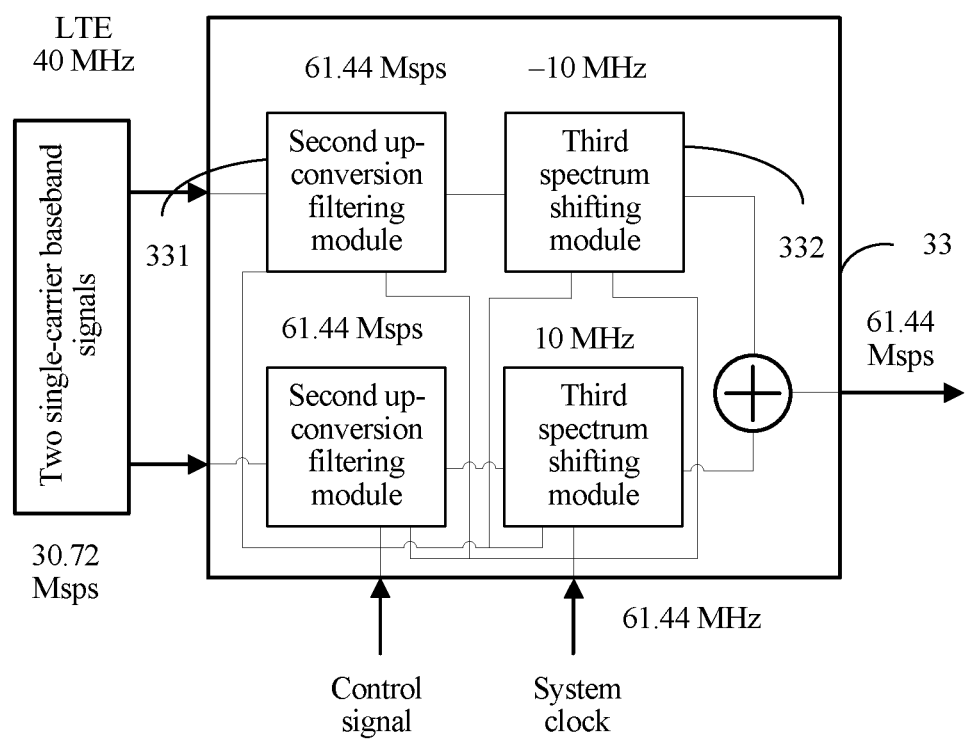
FIG. 10 is a schematic structural diagram of a preprocessing circuit of the transmitter according to the third embodiment of the present invention.

When a bandwidth of a signal changes to 40 MHz and a center frequency changes to 1.9 GHz, a digital intermediate frequency processing rate changes to 61.44 MHz, and a digital-to-analog conversion sampling rate and an analog-to-digital conversion sampling rate change to 2211.84 Msps. Therefore, two types of system clocks are required: a 61.44 MHz system clock and a 2211.84 MHz system clock, and a transmitter is reconfigured according to the foregoing configuration information. As shown in FIG. 9, a system adaptive control circuit 31 generates a control signal according to frequency band information of an input signal, where the control signal includes configuration information required for reconfiguring a transmitter 300. A system clock circuit 32 generates, according to the foregoing configuration information, two types of system clocks: a 61.44 MHz system clock and a 2611.2 MHz system clock. A preprocessing circuit 33 preprocesses a received baseband signal according to the 61.44 MHz system clock and the control signal, to generate a frequency band signal. Specifically, as shown in FIG. 10, the preprocessing circuit 33 includes a second up-conversion filtering module 331 and a third spectrum shifting module 332. Quantities of second up-conversion filtering modules 331 and third spectrum shifting modules 332 are related to a bandwidth of the input signal and a bandwidth of the baseband signal. In this embodiment of the present invention, the bandwidth of the input signal is 40 MHz, and therefore, the preprocessing circuit 27 has two second up-conversion filtering modules 331 and two third spectrum shifting modules 332. The two second up-conversion filtering modules 331 respectively up-convert rates 30.72 Msps of two 20 MHz single-carrier LTE baseband signals to a sampling rate 61.44 Msps according to the system clock and the control signal, to ensure a sufficient processing rate after subsequent combining. Before up-converting the LTE baseband signals, the two second up-conversion filtering modules 331 first perform 2× upsampling, and then perform filtering. During filtering, a passband of a filter may be set to [−10 MHz, 10 MHz], a stopband is set to [−30 MHz, 30 MHz], an attenuation amount is 80 dBc. After filtering is completed, the two third spectrum shifting modules 332 respectively shift the two single-carrier baseband signals to center frequencies [−10 MHz, 10 MHz] according to the system clock and the control signal, and then perform combining. A bandwidth of the frequency band signal generated by means of combining changes to 40 MHz. A digital intermediate frequency processing circuit 34 processes, according to the system clock and the control signal, the foregoing frequency band signal generated by means of combining, to generate a digital intermediate frequency signal, that is, mainly performs peak clipping processing, to generate a 40 MHz digital intermediate frequency signal. In this embodiment of the present invention, a peak clipping method is not limited, and may be any method in the prior art, as long as the digital intermediate frequency processing circuit 34 works under the 61.44 MHz system clock according to the control signal.

A digital-to-analog conversion circuit 35 processes, according to the 61.44 MHz system clock and the control signal, the digital intermediate frequency signal generated by the digital intermediate frequency processing circuit 34, to generate an analog signal. Specifically, the first digital-to-analog conversion circuit 35 includes a first up-conversion filtering module 351, a first spectrum shifting module 352, a first digital-to-analog conversion module 353, and a first analog filtering module 354. The first up-conversion filtering module 351 up-converts the digital intermediate frequency signal to a radio frequency processing rate according to the 61.44 MHz system clock and the control signal, that is, up-converts 61.44 Msps to 2211.84 Msps. Specifically, the first up-conversion filtering module 351 first performs 36× upsampling, and then performs filtering. A passband of a filter is set to [−20 MHz, 20 MHz], and a stopband is set to [−1050 MHz, 1050 MHz]. The radio frequency processing rate includes the digital-to-analog conversion sampling rate and the analog-to-digital conversion sampling rate. The first spectrum shifting module 352 shifts a signal obtained by means of filtering to a center frequency of 1.9 GHz. The first digital-to-analog conversion module 353 performs, under the 2211.84 MHz system clock, digital-to-analog conversion on a signal obtained by the first spectrum shifting module 352. The first analog filtering module 354 performs filtering on a signal output by the first digital-to-analog conversion module 353, to filter out a clock image. A passband of a filter is [1880 MHz, 1920 MHz], a stopband of the filter is [1600 MHz, 2200 MHz], and an attenuation amount of at least 30 dBc at the image is ensured. In this way, the first digital-to-analog conversion circuit 35 generates the analog signal after processing the digital intermediate frequency signal generated by the digital intermediate frequency processing circuit 34, and the analog transmitting circuit 38 performs analog processing, including amplification, filtering, and the like, on the analog signal generated by the digital-to-analog conversion circuit 35, and then transmits a processed analog signal by using a circulator 304 and an antenna 303. In this way, configuration of the transmitter 300 is completed. In this embodiment of the present invention, the transmitter 300 uses a direct radio frequency architecture, and certainly, another radio frequency architecture may be used in another embodiment of the present invention. After reconfiguration, the digital intermediate frequency processing rate decreases from the original 153.6 Msps to 61.144 Msps, and the digital-to-analog conversion sampling rate decreases from 2611.2 Msps to 2211.84 Msps, a processing rate is greatly reduced, and implementation is simpler. It can be seen that, according to the present application, a system clock and a digital intermediate frequency processing rate can be flexibly configured according to carriers, bandwidths, and the like of different frequency band signals, so that each frequency band signal is processed at a lowest possible digital intermediate frequency processing rate, which can effectively reduce a digital intermediate frequency processing rate, reduce a system delay, and save resources while ensuring processing performance.

In this embodiment of the present invention, if predistortion processing is performed on the signal, the transmitter 300 may further include a feedback analog-to-digital conversion circuit (not shown in the figure), configured to process, according to the system clock and the control signal, the analog signal generated by the analog transmitting circuit 38, to generate a digital signal, and down-convert the digital signal into a digital intermediate frequency signal of a corresponding frequency band, so that the digital intermediate frequency processing circuit 34 performs digital predistortion processing. Correspondingly, the digital intermediate frequency processing circuit 34 further includes a digital predistortion coefficient training circuit and a digital predistortion circuit. The digital predistortion coefficient training circuit performs, according to the system clock and the control signal, digital predistortion coefficient training on the digital intermediate frequency signal generated by the feedback analog-to-digital conversion circuit, to generate a digital predistortion coefficient. The digital predistortion circuit performs peak clipping processing and then performs, according to the system clock, the control signal, and the digital predistortion coefficient, digital predistortion processing on the frequency band signal generated by the preprocessing circuit, to generate a digital intermediate frequency signal.

Figure 11:
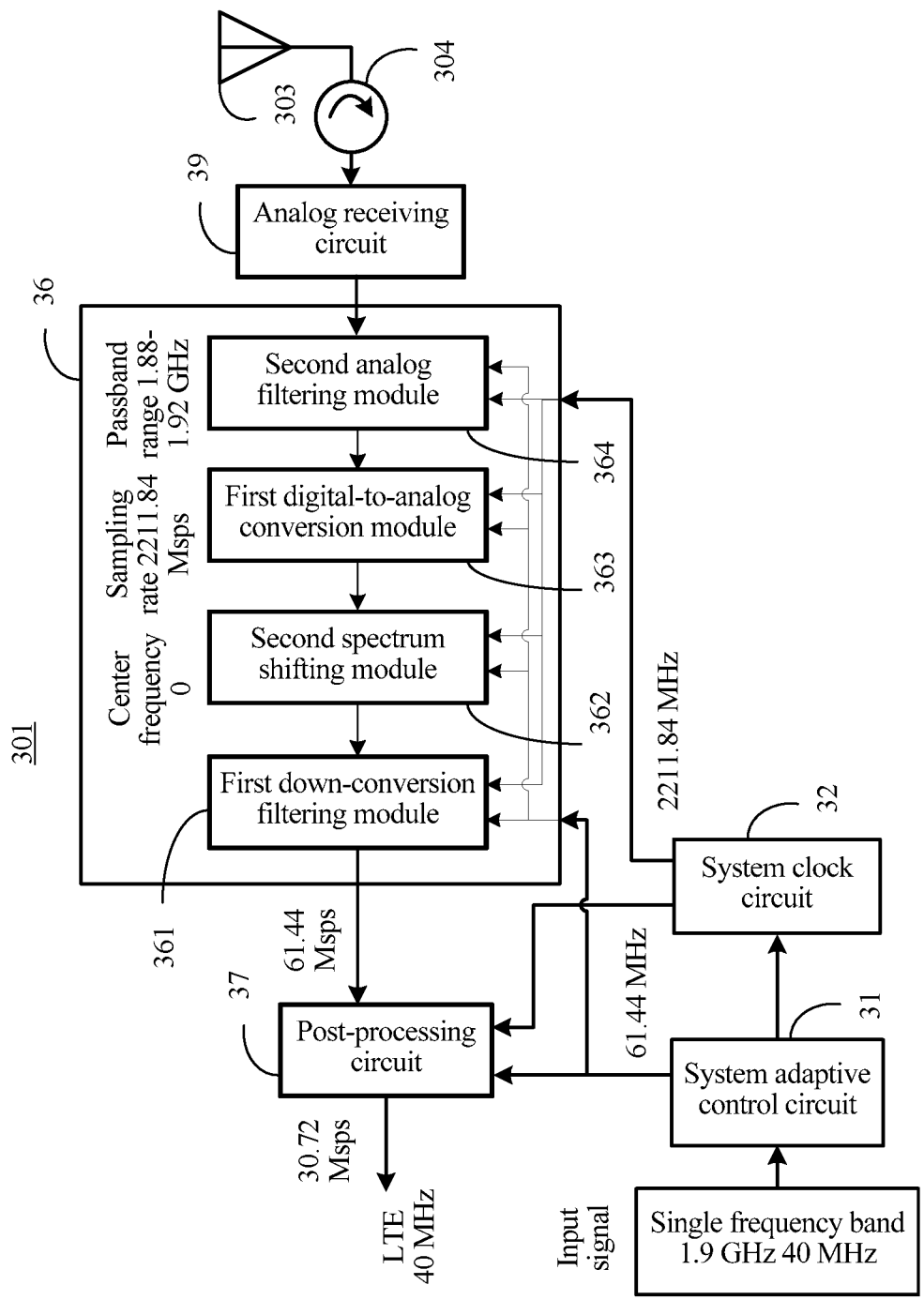
FIG. 11 is a schematic structural diagram of a receiver according to the third embodiment of the present invention.

When a bandwidth of a signal changes to 40 MHz and a center frequency changes to 1.9 GHz, a receiver is reconfigured, and a module analog-to-digital conversion sampling rate is 2211.84 Msps. As shown in FIG. 11, the system adaptive control circuit 31 generates a control signal according to frequency band information of an input signal, where the control signal includes configuration information required for reconfiguring a receiver 301. The system clock circuit 32 generates two types of system clocks: a 61.44 MHz system clock and a 2611.2 MHz system clock according to the control signal generated by the system adaptive control circuit 31.

When the receiver 301 receives a signal, an analog signal received by using the antenna 303 is transmitted to an analog receiving circuit 39 through the circulator 304, and a receiving analog-to-digital conversion circuit 36 processes, according to the 2211.84 MHz system clock and the control signal, the analog signal received by the analog receiving circuit 39, to generate a digital signal, and down-converts the digital signal into a digital intermediate frequency signal. The receiving analog-to-digital conversion circuit 36 includes: a first down-conversion filtering module 361, a second spectrum shifting module 362, a first analog-to-digital conversion circuit 363, and a second analog filtering module 364. The second analog filtering module 364 performs, according to the 2211.84 MHz system clock and the control signal, analog filtering on the analog signal received by the analog receiving circuit 39. An analog filtering function is the same as that of the first analog filtering module 354 in the first digital-to-analog conversion circuit 35, a parameter setting is also the same, and details are not described herein again. The first analog-to-digital conversion circuit 363 performs, according to the 2211.84 MHz system clock and the control signal, analog-to-digital conversion on an analog signal obtained by means of analog filtering. The second spectrum shifting module 362 shifts, according to the 2211.84 MHz system clock and the control signal, a digital signal that is obtained by means of sampling and that is on a 1.9 GHz carrier to a zero frequency. The first down-conversion filtering module 361 down-converts the digital signal on the zero frequency to the processing rate 61.44 Msps according to the 2211.84 MHz system clock and the control signal. During down-conversion, the first down-conversion filtering module 361 first performs filtering, and then performs 36× extraction, to obtain the digital intermediate frequency signal whose bandwidth is 40 MHz. A passband of a filter is [−20 MHz, 20 MHz], a stopband is set to [−30 MHz, 30 MHz], and an attenuation amount is 80 dBc.

Figure 12:
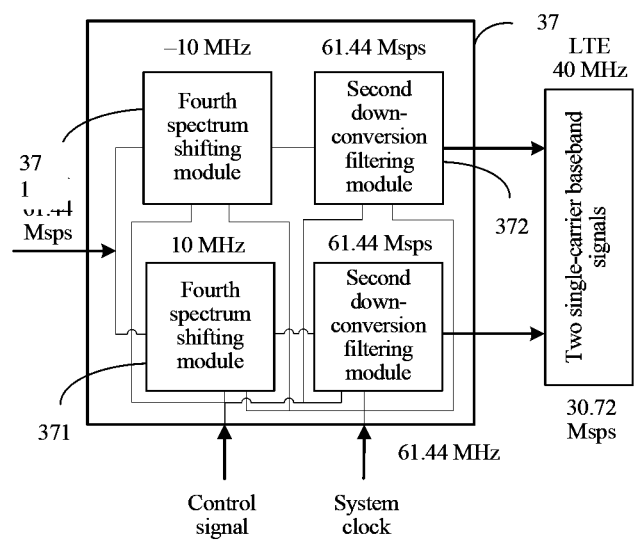
FIG. 12 is a schematic structural diagram of a post-processing circuit of the receiver according to the third embodiment of the present invention.

A post-processing circuit 37 is configured to process, according to the 61.44 MHz system clock and the control signal, the digital intermediate frequency signal generated by the receiving analog-to-digital conversion circuit 36, to generate a baseband signal. As shown in FIG. 12, the post-processing circuit 37 includes a fourth spectrum shifting module 371 and a second down-conversion filtering module 372. Quantities of fourth spectrum shifting modules 371 and second down-conversion filtering modules 372 are related to a bandwidth of the input signal and a bandwidth of the baseband signal. In this embodiment of the present invention, the bandwidth of the input signal is 40 MHz, and therefore, the post-processing circuit 37 has two fourth spectrum shifting modules 371 and two second down-conversion filtering modules 372. The second down-conversion filtering module 372 performs, according to the 61.44 MHz system clock and the control signal, signal splitting on the 40 MHz digital intermediate frequency signal generated by the receiving analog-to-digital conversion circuit 36. That is, the two second down-conversion filtering modules 372 separately perform spectrum shifting on the digital intermediate frequency signal, with center frequencies being [−10 MHz, 10 MHz] respectively after spectrum shifting, and then respectively perform filtering on two signals, to filter out other carrier signals, so as to obtain two single-carrier signals. A passband of a filter is [−9.015 MHz, 9.015 MHz], a stopband is [−10 MHz, 10 MHz], and an attenuation amount is 80 dBc. The two fourth spectrum shifting modules 371 respectively perform 2× extraction on the two single-carrier signals according to the 61.44 MHz system clock and the control signal, and down-convert the signals to the baseband processing rate 30.72 Msps, to generate baseband signals for transmission to a BBU. In this way, reconfiguration of the receiver 301 is completed, and after reconfiguration, the analog-to-digital conversion sampling rate decreases from 2611.2 Msps to 2211.84 Msps, a processing rate is greatly reduced, and implementation is simpler. It can be seen that, according to the present application, a system clock and a digital intermediate frequency processing rate can be flexibly configured according to carriers, bandwidths, and the like of different frequency band signals, so that each frequency band signal is processed at a lowest possible digital intermediate frequency processing rate, which can effectively reduce a digital intermediate frequency processing rate, reduce a system delay, and save resources while ensuring processing performance.

Figure 13:
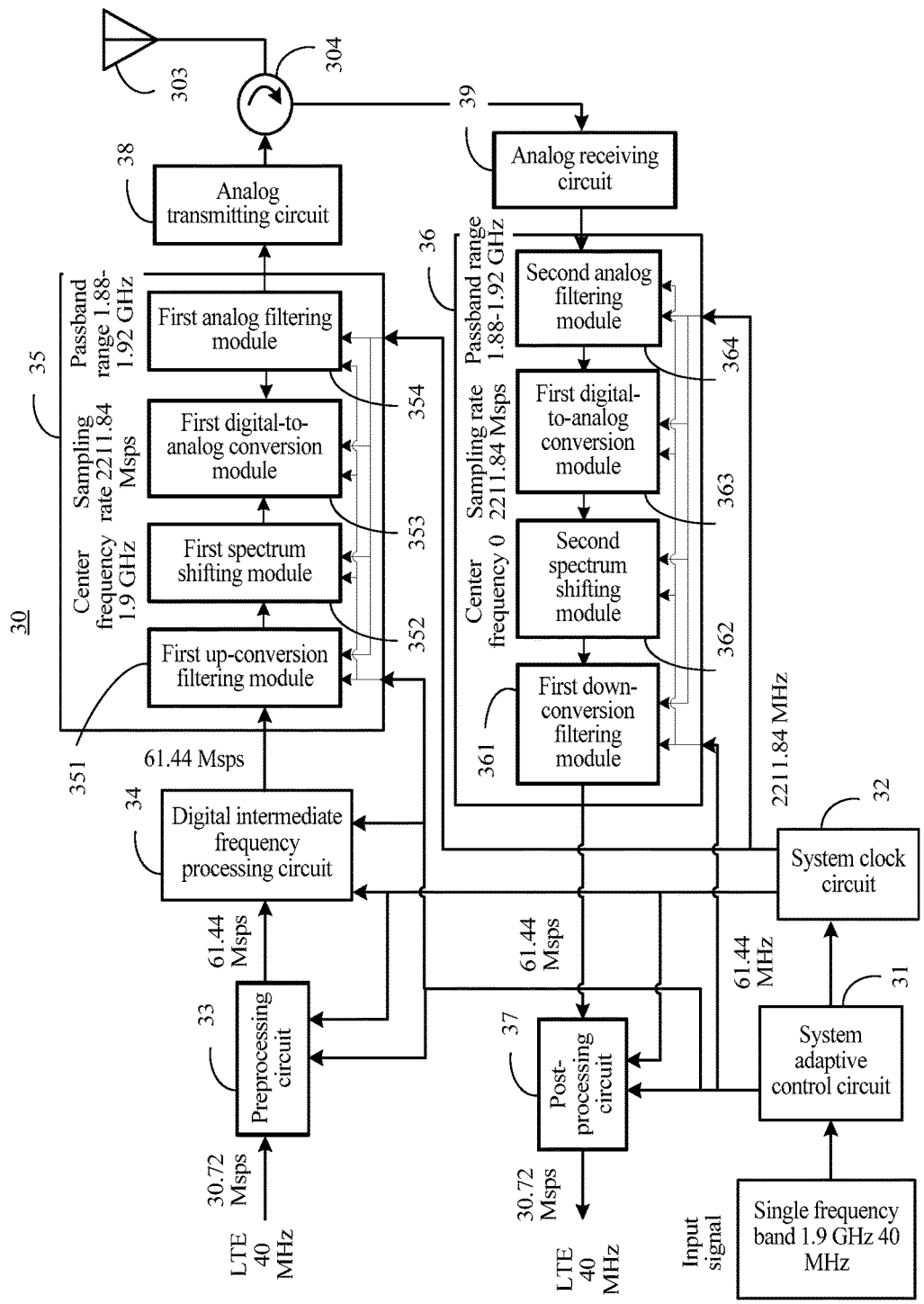
FIG. 13 is a schematic structural diagram of a transceiver according to the third embodiment of the present invention.

When a bandwidth of an input signal changes to 40 MHz and a center frequency changes to 1.9 GHz, the transmitter 300 and the receiver 301 may be integrated into a transceiver 30, as shown in FIG. 13. The system adaptive control circuit 31 generates a control signal according to frequency band information of the input signal, where the control signal includes configuration information required for reconfiguring the transceiver 30. The system clock circuit 32 generates a system clock according to the control signal generated by the system adaptive control circuit 31. For reconfiguration of the transceiver 30, refer to the transmitter 300 and the receiver 301, and details are not described herein again.

Figure 14A:
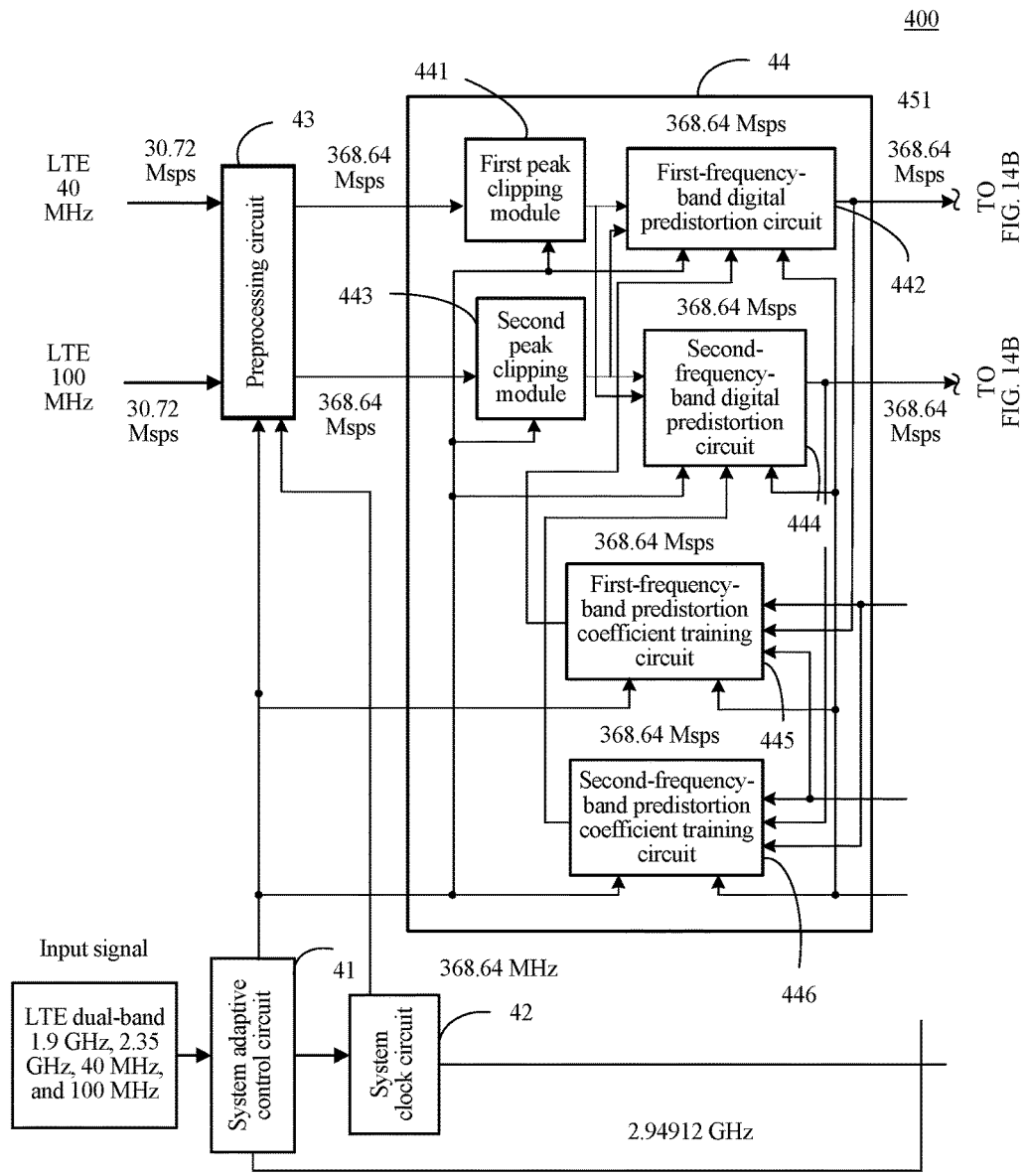
FIG. 14A to FIG. 14C are a schematic structural diagram of a transmitter according to a fourth embodiment of the present invention.
Figure 14B:
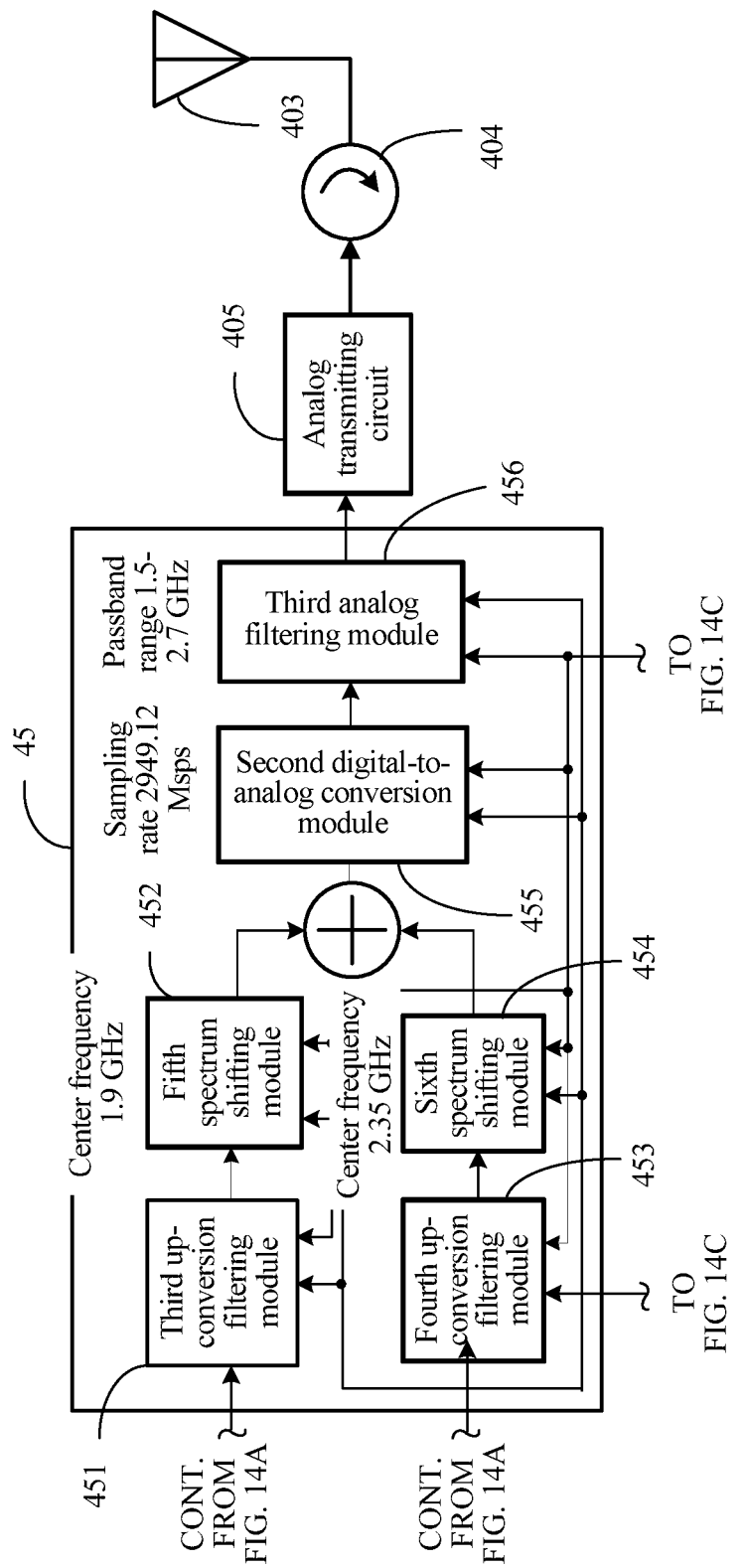
Figure 14C:
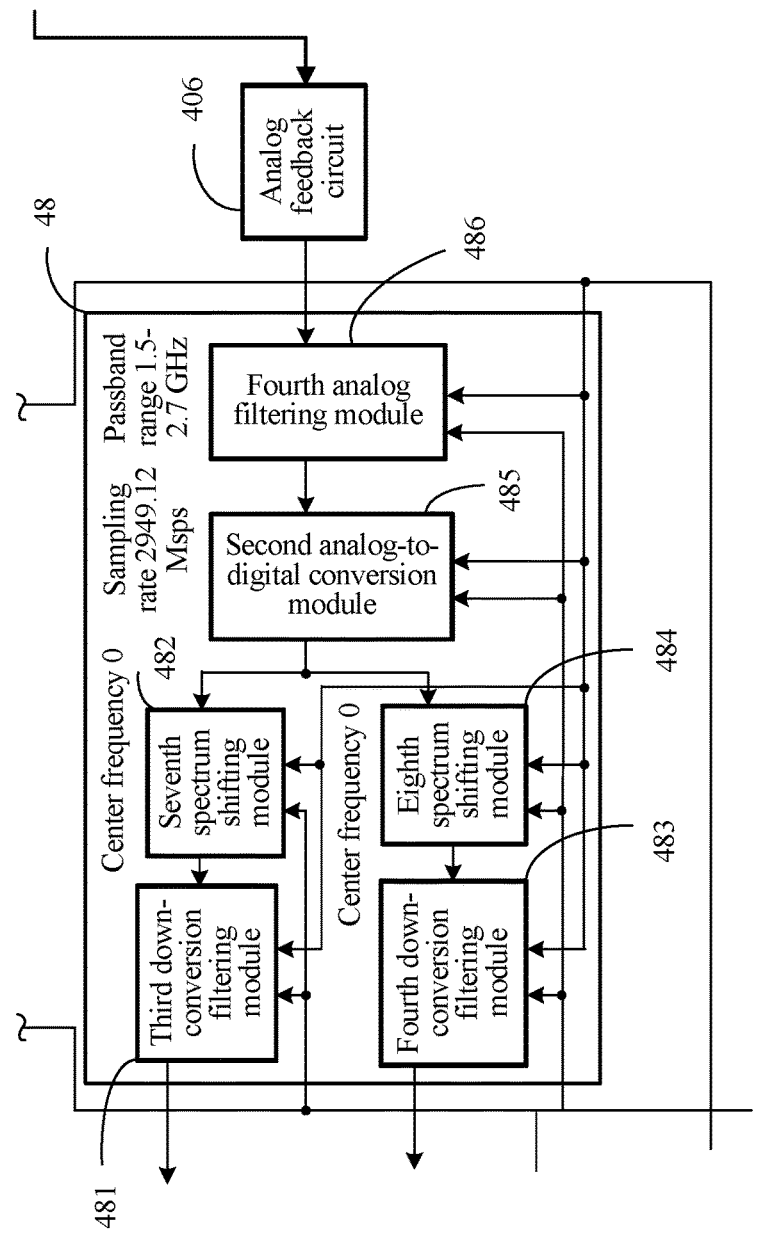

In this embodiment of the present invention, frequency band information of an input signal may include frequency band information of at least two frequency bands. For example, the input signal is an LTE dual-band signal. In frequency band information of the input signal, a bandwidth of a first frequency band is 40 MHz, a center frequency of the first frequency band is 1.9 GHz, a bandwidth of a second frequency band is 100 MHz, and a center frequency of the second frequency band is 2.35 GHz. As shown in FIG. 14A to FIG. 14C, in a case in which predistortion processing is performed on the signal, a transmitter 400 includes: a system adaptive control circuit 41, a system clock circuit 42, a preprocessing circuit 43, a digital intermediate frequency processing circuit 44, a digital-to-analog conversion circuit 45, a feedback analog-to-digital conversion circuit 48, an antenna 403, a circulator 404, an analog transmitting circuit 405, and an analog feedback circuit 406. A process of configuring the transmitter 400 is described as follows:

The system adaptive control circuit 41 generates a control signal according to the frequency band information of the input signal. The control signal includes configuration information required for reconfiguring the transmitter 400. The configuration information includes at least one of the following: a system clock, or a digital intermediate frequency processing rate, or a digital-to-analog conversion sampling rate, or an analog-to-digital conversion sampling rate. Specifically, for the 40 MHz first frequency band, in consideration of cancellation of a third-order distortion component of the first frequency band and in consideration of impact from the 100 MHz second frequency band, a digital intermediate frequency processing rate of the first frequency band should be greater than 240 Msps, and an integer multiple of an LTE baseband signal rate 30.72 Msps should be used and a sufficient transition band needs to be reserved for a digital filter, and therefore, the digital intermediate frequency processing rate is set to 368.64 Msps. For the 100 MHz second frequency band, in consideration of cancellation of a third-order distortion component of the second frequency band and in consideration of impact from the 40 MHz first frequency band, a digital intermediate frequency processing rate of the second frequency band should be greater than 300 Msps, and an integer multiple of the LTE baseband signal rate 30.72 Msps is used and a sufficient transition band is reserved for the digital filter, and therefore, the digital intermediate frequency processing rate is also set to 368.64 Msps. The digital-to-analog conversion sampling rate and the analog-to-digital conversion sampling rate should be greater than the center frequency of the signal, and in consideration of an integer multiple of 30.72 Msps and a transition band of an analog filter, the digital-to-analog conversion sampling rate and the analog-to-digital conversion sampling rate are set to 2949.12 Msps. Therefore, according to the two rates, two types of system clocks need to be output: a 368.64 MHz system clock and a 2949.12 MHz system clock. The system adaptive control circuit 41 may determine the foregoing configuration information by using a method such as table lookup or online computing. The generated control signal may be a gating signal or a configuration signal. These configuration information determined by the system adaptive control circuit 41 is used for adaptive control of another part of a system. The system clock circuit 42 outputs two types of system clocks: a 368.64 MHz system clock and a 2949.12 MHz system clock according to the control signal.

Figure 15:
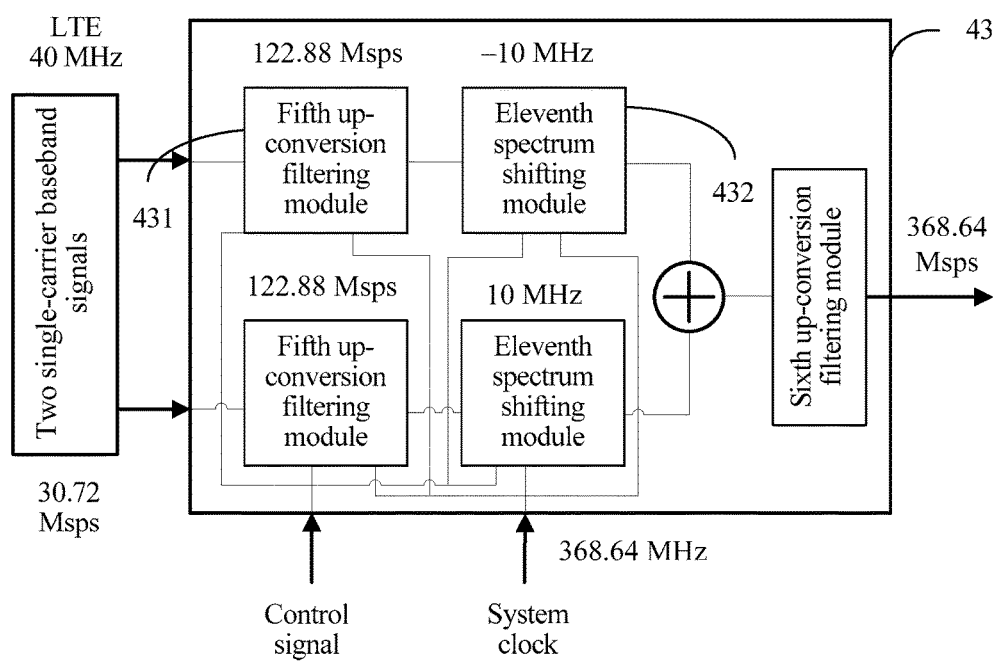
FIG. 15 is a schematic diagram of a preprocessing circuit of the transmitter in the case of 40 MHz according to the fourth embodiment of the present invention.
Figure 16:
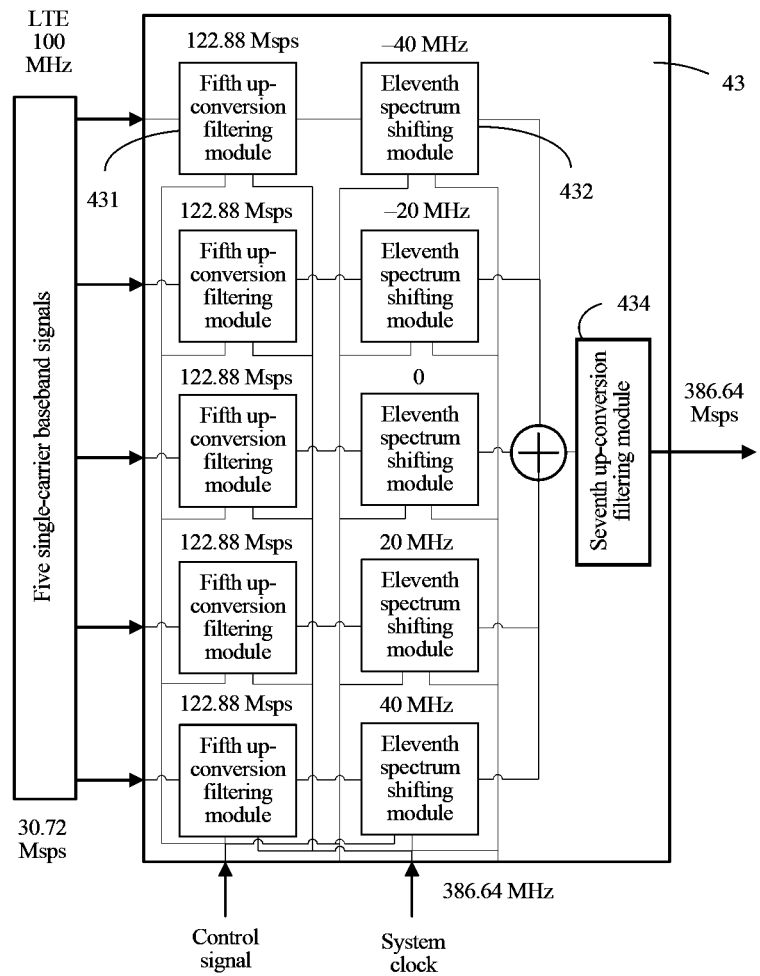
FIG. 16 is a schematic diagram of a preprocessing circuit of the transmitter in the case of 100 MHz according to the fourth embodiment of the present invention.

The preprocessing circuit 43 preprocesses a received baseband signal according to the 368.64 MHz system clock and the control signal, to generate a frequency band signal. Specifically, as shown in FIG. 15 and FIG. 16, the preprocessing circuit 43 includes: a fifth up-conversion filtering module 431, an eleventh spectrum shifting module 432, a sixth up-conversion filtering module 433, and a seventh up-conversion filtering module 434. Quantities of fifth up-conversion filtering modules 431 and eleventh spectrum shifting modules 432 are related to a bandwidth of the dual-band input signal and a bandwidth of the baseband signal. In this embodiment of the present invention, for the dual-band input signal, the bandwidth of the first frequency band is 40 MHz, and the bandwidth of the second frequency band is 100 MHz. Therefore, the preprocessing circuit 43 has seven fifth up-conversion filtering modules 431 and seven eleventh spectrum shifting modules 432. For the 40 MHz first frequency band, two fifth up-conversion filtering modules 431 combines two 20 MHz single-carrier zero frequency signals into one 40 MHz zero intermediate frequency signal according to the 368.64 MHz system clock and the control signal. Specifically, the two fifth up-conversion filtering modules 431 first up-convert the signals to a sampling rate 122.88 Msps by means of 4× upsampling, and then perform filtering. A passband of a filter may be set to [−10 MHz, 10 MHz], a stopband is set to [−50 MHz, 50 MHz], and an attenuation amount is 80 dBc. Then two eleventh spectrum shifting modules 432 respectively shift two carriers to center frequencies [−10 MHz, 10 MHz], and perform combining, to generate the 40 MHz zero intermediate frequency signal. The sixth up-conversion filtering module 433 up-converts the combined signal to a sampling rate 368.64 Msps by means of 3× upsampling, and performs filtering. A passband of a filter is set to [−20 MHz, 20 MHz], a stopband is set to [−160 MHz, 160 MHz], and an attenuation amount is 80 dBc. For the 100 MHz second frequency band, five fifth up-conversion filtering modules 431 combines five 20 MHz single-carrier zero frequency signals into one 100 MHz zero intermediate frequency signal according to the system clock and the control signal. Specifically, the five fifth up-conversion filtering modules 431 first up-convert the signals to the sampling rate 122.88 Msps by means of 4× upsampling, and then perform filtering. A passband of a filter may be set to [−10 MHz, 10 MHz], a stopband is set to [−50 MHz, 50 MHz], and an attenuation amount is 80 dBc. Then five eleventh spectrum shifting modules 432 respectively shift five single carriers to center frequencies [−40 MHz, −20 MHz, 0, 20 MHz, 40 MHz], and perform combining, to generate the 100 MHz zero intermediate frequency signal. The seventh up-conversion filtering module 434 up-converts the combined signal to the sampling rate 368.64 Msps by means of 3× upsampling, and performs filtering. A passband of a filter is set to [−50 MHz, 50 MHz], a stopband is set to [−130 MHz, 130 MHz], and an attenuation amount is 80 dBc. In this way, the preprocessing circuit 43 outputs one channel of frequency band signal corresponding to each of the 40 MHz first frequency band and the 100 MHz second frequency band, and both sampling rates of two channels of frequency band signals are 368.64 Msps, so as to perform subsequent digital intermediate frequency processing. Certainly, in another embodiment of the present invention, sampling rates of the two channels of signals may be different.

The digital intermediate frequency processing circuit 44 processes, according to the system clock and the control signal, the frequency band signal generated by the preprocessing circuit 43, to generate a digital intermediate frequency signal. The digital intermediate frequency processing circuit 44 further includes a digital predistortion coefficient training circuit and a digital predistortion circuit. The digital predistortion coefficient training circuit performs, according to the system clock and the control signal, digital predistortion coefficient training on a digital intermediate frequency signal generated by the feedback analog-to-digital conversion circuit 48 and a digital intermediate frequency signal output by the digital predistortion circuit, to generate a digital predistortion coefficient. The digital predistortion circuit performs peak clipping processing and then performs, according to the system clock, the control signal, and the digital predistortion coefficient, digital predistortion processing on the frequency band signal generated by the preprocessing circuit 43, to generate the digital intermediate frequency signal. Specifically, the digital intermediate frequency processing circuit 44 includes a first peak clipping module 441, a first-frequency-band digital predistortion circuit 442, a second peak clipping module 443, a second-frequency-band digital predistortion circuit 444, a first-frequency-band digital predistortion coefficient training circuit 445, and a second-frequency-band digital predistortion coefficient training circuit 446. The first peak clipping module 441 performs, according to the 368.64 MHz system clock and the control signal, peak clipping processing on a frequency band signal that is output by the preprocessing circuit 43 based on the first frequency band. The first-frequency-band digital predistortion circuit 442 performs, according to the 368.64 MHz system clock, the control signal, and a predistortion coefficient generated by the first-frequency-band digital predistortion coefficient training circuit 445, digital predistortion processing on a signal obtained by means of peak clipping processing performed by the first peak clipping module 441, to generate a digital intermediate frequency signal corresponding to the first frequency band. When the first-frequency-band digital predistortion circuit 442 performs digital predistortion processing, the processing is affected by impact from a frequency band signal obtained by means of peak clipping processing performed by the second peak clipping module 443 based on the second frequency band. Similarly, the second peak clipping module 443 performs, according to the system clock and the control signal, peak clipping processing on a frequency band signal that is output by the preprocessing circuit 43 based on the second frequency band. The second-frequency-band digital predistortion circuit 444 performs, according to the 368.64 MHz system clock, the control signal, and a predistortion coefficient generated by the second-frequency-band digital predistortion coefficient training circuit 446, digital predistortion processing on the frequency band signal obtained by means of peak clipping processing performed by the second peak clipping module 443, to generate a digital intermediate frequency signal corresponding to the second frequency band. When the second-frequency-band digital predistortion circuit 444 performs digital predistortion processing, the processing is also affected by impact from the frequency band signal obtained by means of peak clipping processing performed by the first peak clipping module 441 based on the first frequency band. The first-frequency-band digital predistortion coefficient training circuit 445 and the second-frequency-band digital predistortion coefficient training circuit 446 separately perform, according to the 368.64 MHz system clock and the control signal, digital predistortion coefficient training on the digital intermediate frequency signals generated by the feedback analog-to-digital conversion circuit 48, to generate the digital predistortion coefficients.

The digital-to-analog conversion circuit 45 is configured to process, according to the 2949.12 MHz system clock and the control signal, the digital intermediate frequency signal generated by the digital intermediate frequency processing circuit 44, to generate an analog signal. Specifically, the digital-to-analog conversion circuit 45 includes: a third up-conversion filtering module 451, a fifth spectrum shifting module 452, a fourth up-conversion filtering module 453, a sixth spectrum shifting module 454, a second digital-to-analog conversion module 455, and a third analog filtering module 456. For the 40 MHz first frequency band, the third up-conversion filtering module 451 up-converts the digital intermediate frequency signal of the frequency band to a radio frequency processing rate according to the 2949.12 MHz system clock and the control signal, that is, up-converts 368.64 Msps to 2949.12 Msps. The radio frequency processing rate includes the digital-to-analog conversion sampling rate and the analog-to-digital conversion sampling rate. Specifically, the third up-conversion filtering module 451 first performs 8× up-conversion to a sampling rate 2949.12 Msps, and then performs filtering. A passband of a filter is set to [−120 MHz, 120 MHz], a stopband is set to [−1300 MHz, 1300 MHz], and an attenuation amount is 80 dBc. The fifth spectrum shifting module 452 shifts a signal obtained by means of filtering to a center frequency of 1.9 GHz. For the 100 MHz second frequency band, the fourth up-conversion filtering module 453 up-converts the digital intermediate frequency signal of the frequency band to the radio frequency processing rate according to the 2949.12 MHz system clock and the control signal, that is, up-converts 368.64 Msps to 2949.12 Msps. Specifically, the fourth up-conversion filtering module 453 first performs 8× up-conversion to the sampling rate 2949.12 Msps, and then performs filtering. A passband of a filter is set to [−120 MHz, 120 MHz], a stopband is set to [−1300 MHz, 1300 MHz], and an attenuation amount is 80 dBc. The sixth spectrum shifting module 454 shifts a signal obtained by means of filtering to a center frequency of 2.35 GHz. The digital-to-analog conversion circuit 45 combines a signal output by the fifth spectrum shifting module 452 based on the first frequency band and a signal output by the sixth spectrum shifting module 454 based on the second frequency band. The second digital-to-analog conversion module 455 performs digital-to-analog conversion on a combined signal according to the 2949.12 MHz system clock and the control signal, to generate an analog signal. The third analog filtering module 456 performs filtering on the analog signal output by the second digital-to-analog conversion module 455, to filter out a clock image. A passband of a filter is [1700 MHz, 2500 MHz], a stopband of the filter is [1500 MHz, 2900 MHz], and an attenuation amount of at least 30 dBc at the image is ensured. In this way, the digital-to-analog conversion circuit 45 converts the two channels of digital intermediate frequency signals into a dual-band analog signal. The analog transmitting circuit 405 performs analog processing, including amplification, filtering, and the like, on the dual-band analog signal generated by the digital-to-analog conversion circuit 45, and then transmits a processed analog signal by using the circulator 404 and the antenna 403.

In this embodiment of the present invention, a coupler (not shown in the figure) is further included ahead of the circulator 404, so as to feed, back to the analog feedback circuit 406, the analog signal output by the analog transmitting circuit 405. The feedback analog-to-digital conversion circuit 48 processes, according to the 2949.12 MHz system clock and the control signal, the fed-back dual-band analog signal, to generate a digital intermediate frequency signal. The feedback analog-to-digital conversion circuit 48 includes: a third down-conversion filtering module 481, a seventh spectrum shifting module 482, a fourth down-conversion filtering module 483, an eighth spectrum shifting module 484, a second analog-to-digital conversion module 485, and a fourth analog filtering module 486. The fourth analog filtering module 486 performs analog filtering on the fed-back analog signal. An analog filtering function is the same as that of the third analog filtering module 456, a parameter setting is also the same, and details are not described herein again. The second analog-to-digital conversion module 485 performs, according to the 2949.12 MHz system clock and the control signal, analog-to-digital conversion on an analog signal obtained by means of analog filtering processing. For the 40 MHz first frequency band, the seventh spectrum shifting module 482 shifts, according to the 2949.12 MHz system clock and the control signal, a digital signal that is obtained by means of sampling and that is on a 1.9 GHz carrier to a zero frequency. Then the third down-conversion filtering module 481 down-converts the digital signal to the processing rate 368.64 Msps, and specifically, first performs filtering, and then performs 8× extraction, to generate a digital intermediate frequency signal of the corresponding frequency band. A passband of a filter is set to [−120 MHz, 120 MHz], a stopband is set to [−180 MHz, 180 MHz], and an attenuation amount is 80 dBc. The first-frequency-band predistortion coefficient training circuit 445 performs digital predistortion coefficient training on the digital intermediate frequency signal, so as to perform digital predistortion processing on the frequency band signal of the first frequency band. For the 100 MHz second frequency band, the eighth spectrum shifting module 484 shifts, according to the 2949.12 MHz system clock and the control signal, a digital signal that is obtained by means of sampling and that is on a 2.35 GHz carrier to the zero frequency. Then the fourth down-conversion filtering module 483 down-converts the digital signal to the processing rate 368.64 Msps, and specifically, first performs filtering, and then performs 8× extraction, to generate a digital intermediate frequency signal of the corresponding frequency band. A passband of a filter is set to [−150 MHz, 150 MHz], a stopband is set to [−180 MHz, 180 MHz], and an attenuation amount is 80 dBc. The second-frequency-band predistortion coefficient training circuit 446 performs digital predistortion coefficient training on the digital intermediate frequency signal, so as to perform digital predistortion processing on the frequency band signal of the second frequency band. In this way, configuration of the transmitter 400 is completed. In this embodiment of the present invention, the transmitter 400 uses a direct radio frequency architecture, and certainly, another radio frequency architecture may be used in another embodiment of the present invention.

Figure 17:
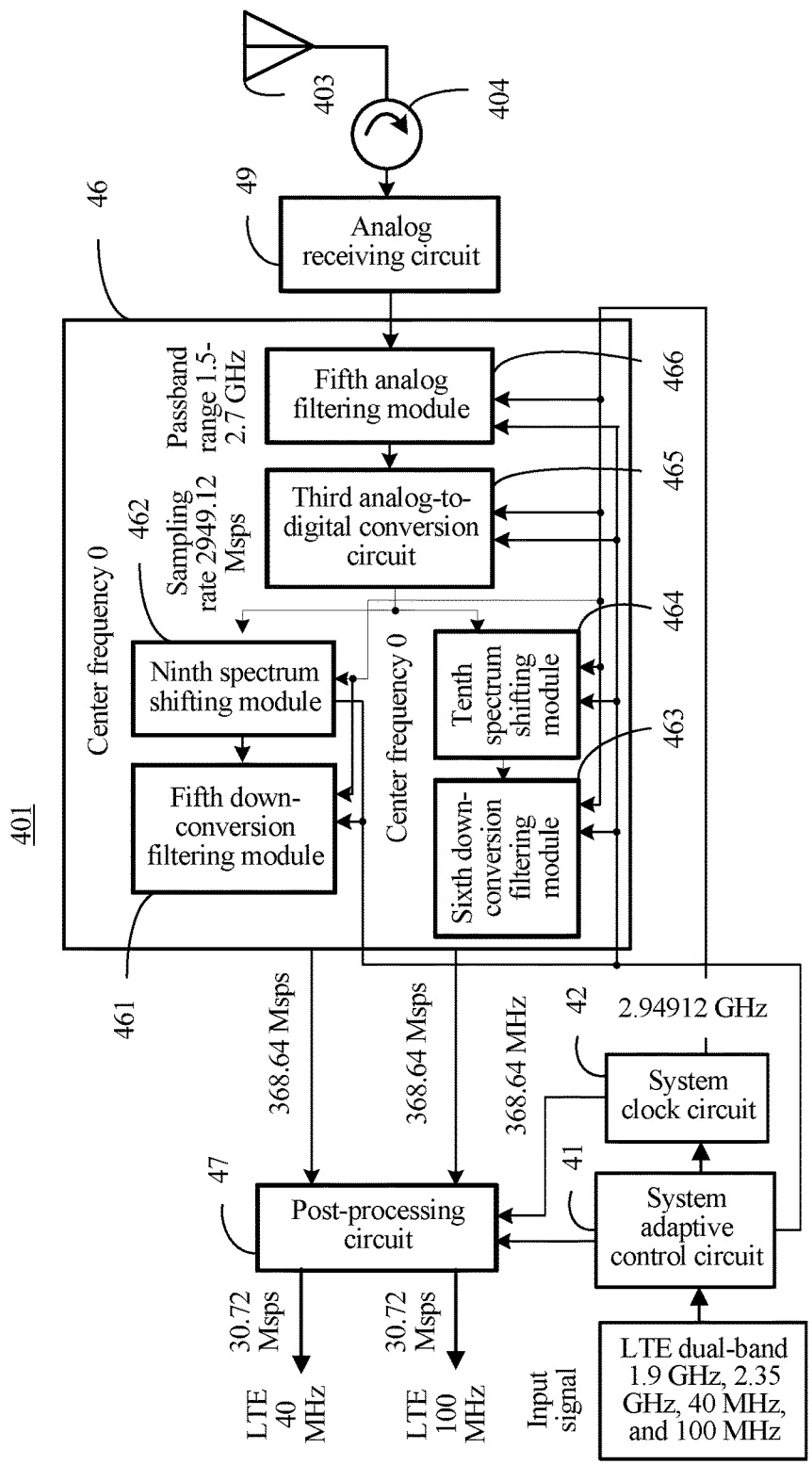
FIG. 17 is a schematic structural diagram of a receiver according to the fourth embodiment of the present invention.

An input signal is an LTE dual-band signal, that is, in frequency band information of the input signal, a bandwidth of a first frequency band is 40 MHz, a center frequency of the first frequency band is 1.9 GHz, a bandwidth of a second frequency band is 100 MHz, and a center frequency of the second frequency band is 2.35 GHz. As shown in FIG. 17, a receiver 401 includes: a system adaptive control circuit 41, a system clock circuit 42, a receiving analog-to-digital conversion circuit 46, a post-processing circuit 47, an analog receiving circuit 49, an antenna 403, and a circulator 404. A process of configuring the receiver 401 is described as follows:

Same as the transmitter 400, the system adaptive control circuit 41 in the receiver 401 generates a control signal according to the frequency band information of the input signal. The control signal includes configuration information required for reconfiguring the transmitter 400. The configuration information includes at least one of the following: a system clock, or a digital intermediate frequency processing rate, or a digital-to-analog conversion sampling rate, or an analog-to-digital conversion sampling rate. Specifically, in this embodiment, the control signal generated by the system adaptive control circuit 41 includes a digital intermediate frequency processing rate 368.64 Msps and an analog-to-digital conversion sampling rate 2949.12 Msps, which are used for adaptive control of another part of a system. The system clock circuit 42 outputs two types of system clocks: a 368.64 MHz system clock and a 2949.12 MHz system clock according to the control signal.

When the receiver 401 receives a signal, a dual-band analog signal received by using the antenna 403 is transmitted to the analog receiving circuit 49 through the circulator 404, and the analog receiving circuit 49 performs analog processing, including filtering, amplification, and the like, on the received dual-band analog signal. The receiving analog-to-digital conversion circuit 46 processes, according to the 2949.12 MHz system clock and the control signal, the dual-band analog signal received by the analog receiving circuit 49, to generate a digital intermediate frequency signal. The receiving analog-to-digital conversion circuit 46 includes: a fifth down-conversion filtering module 461, a ninth spectrum shifting module 462, a sixth down-conversion filtering module 463, a tenth spectrum shifting module 464, a third analog-to-digital conversion circuit 465, and a fifth analog filtering module 466. The fifth analog filtering module 466 performs analog filtering on the dual-band analog signal received by the analog receiving circuit 49. An analog filtering function is the same as that of the third analog filtering module 456, a parameter setting is also the same, and details are not described herein again. The third analog-to-digital conversion circuit 465 performs, according to the 2949.12 MHz system clock and the control signal, analog-to-digital conversion on an analog signal obtained by means of analog filtering processing performed by the fifth analog filtering module 466. The ninth spectrum shifting module 462 shifts, according to the 2949.12 MHz system clock and the control signal, a digital signal that is obtained by means of sampling and that is on a 1.9 GHz carrier to a zero frequency. Then the fifth down-conversion filtering module 461 down-converts the digital signal to the processing rate 368.64 Msps, and specifically, first performs filtering, and then performs 8× extraction, to obtain a digital intermediate frequency signal corresponding to the 40 MHz first frequency band. A passband of a filter is set to [−20 MHz, 20 MHz], a stopband is set to [−180 MHz, 180 MHz], and an attenuation amount is 80 dBc. The tenth spectrum shifting module 464 shifts, according to the 2949.12 MHz system clock and the control signal, a digital signal that is obtained by means of sampling and that is on a 2.35 GHz carrier to the zero frequency. Then the sixth down-conversion filtering module 463 down-converts the digital signal to the processing rate 368.64 Msps, and specifically, first performs filtering, and then performs 8× extraction, to generate a digital intermediate frequency signal corresponding to the 100 MHz second frequency band. A passband of a filter is [−50 MHz, 50 MHz], a stopband is set to [−180 MHz, 180 MHz], and an attenuation amount is 80 dBc.

Figure 18:
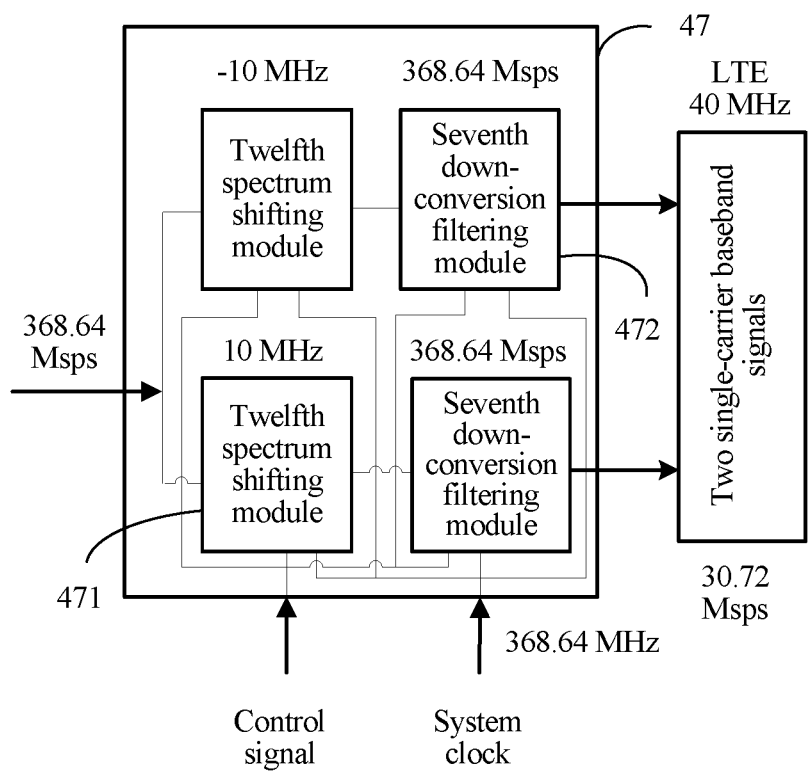
FIG. 18 is a schematic diagram of a post-processing circuit of the receiver in the case of 40 MHz according to the fourth embodiment of the present invention.
Figure 19:
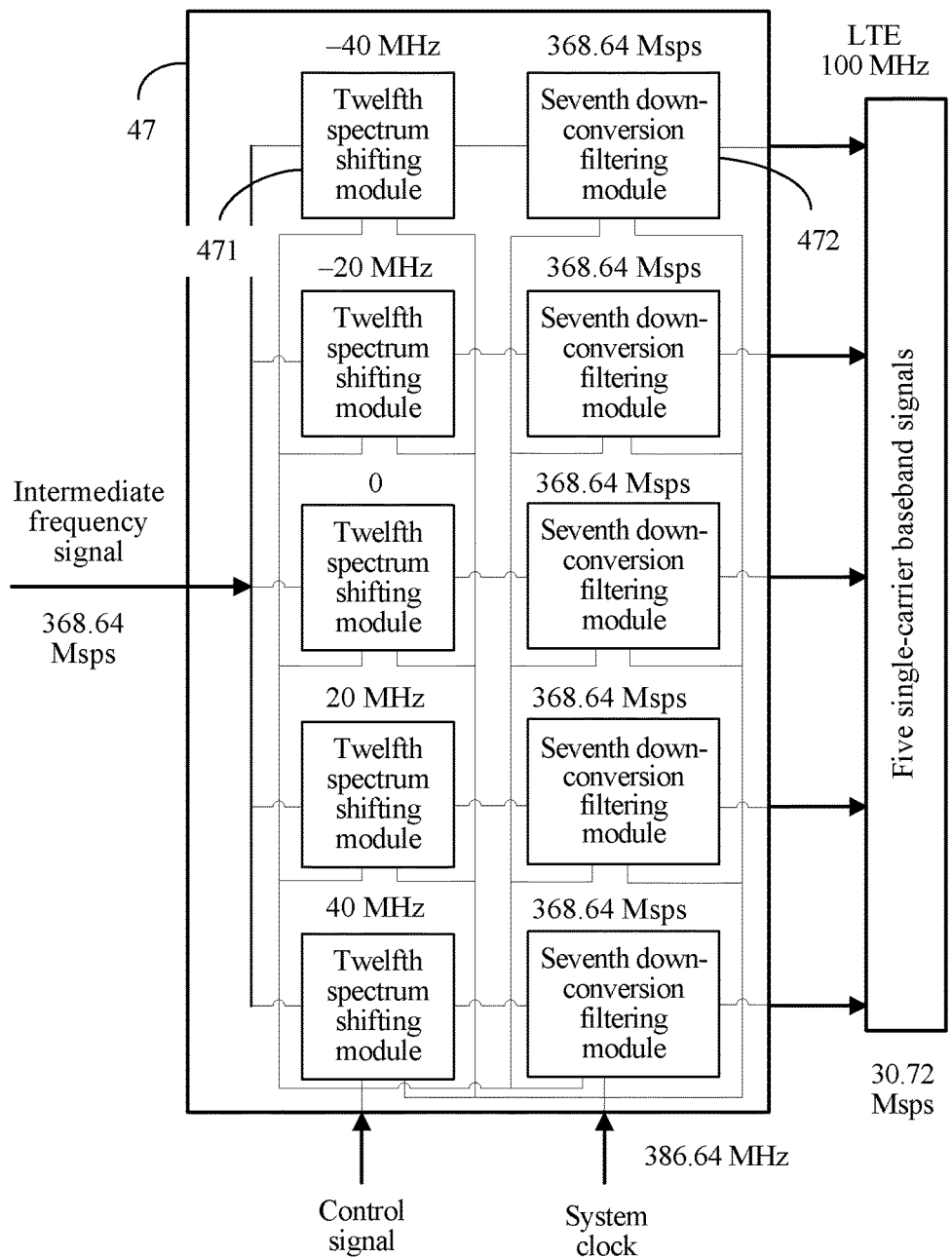
FIG. 19 is a schematic diagram of a post-processing circuit of the receiver in the case of 100 MHz according to the fourth embodiment of the present invention.
Figure 20A:
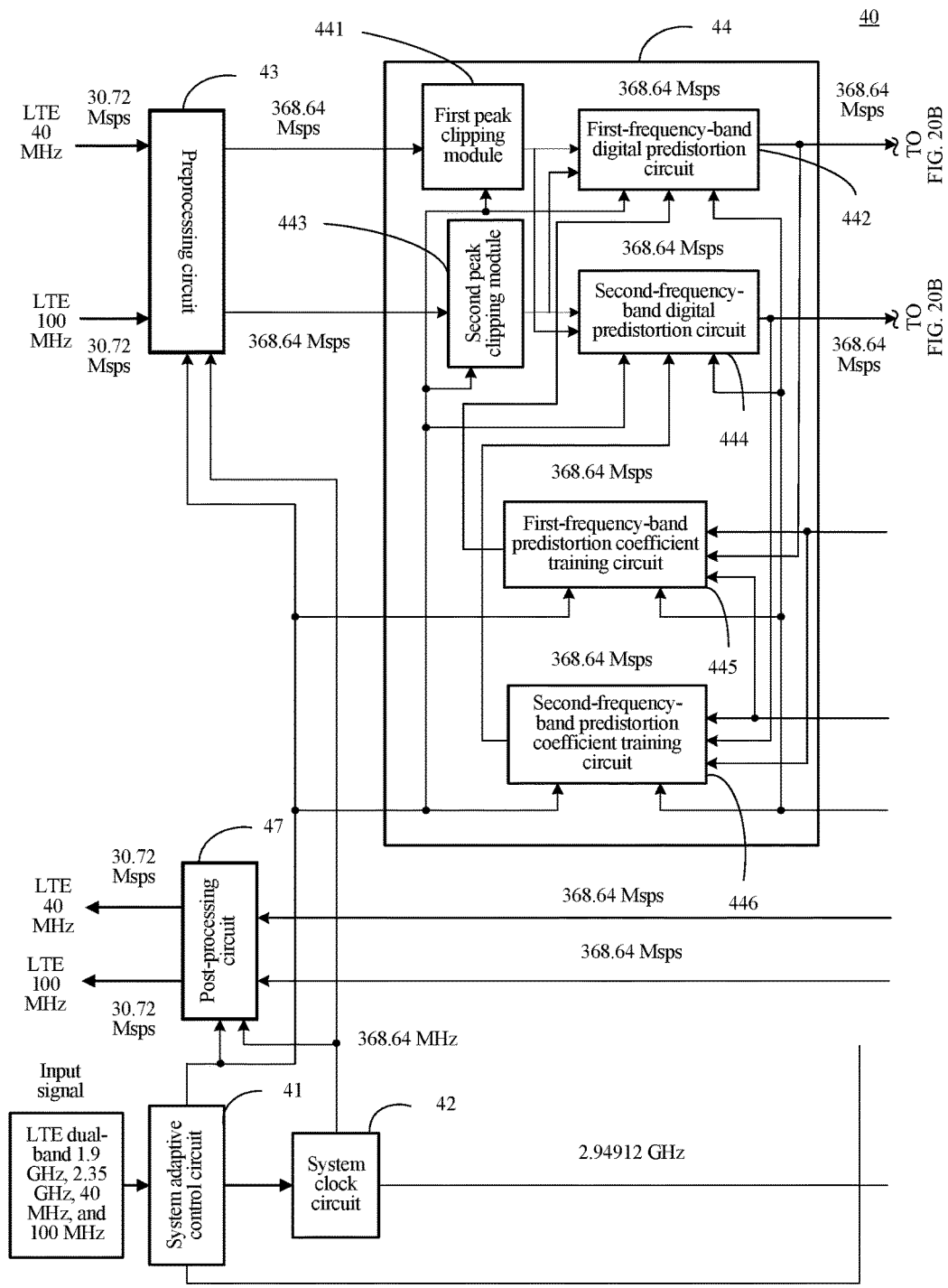
FIG. 20A to FIG. 20D are a schematic structural diagram of a transceiver according to the fourth embodiment of the present invention.
Figure 20B:
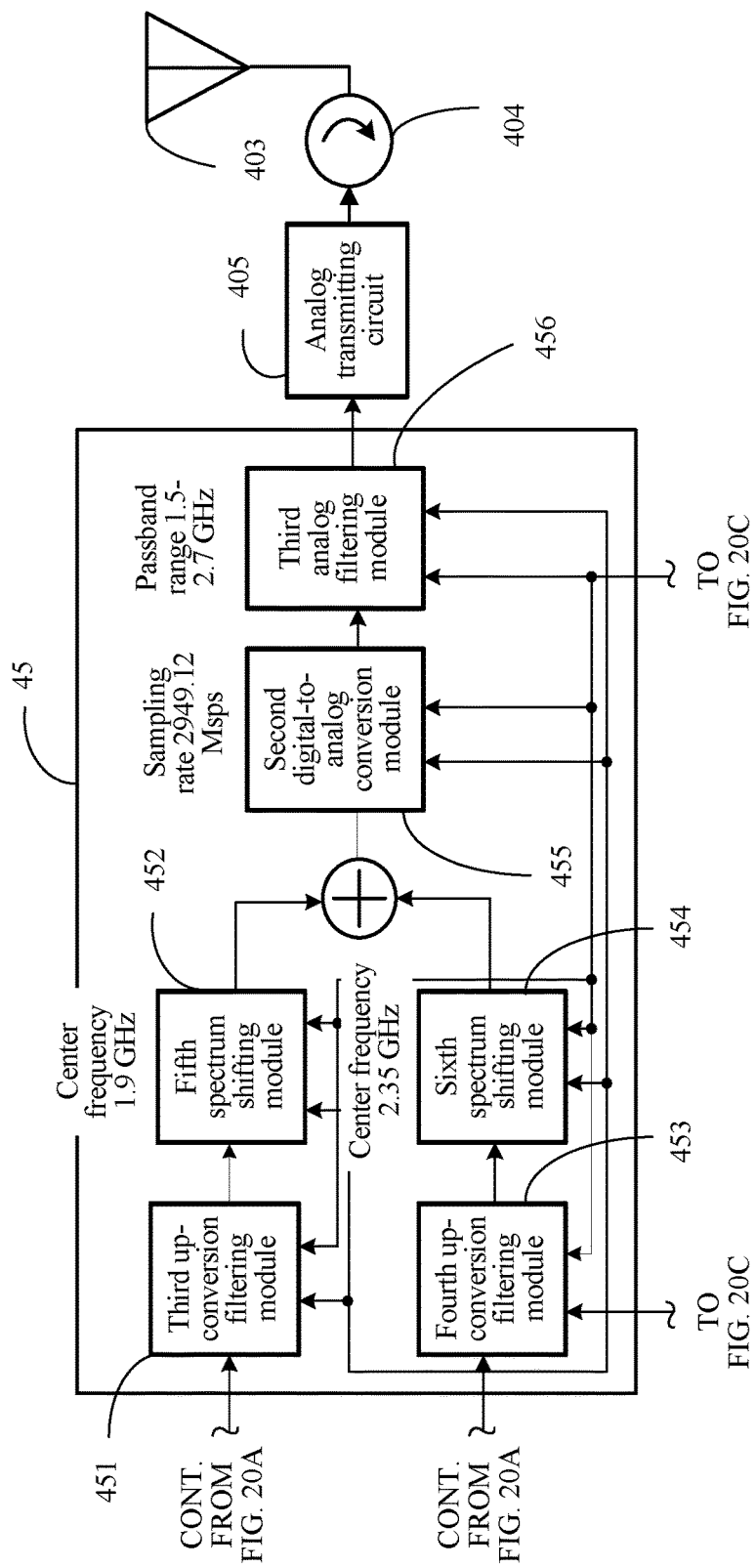
Figure 20C:
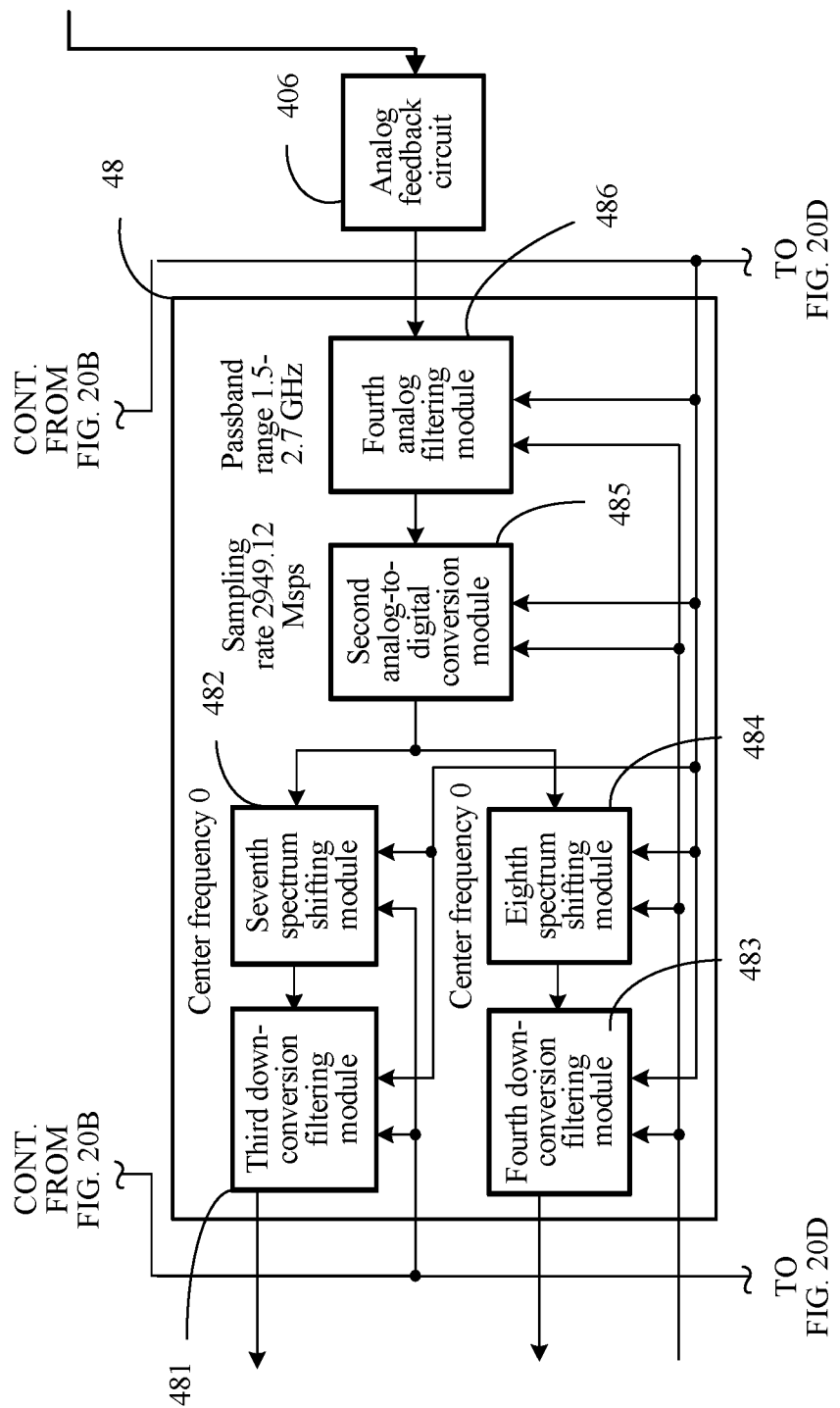
Figure 20D:
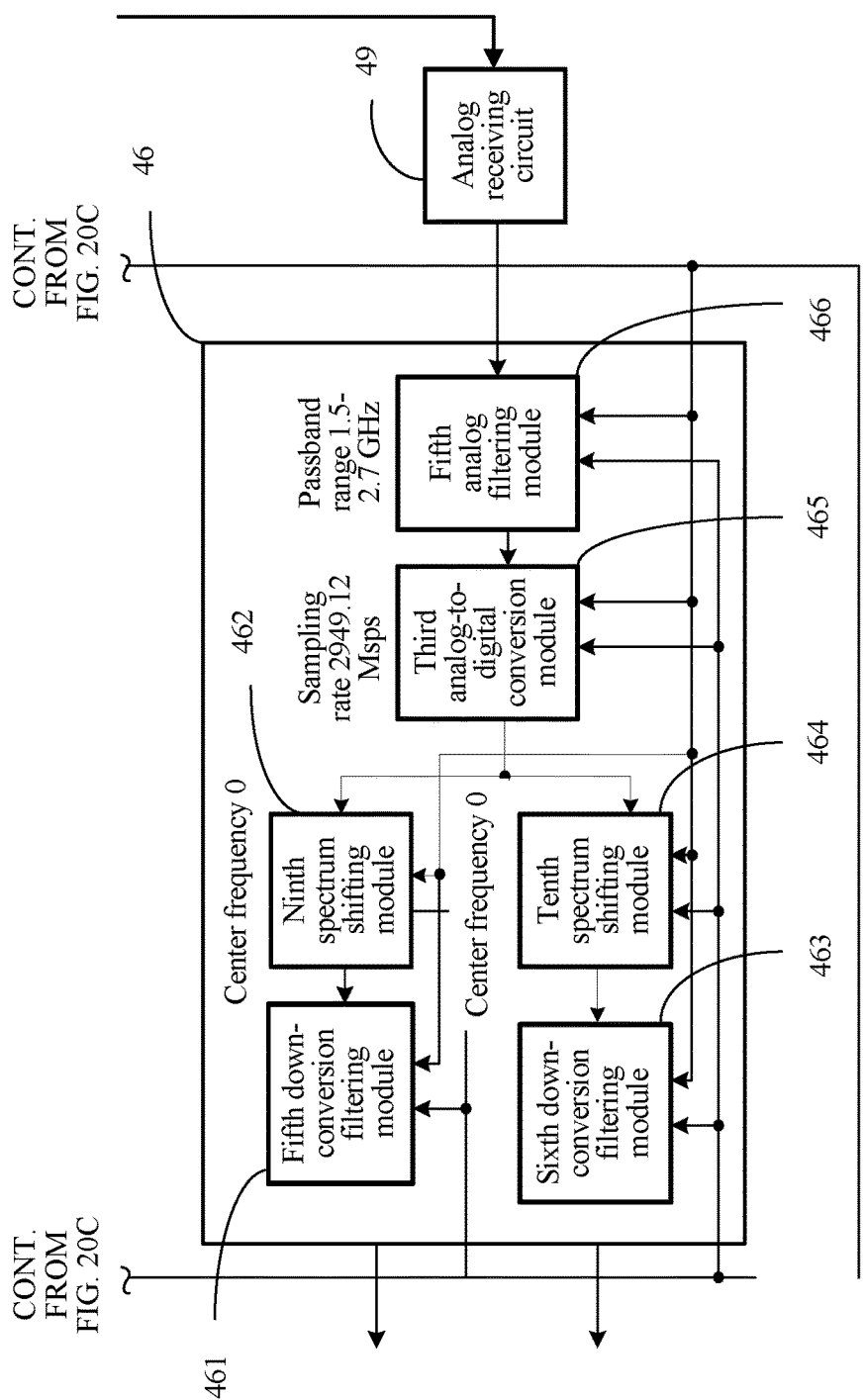

The post-processing circuit 47 is configured to process, according to the 368.64 MHz system clock and the control signal, the digital intermediate frequency signal generated by the receiving analog-to-digital conversion circuit 46, to generate a baseband signal. As shown in FIG. 18 and FIG. 19, the post-processing circuit 47 includes a twelfth spectrum shifting module 471 and a seventh down-conversion filtering module 472. Quantities of twelfth spectrum shifting modules 471 and seventh down-conversion filtering modules 472 are related to a bandwidth of the dual-band input signal and a bandwidth of the baseband signal. In this embodiment of the present invention, for the dual-band input signal, the bandwidth of the first frequency band is 40 MHz and the bandwidth of the second frequency band is 100 MHz. Therefore, the post-processing circuit 47 has seven twelfth spectrum shifting modules 471 and seven seventh down-conversion filtering modules 472. For the 40 MHz first frequency band, two twelfth spectrum shifting modules 471 perform signal splitting on the 40 MHz digital intermediate frequency signal, that is, separately perform spectrum shifting on the 40 MHz digital intermediate frequency signal, with center frequencies being [−10 MHz, 10 MHz]

respectively after spectrum shifting. Then two seventh down-conversion filtering modules 472 perform filtering on two signals, to filter out other carrier signals, so as to obtain two single-carrier signals. The two seventh down-conversion filtering modules 472 respectively perform 12× extraction on the two single-carrier signals, and down-convert the signals to the baseband processing rate 30.72 Msps, to generate baseband signals. A passband of a filter is [−9.015 MHz, 9.015 MHz], a stopband is [−10 MHz, 10 MHz], and an attenuation amount is 80 dBc. For the 100 MHz second frequency band, five twelfth spectrum shifting modules 471 perform signal splitting on the 100 MHz digital intermediate frequency signal, that is, separately perform spectrum shifting on the 100 MHz digital intermediate frequency signal, with center frequencies being [−40 MHz, −20 MHz, 0, 20 MHz, 40 MHz] respectively after spectrum shifting. Then five seventh down-conversion filtering modules 472 perform filtering on five signals, to filter out other carrier signals, so as to obtain five single-carrier signals. The five seventh down-conversion filtering modules 472 respectively perform 12× extraction on the five single-carrier signals, and down-convert the signals to the baseband processing rate 30.72 Msps, to generate baseband signals. A passband of a filter is also [−9.015 MHz, 9.015 MHz], a stopband is [−10 MHz, 10 MHz], and an attenuation amount is 80 dBc. In this way, configuration of the receiver 401 is completed.

As shown in FIG. 20A to FIG. 20D, the transmitter 400 and the receiver 401 may be integrated into a transceiver 40. An input signal is an LTE dual-band signal. A bandwidth of a first frequency band is 40 MHz, a center frequency of the first frequency band is 1.9 GHz, a bandwidth of a second frequency band is 100 MHz, and a center frequency of the second frequency band is 2.35 GHz. The system adaptive control circuit 41 generates a control signal according to frequency band information of the input signal, where the control signal includes configuration information required for reconfiguring the transceiver 40. The system clock circuit 42 generates a system clock according to the control signal generated by the system adaptive control circuit 41. For reconfiguration of the transceiver 40, refer to the transmitter 400 and the receiver 401, and details are not described herein again.

Figure 21A:
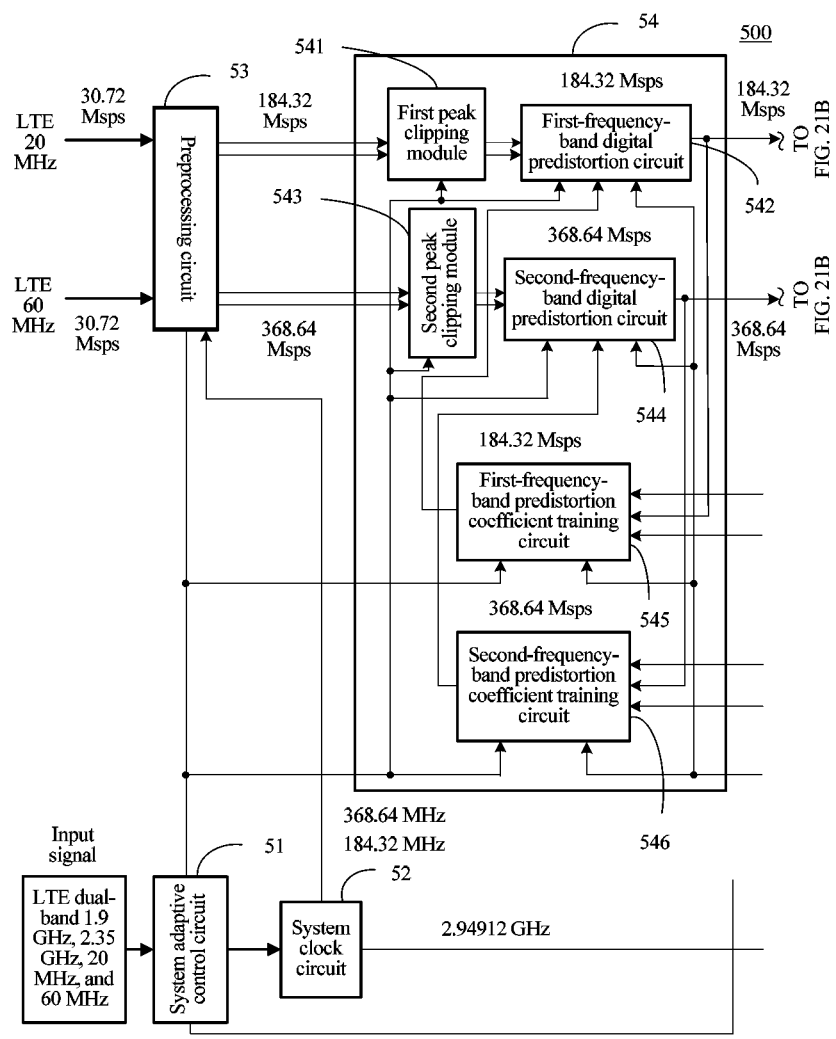
FIG. 21A to FIG. 21C are a schematic structural diagram of a transmitter according to a fifth embodiment of the present invention.
Figure 21B:
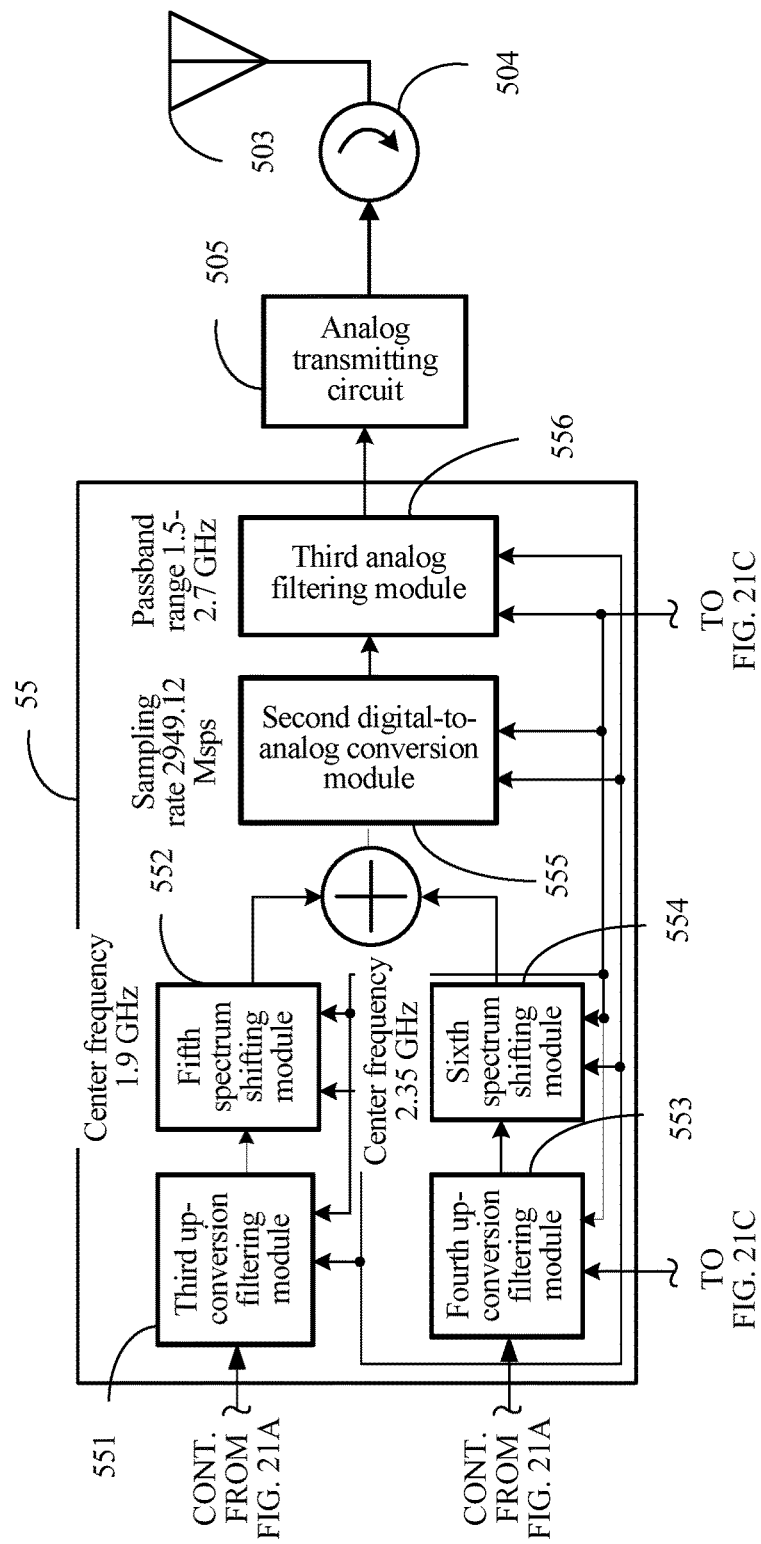
Figure 21C:
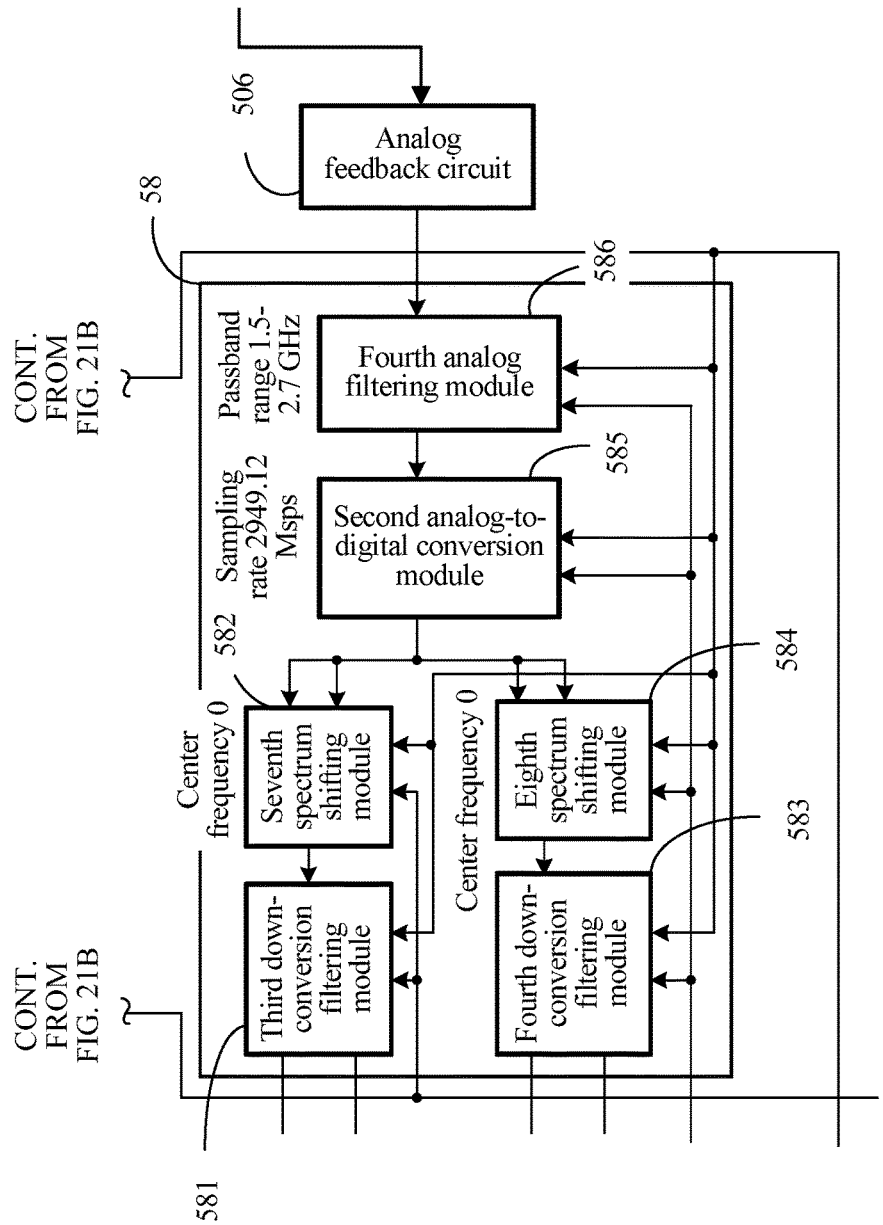

When a bandwidth of a first frequency band of an input signal changes to 20 MHz and a bandwidth of a second frequency band changes to 60 MHz, a transmitter needs to be reconfigured. As shown in FIG. 21A to FIG. 21C, a transmitter 500 includes: a system adaptive control circuit 51, a system clock circuit 52, a preprocessing circuit 53, a digital intermediate frequency processing circuit 54, a digital-to-analog conversion circuit 55, a feedback analog-to-digital conversion circuit 58, an antenna 503, a circulator 504, an analog transmitting circuit 505, and an analog feedback circuit 506. A process of reconfiguring the transmitter 500 is described as follows:

The system adaptive control circuit 51 generates a control signal according to frequency band information of the input signal. The control signal includes configuration information required for reconfiguring the transmitter 500. The configuration information includes at least one of the following: a system clock, or a digital intermediate frequency processing rate, or a digital-to-analog conversion sampling rate, or an analog-to-digital conversion sampling rate. Specifically, for the 20 MHz first frequency band, a digital intermediate frequency processing rate of the first frequency band is set to 184.32 Msps; for the 60 MHz second frequency band, a digital intermediate frequency processing rate of the second frequency band is set to 368.64 Msps; the digital-to-analog conversion sampling rate and the analog-to-digital conversion sampling rate that are corresponding to the two frequency bands are set to 2949.12 Msps. According to the three rates, three types of system clocks need to be output: a 184.32 MHz system clock, a 368.64 MHz system clock and a 2949.12 MHz system clock. Therefore, the system adaptive control circuit 51 separately generates different configuration information according to information about the foregoing two frequency bands, and may determine the foregoing configuration information by using a method such as table lookup or online computing, for adaptive control of another part of a system. The generated control signal may be a gating signal or a configuration signal. The system clock circuit 52 outputs three types of system clocks according to the control signal: a 184.32 MHz system clock, a 368.64 MHz system clock, and a 2949.12 MHz system clock.

Figure 22:
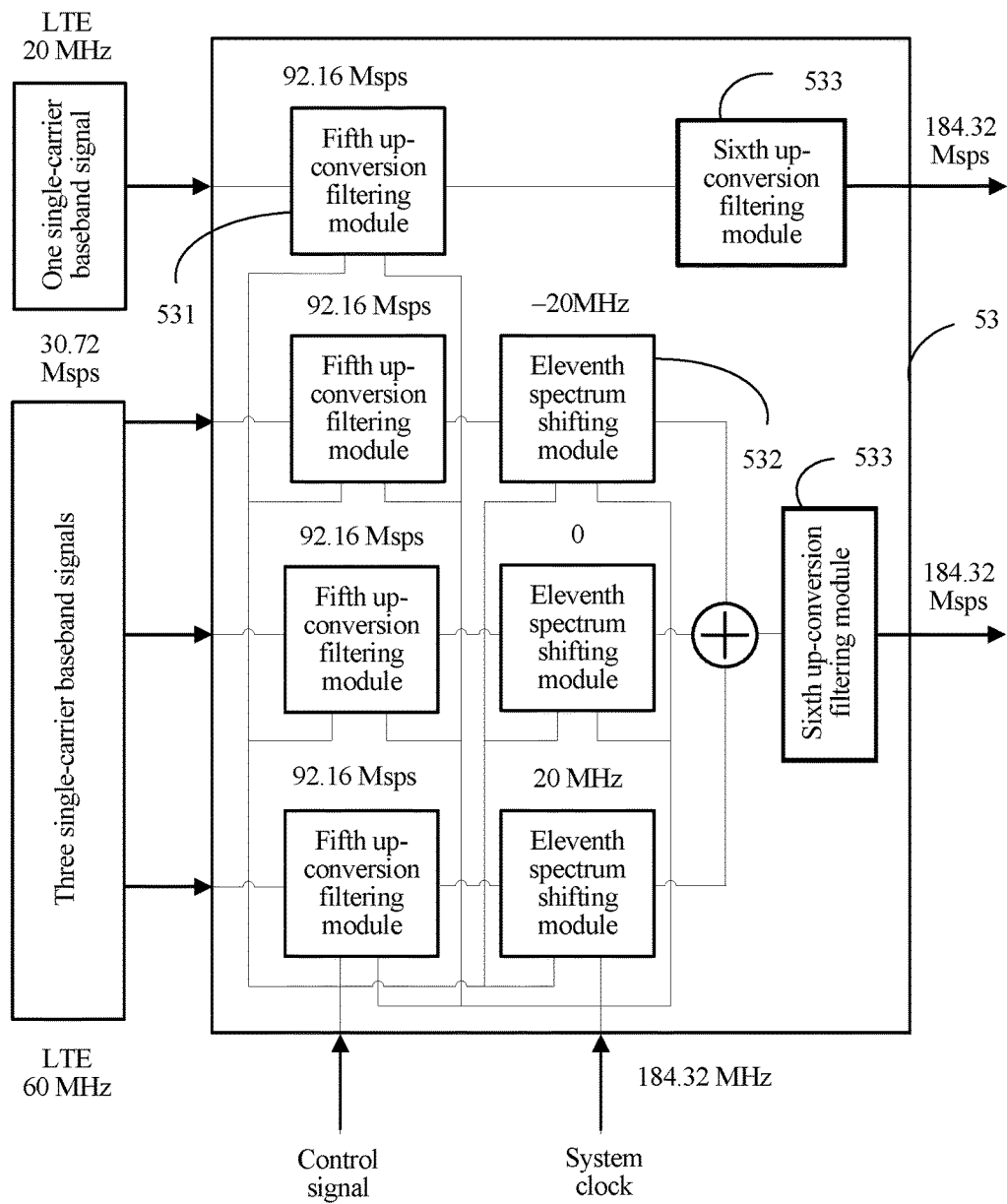
FIG. 22 is a schematic diagram of a preprocessing circuit of the transmitter in the case of 20 MHz according to the fifth embodiment of the present invention.
Figure 23:
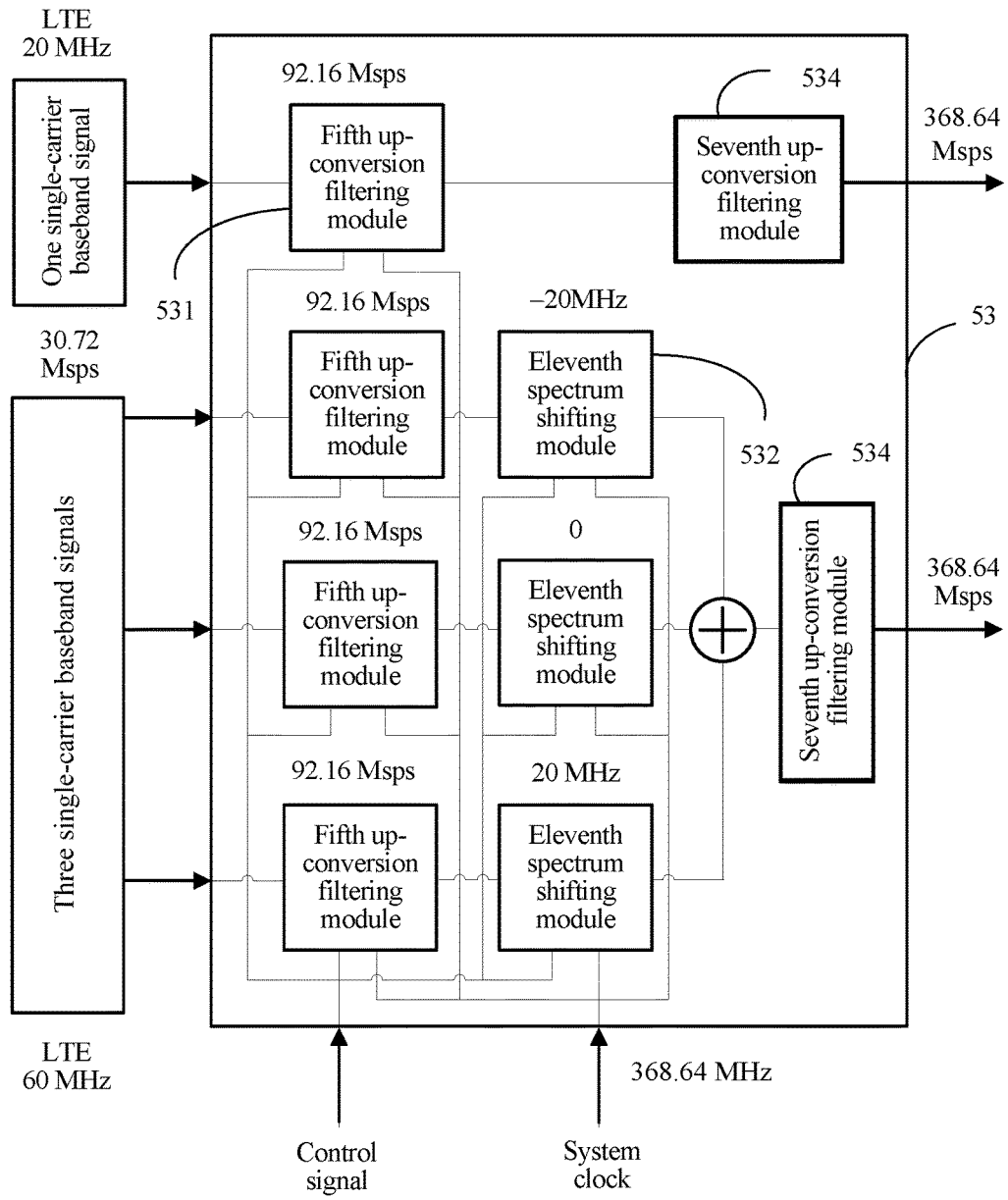
FIG. 23 is a schematic diagram of a preprocessing circuit of the transmitter in the case of 60 MHz according to the fifth embodiment of the present invention.

The preprocessing circuit 53 preprocesses a received baseband signal according to the system clock and the control signal, to generate a frequency band signal. If the system adaptive control circuit 51 separately generates different configuration information according to information about at least two frequency bands, the preprocessing circuit 53 is further configured to generate, according to a system clock corresponding to any baseband signal of at least two baseband signals and according to the control signal, a frequency band signal corresponding to the baseband signal. Specifically, the preprocessing circuit 53 separately up-converts the baseband signals to rates 184.32 Msps and 368.64 Msps according to the system clock and the control signal, so as to perform subsequent predistortion processing. As shown in FIG. 22 and FIG. 23, the preprocessing circuit 53 includes: a fifth up-conversion filtering module 531, an eleventh spectrum shifting module 532, a sixth up-conversion filtering module 533, and a seventh up-conversion filtering module 534. Quantities of fifth up-conversion filtering modules 531 and eleventh spectrum shifting modules 532 are related to a bandwidth of the dual-band input signal and a bandwidth of the baseband signal. In this embodiment of the present invention, for the dual-band input signal, the bandwidth of the first frequency band is 20 MHz, and the bandwidth of the second frequency band is 60 MHz. Therefore, the preprocessing circuit 53 has four fifth up-conversion filtering modules 531 and three eleventh spectrum shifting modules 532. Because the digital intermediate frequency processing rates of the two frequency bands are different, the preprocessing circuit 53 has two sixth up-conversion filtering modules 533 and two seventh up-conversion filtering modules 534. For the 20 MHz first frequency band, one fifth up-conversion filtering module 531 up-converts a baseband signal that is based on the first frequency band to a sampling rate 92.16 Msps by means of 3× upsampling, and performs filtering. A passband of a filter may be set to [−10 MHz, 10 MHz], a stopband is set to [−35 MHz, 35 MHz], and an attenuation amount is 80 dBc. Then one sixth up-conversion filtering module 533 up-converts a signal processed by the fifth up-conversion filtering module 531 to a sampling rate 184.32 Msps by means of 2× upsampling, and performs filtering, to generate a frequency band signal that is based on the first frequency band. A passband of a filter may be set to [−10 MHz, 10 MHz], a stopband is set to [−80 MHz, 80 MHz], and an attenuation amount is 80 dBc. Three fifth up-conversion filtering modules 531 up-convert baseband signals that are based on the second frequency band to the sampling rate 92.16 Msps by means of 3× upsampling, and perform filtering. A passband of a filter may be set to [−10 MHz, 10 MHz], a stopband is set to [−35 MHz, 35 MHz], and an attenuation amount is 80 dBc. Then three eleventh spectrum shifting modules 532 respectively shift three carriers to center frequencies [−20 MHz, 0, 20 MHz], and perform combining. A sixth up-conversion filtering module 533 up-converts a combined signal to the sampling rate 184.32 Msps by means of 2× upsampling, and performs filtering, to generate a frequency band signal related to the second frequency band. A passband of a filter may be set to [−30 MHz, 30 MHz], a stopband is set to [−60 MHz, 60 MHz], and an attenuation amount is 80 dBc. In this way, for the 20 MHz first frequency band, the preprocessing circuit 53 outputs two channels of frequency band signals whose sampling rates are both 184.32 Msps, so as to perform digital intermediate frequency processing. One of the two channels of frequency band signals is the frequency band signal related to the 60 MHz second frequency band. For the 60 MHz second frequency band, one fifth up-conversion filtering module 531 up-converts a baseband signal that is based on the first frequency band to the sampling rate 92.16 Msps by means of 3× upsampling, and performs filtering. A passband of a filter may be set to [−10 MHz, 10 MHz], a stopband is set to [−35 MHz, 35 MHz], and an attenuation amount is 80 dBc. Then one seventh up-conversion filtering module 534 up-converts a signal processed by the fifth up-conversion filtering module 531 to the sampling rate 368.64 Msps by means of 4× upsampling, and performs filtering, to generate a frequency band signal related to the first frequency band. A passband of a filter may be set to [−10 MHz, 10 MHz], a stopband is set to [−170 MHz, 170 MHz], and an attenuation amount is 80 dBc. Three fifth up-conversion filtering modules 531 up-convert baseband signals that are based on the second frequency band to the sampling rate 92.16 Msps by means of 3× upsampling, and perform filtering. A passband of a filter may be set to [−10 MHz, 10 MHz], a stopband is set to [−35 MHz, 35 MHz], and an attenuation amount is 80 dBc. Then three eleventh spectrum shifting modules 532 respectively shift three carriers to center frequencies [−20 MHz, 0, 20 MHz], and perform combining. Then a seventh up-conversion filtering module 534 up-converts a combined signal to the sampling rate 368.64 Msps by means of 4× upsampling, and performs filtering, to generate a frequency band signal that is based on the second frequency band. A passband of a filter may be set to [−30 MHz, 30 MHz], a stopband is set to [−150 MHz, 150 MHz], and an attenuation amount is 80 dBc. In this way, for the 60 MHz second frequency band, the preprocessing circuit 53 outputs two channels of frequency band signals whose sampling rates are both 368.64 Msps, so as to perform digital intermediate frequency processing. One of the two channels of frequency band signals is the frequency band signal related to the 20 MHz first frequency band.

The digital intermediate frequency processing circuit 54 processes, according to the system clock and the control signal, the frequency band signal generated by the preprocessing circuit 53, to generate a digital intermediate frequency signal that can be used for digital predistortion processing performed by the digital intermediate frequency processing circuit 54. Correspondingly, the digital intermediate frequency processing circuit 54 includes a digital predistortion coefficient training circuit and a digital predistortion circuit. The digital predistortion coefficient training circuit performs, according to the system clock and the control signal, digital predistortion coefficient training on a digital intermediate frequency signal generated by the feedback analog-to-digital conversion circuit 58, to generate a digital predistortion coefficient. The digital predistortion circuit performs, according to the system clock, the control signal, and the digital predistortion coefficient, digital predistortion processing on the frequency band signal generated by the preprocessing circuit 53, to generate the digital intermediate frequency signal. Specifically, the digital intermediate frequency processing circuit 54 includes a first peak clipping module 541, a first-frequency-band digital predistortion circuit 542, a second peak clipping module 543, a second-frequency-band digital predistortion circuit 544, a first-frequency-band digital predistortion coefficient training circuit 545, and a second-frequency-band digital predistortion coefficient training circuit 546. The first peak clipping module 541 performs, according to the 184.32 MHz system clock and the control signal, peak clipping processing on the two channels of frequency band signals that are generated by the preprocessing circuit 53 and that are based on the first frequency band. The first-frequency-band digital predistortion circuit 542 performs, according to the 184.32 MHz system clock, the control signal, and a predistortion coefficient generated by the first-frequency-band digital predistortion coefficient training circuit 545, digital predistortion processing on the two channels of frequency band signals obtained by means of peak clipping processing performed by the first peak clipping module 541, to generate one channel of digital intermediate frequency signal corresponding to the first frequency band. The digital predistortion coefficient is obtained after the first-frequency-band digital predistortion coefficient training circuit 545 performs, according to the 184.32 MHz system clock and the control signal, digital predistortion coefficient training on the digital intermediate frequency signal that is corresponding to the first frequency band and that is generated by the first-frequency-band digital predistortion circuit 542 and a digital intermediate frequency signal that is corresponding to the frequency band and that is generated by the feedback analog-to-digital conversion circuit 58. The second peak clipping module 543 performs, according to the 368.64 MHz system clock and the control signal, peak clipping processing on the two channels of frequency band signals that are generated by the preprocessing circuit 53 and that are based on the second frequency band. The second-frequency-band digital predistortion circuit 544 performs, according to the 368.64 MHz system clock, the control signal, and a predistortion coefficient generated by the second-frequency-band digital predistortion coefficient training circuit 546, digital predistortion processing on the two channels of frequency band signals obtained by means of peak clipping processing performed by the second peak clipping module 543, to generate one channel of digital intermediate frequency signal corresponding to the second frequency band. The digital predistortion coefficient is obtained after the second-frequency-band digital predistortion coefficient training circuit 546 performs, according to the 368.64 MHz system clock and the control signal, digital predistortion coefficient training on the digital intermediate frequency signal that is corresponding to the second frequency band and that is generated by the second-frequency-band digital predistortion circuit 544 and a digital signal that is corresponding to the frequency band and that is generated by the feedback analog-to-digital conversion circuit 58.

The digital-to-analog conversion circuit 55 is configured to process, according to the 2949.12 MHz system clock and the control signal, the digital intermediate frequency signal generated by the digital intermediate frequency processing circuit 54, to generate an analog signal. Specifically, the digital-to-analog conversion circuit 55 includes: a third up-conversion filtering module 551, a fifth spectrum shifting module 552, a fourth up-conversion filtering module 553, a sixth spectrum shifting module 554, a second digital-to-analog conversion module 555, and a third analog filtering module 556. For the 20 MHz first frequency band, the third up-conversion filtering module 551 up-converts the digital intermediate frequency signal corresponding to the first frequency band to a radio frequency processing rate according to the 2949.12 MHz system clock and the control signal, that is, up-converts 184.32 Msps to 2949.12 Msps. The radio frequency processing rate includes the digital-to-analog conversion sampling rate and the analog-to-digital conversion sampling rate. Specifically, the third up-conversion filtering module 551 first up-converts the digital intermediate frequency signal to the sampling rate 2949.12 Msps by means of 16× up-conversion, and then performs filtering. A passband of a filter is set to [−70 MHz, 70 MHz], a stopband is set to [−1350 MHz, 1350 MHz], and an attenuation amount is 80 dBc. The fifth spectrum shifting module 552 shifts a signal obtained by means of filtering to a center frequency of 1.9 GHz. For the 60 MHz second frequency band, the fourth up-conversion filtering module 553 up-converts the digital intermediate frequency signal corresponding to the second frequency band to the radio frequency processing rate according to the 2949.12 MHz system clock and the control signal, that is, up-converts 368.64 Msps to 2949.12 Msps. Specifically, the fourth up-conversion filtering module 553 first up-converts the digital intermediate frequency signal to the sampling rate 2949.12 Msps by means of 8× up-conversion, and then performs filtering. A passband of a filter is set to [−90 MHz, 90 MHz], a stopband is set to [−1350 MHz, 1350 MHz], and an attenuation amount is 80 dBc. The sixth spectrum shifting module 554 shifts a signal obtained by means of filtering to a center frequency of 2.35 GHz. The digital-to-analog conversion circuit 55 combines a signal that is output by the fifth spectrum shifting module 552 and that is based on the first frequency band and a signal that is output by the sixth spectrum shifting module 554 and that is based on the second frequency band. The second digital-to-analog conversion module 555 performs digital-to-analog conversion on a combined signal according to the 2949.12 MHz system clock and the control signal, to generate an analog signal. The third analog filtering module 556 performs filtering on the analog signal generated by the second digital-to-analog conversion module 555, to filter out a clock image. A passband of a filter is [1700 MHz, 2500 MHz], a stopband of the filter is [1500 MHz, 2900 MHz], and an attenuation amount of at least 30 dBc at the image is ensured. In this way, the digital-to-analog conversion circuit 55 converts the two channels of digital intermediate frequency signals into a dual-band analog signal. The analog transmitting circuit 505 performs analog processing, including amplification, filtering, and the like, on the dual-band analog signal generated by the digital-to-analog conversion circuit 55, and then transmits a processed analog signal by using the circulator 504 and the antenna 503.

In this embodiment of the present invention, a coupler (not shown in the figure) is further included ahead of the circulator 504, so as to feed, back to the analog feedback circuit 506, the analog signal output by the analog transmitting circuit 505. The feedback analog-to-digital conversion circuit 58 processes, according to the 2949.12 MHz system clock and the control signal, the fed-back dual-band analog signal, to generate a digital intermediate frequency signal. The feedback analog-to-digital conversion circuit 58 includes: a third down-conversion filtering module 581, a seventh spectrum shifting module 582, a fourth down-conversion filtering module 583, an eighth spectrum shifting module 584, a second analog-to-digital conversion module 585, and a fourth analog filtering module 586. The fourth analog filtering module 586 performs analog filtering on the fed-back analog signal. An analog filtering function is the same as that of the third analog filtering module 556, a parameter setting is also the same, and details are not described herein again. The second analog-to-digital conversion module 585 performs, according to the 2949.12 MHz system clock and the control signal, analog-to-digital conversion on an analog signal obtained by means of analog filtering processing. Because the digital intermediate frequency processing rates of the two frequency bands are different, the feedback analog-to-digital conversion circuit 58 needs to separately down-convert the signals of the two frequency bands to the rates 184.32 Msps and 368.64 Msps, so as to perform subsequent digital predistortion coefficient training. Specifically, for the 20 MHz first frequency band, the seventh spectrum shifting module 582 shifts, according to the 2949.12 MHz system clock and the control signal, a digital signal that is obtained by means of sampling and that is on a 1.9 GHz carrier to a zero frequency. The third down-conversion filtering module 581 down-converts the digital signal to the processing rate 184.32 Msps, and specifically, first performs filtering, and then performs 16× extraction, to generate a digital intermediate frequency signal corresponding to the first frequency band. A passband of a filter is set to [−70 MHz, 70 MHz], a stopband is set to [−90 MHz, 90 MHz], and an attenuation amount is 80 dBc. In addition, the seventh spectrum shifting module 582 further shifts a digital signal that is obtained by means of sampling and that is on a 2.35 GHz carrier to the zero frequency, down-converts the signal to the processing rate 184.32 Msps, and specifically, first performs filtering, and then performs 16× extraction, to generate a digital intermediate frequency signal related to the second frequency band. A passband of a filter is [−70 MHz, 70 MHz], a stopband is set to [−90 MHz, 90 MHz], and an attenuation amount is 80 dBc. The first-frequency-band predistortion coefficient training circuit 545 performs digital predistortion coefficient training on the foregoing two channels of digital intermediate frequency signals and the digital intermediate frequency signal that is generated by the first-frequency-band digital predistortion circuit 542 and that is corresponding to the first frequency band, so as to perform digital predistortion processing on the first-frequency-band signal. For the 60 MHz second frequency band, the eighth spectrum shifting module 584 shifts, according to the 2949.12 MHz system clock and the control signal, a digital signal that is obtained by means of sampling and that is on a 1.9 GHz carrier to the zero frequency. The fourth down-conversion filtering module 583 down-converts the digital signal to the processing rate 368.64 Msps, and specifically, first performs filtering, and then performs 8× extraction, to generate a digital intermediate frequency signal corresponding to the first frequency band. A passband of a filter is [−90 MHz, 90 MHz], a stopband is set to [−180 MHz, 180 MHz], and an attenuation amount is 80 dBc. In addition, the eighth spectrum shifting module 584 further shifts, according to the 2949.12 MHz system clock and the control signal, a digital signal that is obtained by means of sampling and that is on a 2.35 GHz carrier to the zero frequency. Then the fourth down-conversion filtering module 583 down-converts the digital signal to the processing rate 368.64 Msps, and specifically, first performs filtering, and then performs 8× extraction, to generate a digital intermediate frequency signal corresponding to the second frequency band. A passband of a filter is [−90 MHz, 90 MHz], a stopband is set to [−180 MHz, 180 MHz], and an attenuation amount is 80 dBc. The second-frequency-band predistortion coefficient training circuit 546 performs digital predistortion coefficient training on the foregoing two channels of digital intermediate frequency signals and the digital intermediate frequency signal that is generated by the second-frequency-band digital predistortion circuit 544 and that is corresponding to the second frequency band, so as to perform digital predistortion processing on the second-frequency-band signal. In this way, configuration of the transmitter 500 is completed. In this embodiment of the present invention, the transmitter 500 uses a direct radio frequency architecture, and certainly, another radio frequency architecture may be used in another embodiment of the present invention. In this way, reconfiguration of the transmitter 500 is completed, and after reconfiguration, the digital intermediate frequency processing rate of the first frequency band decreases from the original 368.64 Msps to 184.32 Msps, a processing rate is greatly reduced, and implementation is simpler. It can be seen that, according to the present application, a system clock and a digital intermediate frequency processing rate can be flexibly configured according to carriers, bandwidths, and the like of different frequency band signals, so that each frequency band signal is processed at a lowest possible digital intermediate frequency processing rate, which can effectively reduce a digital intermediate frequency processing rate, reduce a system delay, and save resources while ensuring processing performance.

Figure 24:
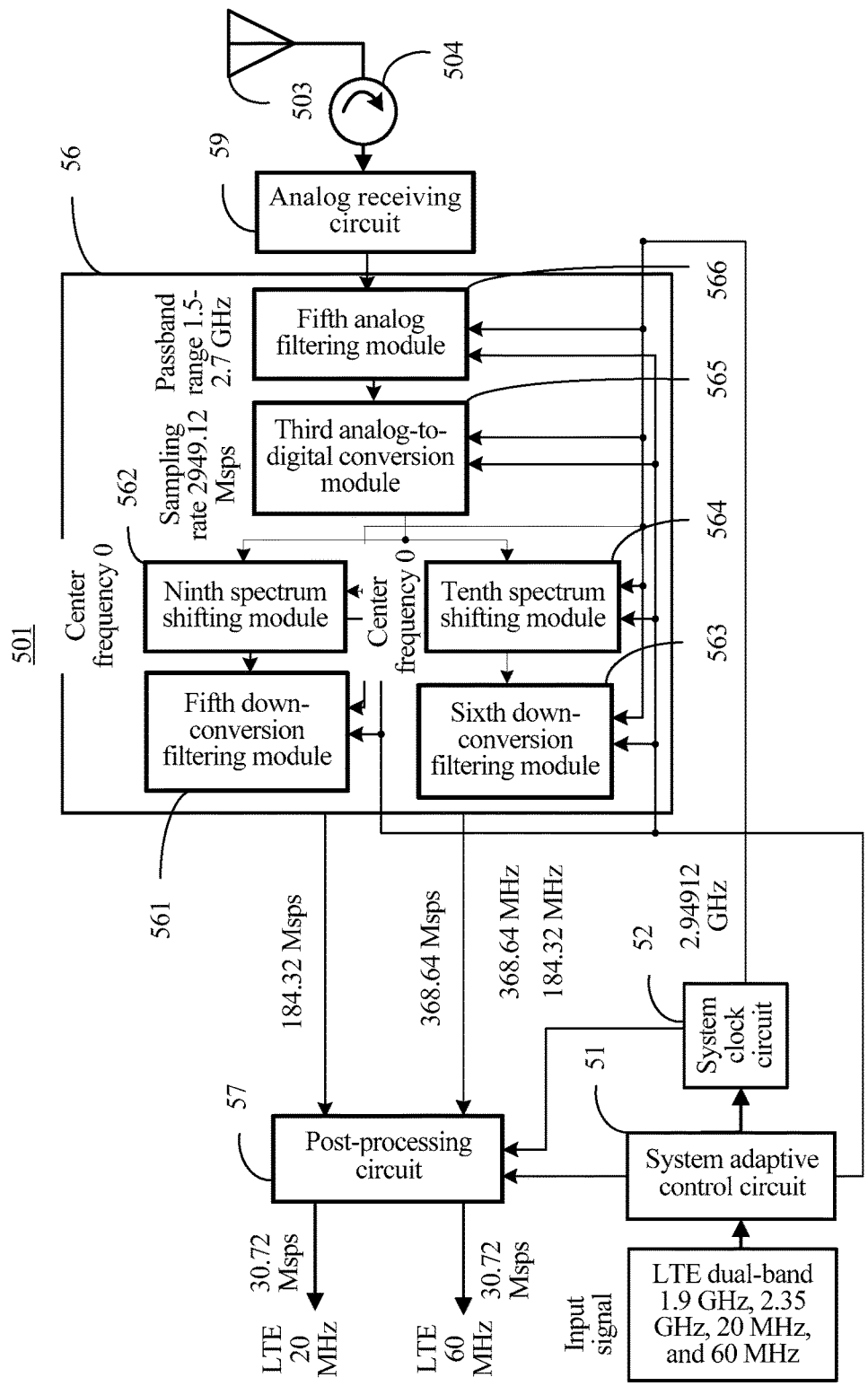
FIG. 24 is a schematic structural diagram of a receiver according to the fifth embodiment of the present invention.

When a bandwidth of a first frequency band of an input signal changes to 20 MHz and a bandwidth of a second frequency band changes to 60 MHz, a receiver is reconfigured, and analog-to-digital conversion sampling rates of the two frequency bands are set to 2949.12 Msps. As shown in FIG. 24, a receiver 501 includes: a system adaptive control circuit 51, a system clock circuit 52, a receiving analog-to-digital conversion circuit 56, a post-processing circuit 57, an analog receiving circuit 59, an antenna 503, and a circulator 504. A process of reconfiguring the receiver 501 is described as follows:

Same as the transmitter 500, the system adaptive control circuit 51 generates a control signal according to frequency band information of the input signal. The control signal includes configuration information required for reconfiguring the receiver 501. The configuration information includes at least one of the following: a system clock, or a digital intermediate frequency processing rate, or a digital-to-analog conversion sampling rate, or an analog-to-digital conversion sampling rate. Specifically, in this embodiment, the control signal generated by the system adaptive control circuit 51 includes a digital intermediate frequency processing rate 184.32 Msps applied to the 20 MHz first frequency band, a digital intermediate frequency processing rate 368.64 Msps applied to the 60 MHz second frequency band, and an analog-to-digital conversion sampling rate 2949.12 Msps, which are used for adaptive control of another part of the receiver 501. The system clock circuit 52 outputs three types of system clocks according to the control signal: a 184.32 MHz system clock, a 368.64 MHz system clock, and a 2949.12 MHz system clock.

When the receiver 501 receives a signal, a dual-band analog signal received by using the antenna 503 is transmitted to the analog receiving circuit 59 through the circulator 504, and the analog receiving circuit 59 performs analog processing, including filtering, amplification, and the like, on the received dual-band analog signal. The receiving analog-to-digital conversion circuit 56 processes, according to the 2949.12 MHz system clock and the control signal, the dual-band analog signal received by the analog receiving circuit 59, to generate a digital intermediate frequency signal. The receiving analog-to-digital conversion circuit 56 includes: a fifth down-conversion filtering module 561, a ninth spectrum shifting module 562, a sixth down-conversion filtering module 563, a tenth spectrum shifting module 564, a third analog-to-digital conversion circuit 565, and a fifth analog filtering module 566. The fifth analog filtering module 566 performs analog filtering on the dual-band analog signal received by the analog receiving circuit 59. An analog filtering function is the same as that of the third analog filtering module 556, a parameter setting is also the same, and details are not described herein again. The third analog-to-digital conversion circuit 565 performs, according to the 2949.12 MHz system clock and the control signal, analog-to-digital conversion on an analog signal obtained by means of analog filtering processing performed by the fifth analog filtering module 566. The ninth spectrum shifting module 562 shifts, according to the 2949.12 MHz system clock and the control signal, a digital signal that is obtained by means of sampling and that is on a 1.9 GHz carrier to a zero frequency. Then the fifth down-conversion filtering module 561 down-converts the digital signal to the processing rate 184.32 Msps, and specifically, first performs filtering, and then performs 16× extraction, to obtain a digital intermediate frequency signal corresponding to the 20 MHz first frequency band. A passband of a filter is [−10 MHz, 10 MHz], a stopband is set to [−90 MHz, 90 MHz], an attenuation amount is 80 dBc. The ninth spectrum shifting module 562 further shifts, according to the 2949.12 MHz system clock and the control signal, a digital signal that is obtained by means of sampling and that is on a 2.35 GHz carrier to the zero frequency. Then the fifth down-conversion filtering module 561 down-converts the digital signal to the processing rate 368.64 Msps, and specifically, first performs filtering, and then performs 8× extraction, to obtain a digital intermediate frequency signal corresponding to the 60 MHz second frequency band. A passband of a filter is [−30 MHz, 30 MHz], a stopband is set to [−180 MHz, 180 MHz], an attenuation amount is 80 dBc. In this way, after processing the dual-band analog signal received by the analog receiving circuit 59, the receiving analog-to-digital conversion circuit 56 generates the two channels of digital intermediate frequency signals that are respectively based on 20 MHz and 60 MHz.

Figure 25:
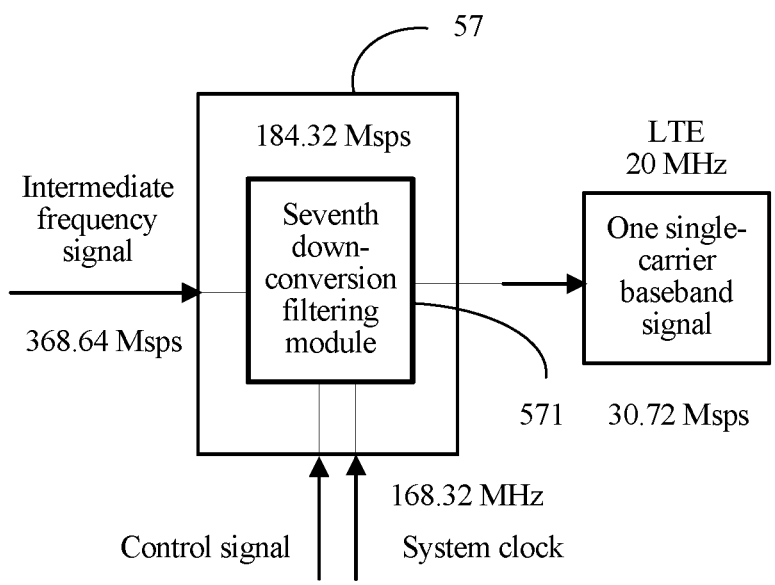
FIG. 25 is a schematic diagram of a post-processing circuit of a receiver in the case of 20 MHz according to the fifth embodiment of the present invention.
Figure 26:
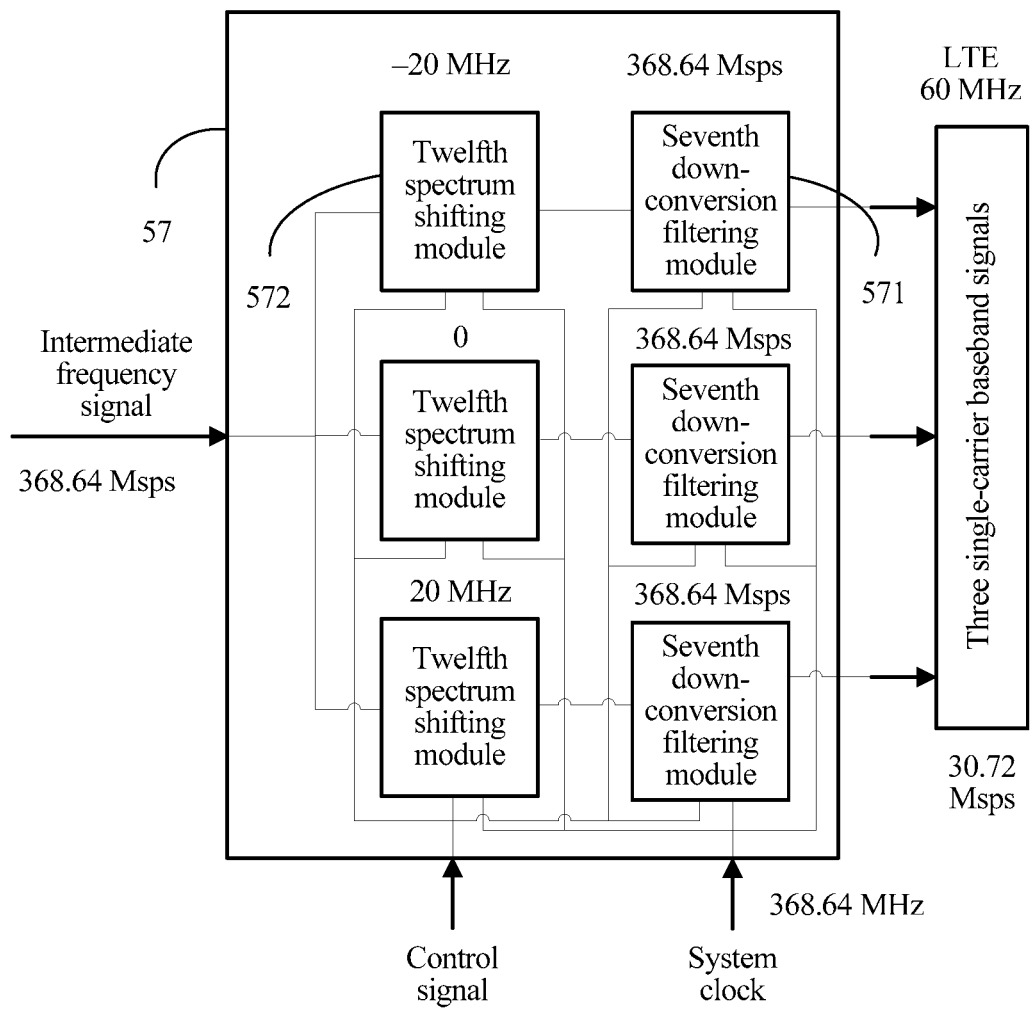
FIG. 26 is a schematic diagram of a post-processing circuit of a receiver in the case of 60 MHz according to the fifth embodiment of the present invention.
Figure 27A:
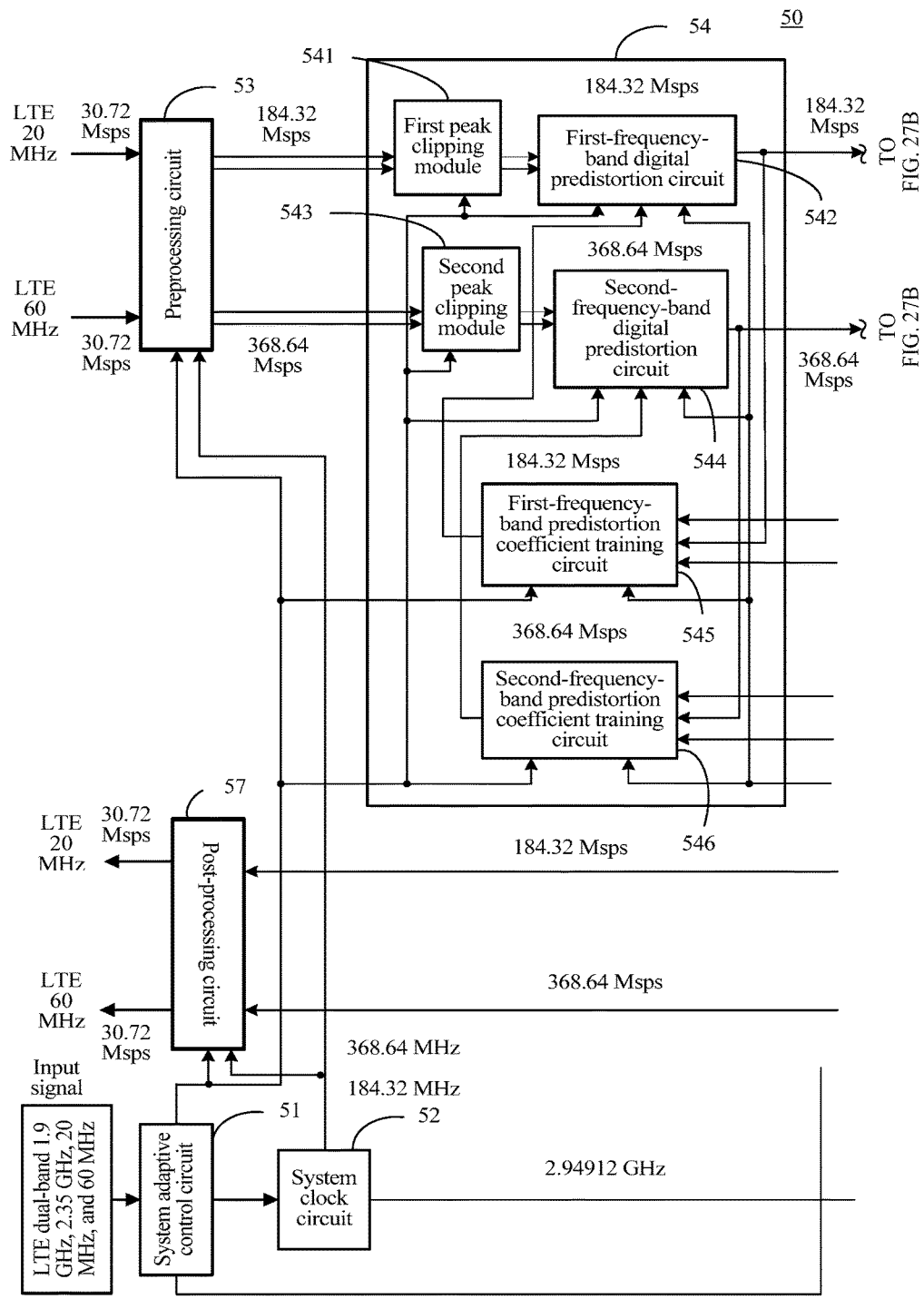
FIG. 27A to FIG. 27D are a schematic structural diagram of a transceiver according to the fifth embodiment of the present invention.
Figure 27B:
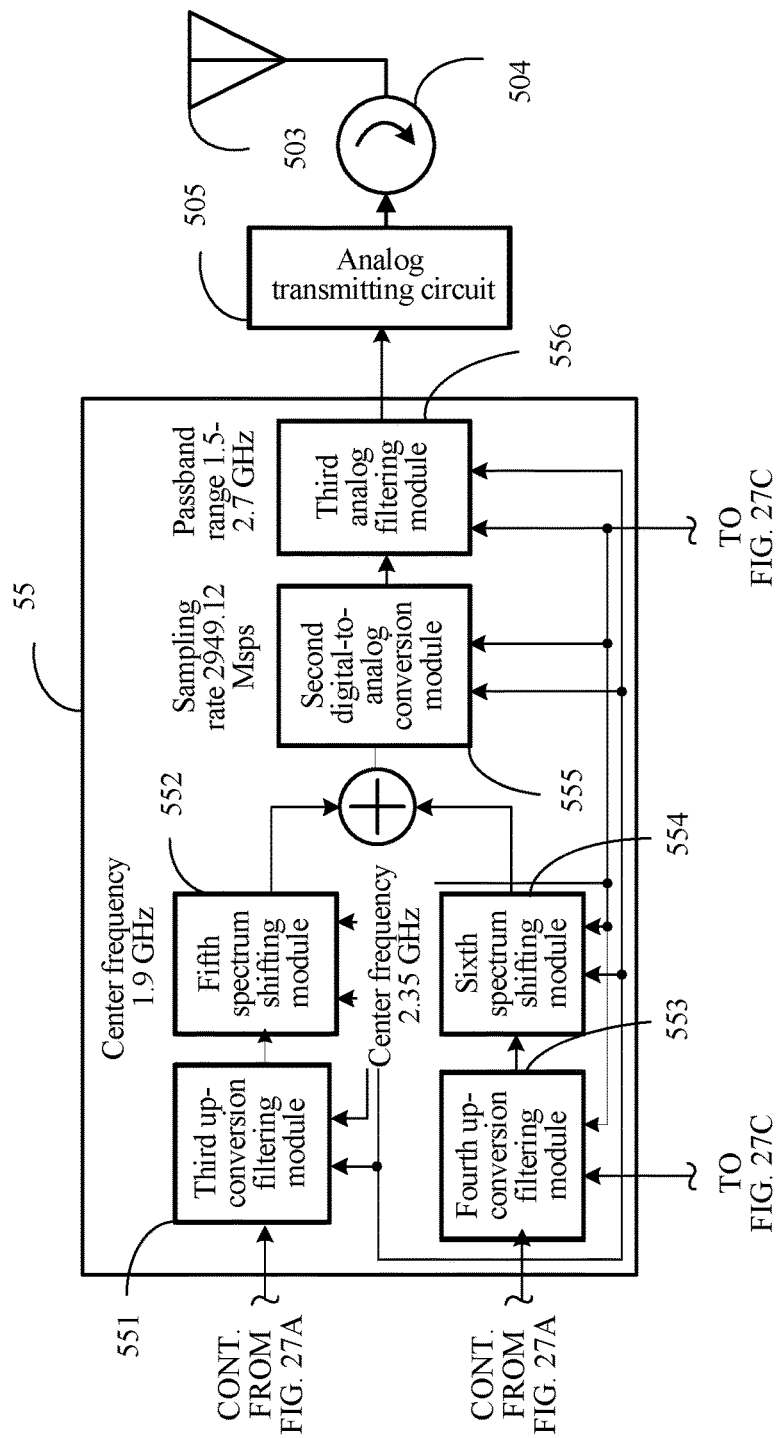
Figure 27C:
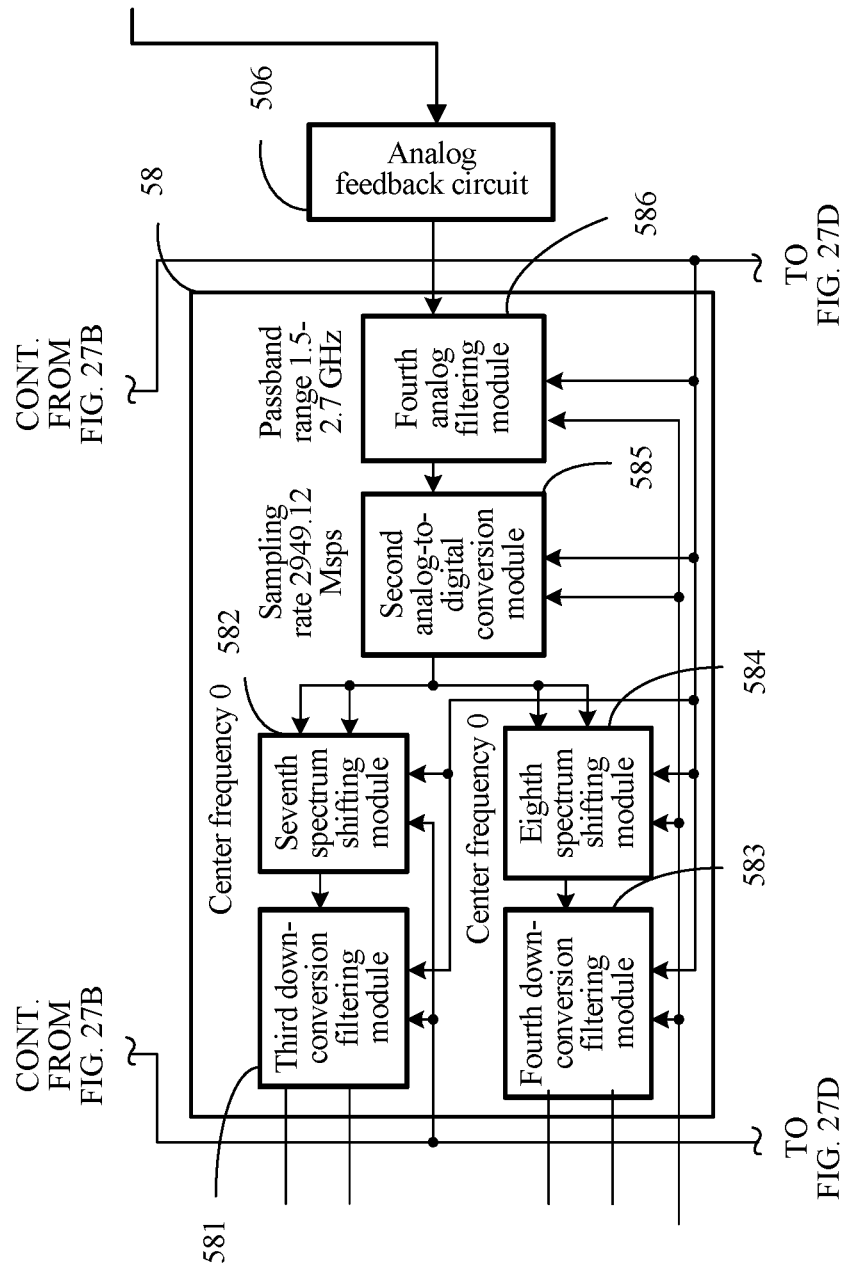
Figure 27D:
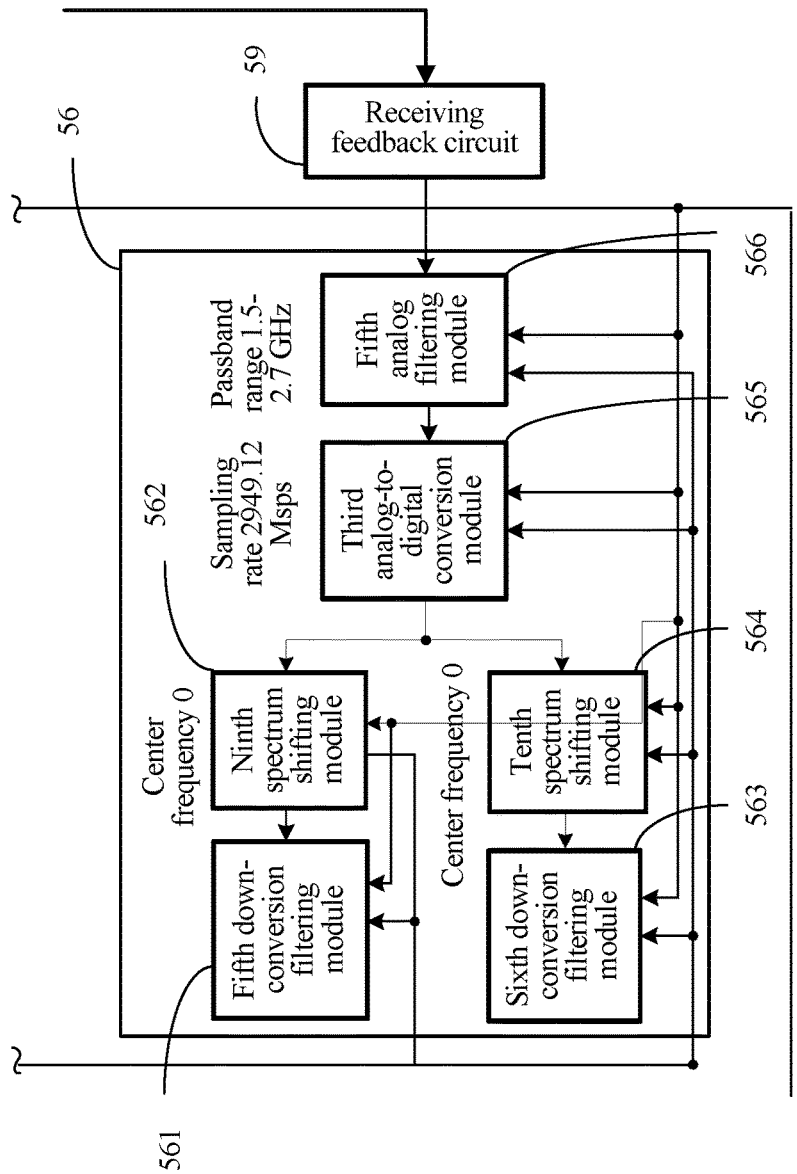

The post-processing circuit 57 is configured to process, according to the system clock and the control signal, the digital intermediate frequency signal generated by the receiving analog-to-digital conversion circuit 56, to generate a baseband signal. As shown in FIG. 25 and FIG. 26, the post-processing circuit 57 includes a seventh down-conversion filtering module 571 and a twelfth spectrum shifting module 572. Quantities of seventh down-conversion filtering modules 571 and twelfth spectrum shifting modules 572 are related to a bandwidth of the dual-band input signal and a bandwidth of the baseband signal. In this embodiment of the present invention, for the dual-band input signal, the bandwidth of the first frequency band is 20 MHz, and the bandwidth of the second frequency band is 60 MHz. Therefore, the post-processing circuit 57 has four seventh down-conversion filtering modules 571 and three twelfth spectrum shifting modules 572. For the 20 MHz first frequency band, a seventh down-conversion filtering module 571 performs filtering on the 20 MHz digital intermediate frequency signal according to the 184.32 MHz system clock and the control signal. A passband of a filter is [−9.015 MHz, 9.015 MHz], a stopband is [−10 MHz, 10 MHz], and an attenuation amount is 80 dBc. Then the seventh down-conversion filtering module 571 performs 6× extraction on a signal obtained by means of filtering, and down-converts the signal to the baseband processing rate 30.72 Msps, to generate a baseband signal. For the 60 MHz second frequency band, three twelfth spectrum shifting modules 572 perform signaling splitting on the 60 MHz digital intermediate frequency signal, that is, perform spectrum shifting on the 60 MHz digital intermediate frequency signal three times, with center frequencies being [−20 MHz, 0, 20 MHz] respectively after spectrum shifting, and then perform filtering on three signals, to filter out other carrier signals, so as to obtain three single-carrier signals. A passband of a filter is [−9.015 MHz, 9.015 MHz], a stopband is [−10 MHz, 10 MHz], and an attenuation amount is 80 dBc. Three seventh down-conversion filtering modules 571 respectively perform 12× extraction on the three single-carrier signals, and down-convert the signals to the baseband processing rate 30.72 Msps, to generate baseband signals. In this way, reconfiguration of the receiver 501 is completed, and after reconfiguration, the digital intermediate frequency processing rate of the first frequency band decreases from the original 368.64 Msps to 184.32 Msps, a processing rate is greatly reduced, and implementation is simpler. It can be seen that, according to the present application, a system clock and a digital intermediate frequency processing rate can be flexibly configured according to carriers, bandwidths, and the like of different frequency band signals, so that each frequency band signal is processed at a lowest possible digital intermediate frequency processing rate, which can effectively reduce a digital intermediate frequency processing rate, reduce a system delay, and save resources while ensuring processing performance.

As shown in FIG. 27A to FIG. 27D, the transmitter 500 and the receiver 501 may be integrated into a transceiver 50. An input signal is an LTE dual-band signal. A bandwidth of a first frequency band is 20 MHz, a center frequency of the first frequency band is 1.9 GHz, a bandwidth of a second frequency band is 60 MHz, and a center frequency of the second frequency band is 2.35 GHz. The system adaptive control circuit 51 generates a control signal according to frequency band information of the input signal, where the control signal includes configuration information required for reconfiguring the transceiver 50. The system clock circuit 52 generates a system clock according to the control signal generated by the system adaptive control circuit 51. For reconfiguration of the transceiver 50, refer to the transmitter 500 and the receiver 501, and details are not described herein again.

Figure 28:
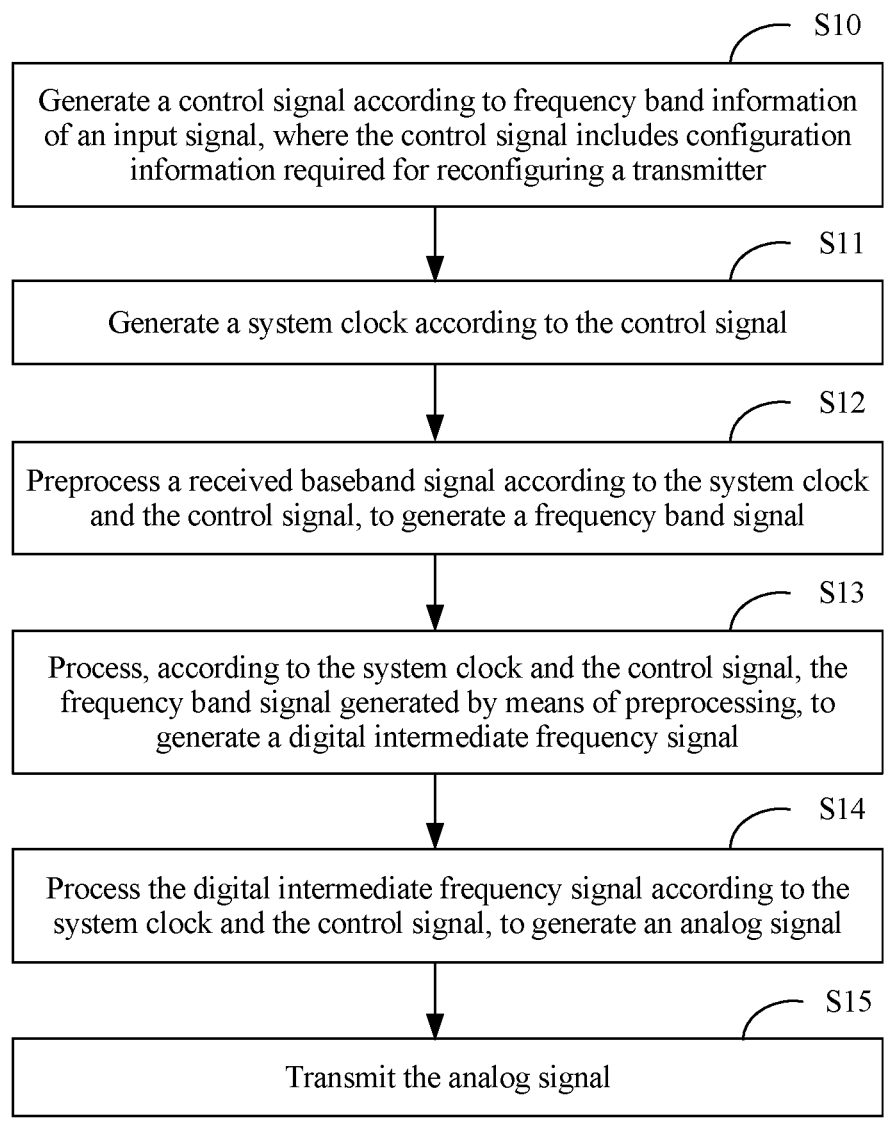
FIG. 28 is a schematic flowchart of a method for reconfiguring a transmitter according to the first embodiment of the present invention.

Referring to FIG. 28, FIG. 28 is a schematic flowchart of a method for reconfiguring a transmitter according to the first embodiment of the present invention. As shown in FIG. 28, the method for reconfiguring a transmitter includes the following steps.

S10: Generate a control signal according to frequency band information of an input signal, where the control signal includes configuration information required for reconfiguring the transmitter.

In this embodiment of the present invention, the frequency band information of the input signal includes frequency band information of at least one frequency band, that is, the input signal may be a single-band signal, or a dual-band signal, or even a multiband signal. The control signal may be a gating signal or a configuration signal. The configuration information required for reconfiguring the transmitter includes at least one of the following: a system clock, or a digital intermediate frequency processing rate, or a digital-to-analog conversion sampling rate, or an analog-to-digital conversion sampling rate. If the frequency band information of the input signal includes frequency band information of at least two frequency bands, configuration information is separately generated according to the frequency band information of the at least two frequency bands, and digital intermediate frequency processing rates may be the same or different. For example, the input signal is an LTE dual-band signal. For the input signal, if a bandwidth of a first frequency band is 40 MHz, a center frequency of the first frequency band is 1.9 GHz, a bandwidth of a second frequency band is 100 MHz, and a center frequency of the second frequency band is 2.35 GHz, for the 40 MHz first frequency band, a digital intermediate frequency processing rate may be set to 368.64 Msps, and a digital-to-analog conversion sampling rate and an analog-to-digital conversion sampling rate may be set to 2949.12 Msps; for the 100 MHz second frequency band, a digital intermediate frequency processing rate may be set to 368.64 Msps, and a digital-to-analog conversion sampling rate and an analog-to-digital conversion sampling rate may be set to 2949.12 Msps. For the input signal, if a bandwidth of a first frequency band is 20 MHz, a center frequency of the first frequency band is 1.9 GHz, a bandwidth of a second frequency band is 60 MHz, and a center frequency of the second frequency band is 2.35 GHz, for the 20 MHz first frequency band, a digital intermediate frequency processing rate may be set to 184.32 Msps, and a digital-to-analog conversion sampling rate and an analog-to-digital conversion sampling rate may be set to 2949.12 Msps; for the 60 MHz second frequency band, a digital intermediate frequency processing rate may be set to 368.64 Msps, and a digital-to-analog conversion sampling rate and an analog-to-digital conversion sampling rate may be set to 2949.12 Msps.

S11: Generate a system clock according to the control signal.

The system clock includes a clock required for preprocessing and digital intermediate frequency processing and a clock required for digital-to-analog conversion and analog-to-digital conversion. For example, for the input signal, if a bandwidth of a first frequency band is 20 MHz, a center frequency of the first frequency band is 1.9 GHz, a bandwidth of a second frequency band is 60 MHz, and a center frequency of the second frequency band is 2.35 GHz, three system clocks are generated: a 184.32 MHz system clock, a 368.64 MHz system clock, and a 2949.12 MHz system clock. The 184.32 MHz system clock and the 368.64 MHz system clock are respectively used for digital intermediate frequency processing of the 20 MHz first frequency band and the 60 MHz second frequency band, and the 2949.12 MHz system clock is used for digital-to-analog conversion and analog-to-digital conversion of the two frequency bands.

S12: Preprocess a received baseband signal according to the system clock and the control signal, to generate a frequency band signal.

Preprocessing includes processing such as up-conversion and filtering. If in S10, different configuration information is separately generated according to information about at least two frequency bands, in S12, according to a system clock corresponding to any baseband signal of at least two baseband signals and according to the control signal, a frequency band signal corresponding to the baseband signal is generated.

S13: Process, according to the system clock and the control signal, the frequency band signal generated by means of preprocessing, to generate a digital intermediate frequency signal.

In S13, processing such as peak clipping is mainly performed, according to the system clock and the control signal, on the frequency band signal generated by means of preprocessing.

If predistortion processing is performed on the signal, in S13, a fed-back analog signal is converted into a digital signal according to the system clock and the control signal, and is down-converted into a digital intermediate frequency signal. In addition, digital predistortion processing and digital predistortion coefficient training may be further performed. Specifically, a fed-back analog signal is processed according to the system clock and the control signal, to generate a digital intermediate frequency signal; digital predistortion coefficient training is performed on the digital intermediate frequency signal according to the system clock and the control signal, to generate a digital predistortion coefficient; and digital predistortion processing is performed, according to the system clock, the control signal, and the digital predistortion coefficient, on the frequency band signal generated in S12, to generate the digital intermediate frequency signal.

S14: Process the digital intermediate frequency signal according to the system clock and the control signal, to generate an analog signal.

In S14, the digital intermediate frequency signal is up-converted to a required digital-to-analog conversion sampling rate according to the system clock and the control signal, then spectrum shifting to a working center frequency of a corresponding frequency band is performed, and digital-to-analog conversion and analog filtering are performed, to generate the analog signal. If the frequency band information of the input signal includes frequency band information of at least two frequency bands, digital intermediate frequency signals of corresponding frequency bands are separately up-converted, according to the system clock and the control signal, digital-to-analog conversion sampling rates required by the corresponding frequency bands, and spectrum shifting is performed, and then signals of different frequency bands are combined, to obtain a dual-band or multiband signal, and then digital-to-analog conversion and analog filtering are performed, to generate the analog signal. For signals of different frequency bands, digital-to-analog conversion sampling rates of the signals may be the same or different.

S15: Transmit the analog signal.

Analog processing such as amplification and filtering is performed on the analog signal generated by means of analog filtering, and then a processed analog signal is transmitted by using the circulator and the antenna. In this way, reconfiguration of the transmitter is completed. It can be seen that, according to the present application, a system clock and a digital intermediate frequency processing rate can be flexibly configured according to carriers, bandwidths, and the like of different frequency band signals, so that each frequency band signal is processed at a lowest possible digital intermediate frequency processing rate, which can effectively reduce a digital intermediate frequency processing rate, reduce a system delay, and save resources while ensuring processing performance.

Figure 29:
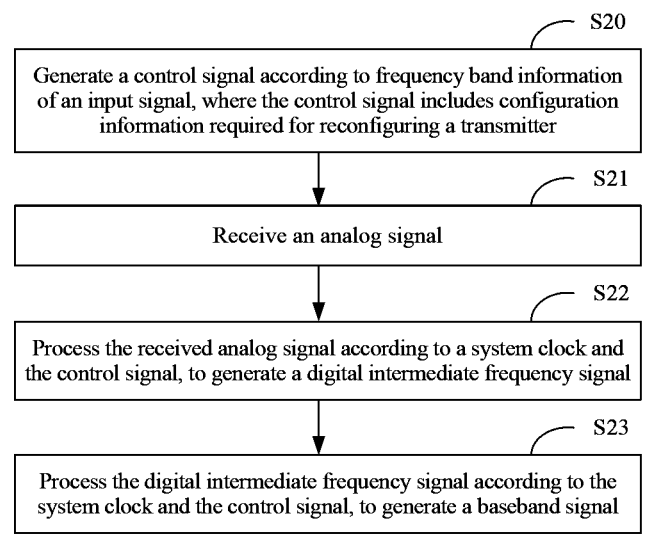
FIG. 29 is a schematic flowchart of a method for reconfiguring a receiver according to the first embodiment of the present invention.

Referring to FIG. 29, FIG. 29 is a schematic flowchart of a method for reconfiguring a receiver according to the first embodiment of the present invention. As shown in FIG. 29, the method for reconfiguring a receiver includes the following steps.

S20: Generate a control signal according to frequency band information of an input signal, where the control signal includes configuration information required for reconfiguring the receiver.

The frequency band information of the input signal includes frequency band information of at least one frequency band, that is, the input signal may be a single-band signal, or a dual-band signal, or even a multiband signal. The control signal may be a gating signal or a configuration signal. The configuration information required for reconfiguring the receiver includes at least one of the following: a system clock, or a digital intermediate frequency processing rate, or a digital-to-analog conversion sampling rate, or an analog-to-digital conversion sampling rate. If the frequency band information of the input signal includes frequency band information of at least two frequency bands, configuration information is separately generated according to the frequency band information of the at least two frequency bands, and digital intermediate frequency processing rates may be the same or different.

Generate a system clock according to the control signal.

The system clock includes a clock required for preprocessing and digital intermediate frequency processing and a clock required for digital-to-analog conversion. For example, for the input signal, if a bandwidth of a first frequency band is 20 MHz, a center frequency of the first frequency band is 1.9 GHz, a bandwidth of a second frequency band is 60 MHz, and a center frequency of the second frequency band is 2.35 GHz, three system clocks are generated: a 184.32 MHz system clock, a 368.64 MHz system clock, and a 2949.12 MHz system clock. The 184.32 MHz system clock and the 368.64 MHz system clock are respectively used for digital intermediate frequency processing of the 20 MHz first frequency band and the 60 MHz second frequency band, and the 2949.12 MHz system clock is used for analog-to-digital conversion of the two frequency bands.

S22: Receive an analog signal. The analog signal is received by using an antenna and a circulator, so as to perform subsequent processing.

S23: Process the received analog signal according to the system clock and the control signal, to generate a digital intermediate frequency signal.

After analog processing such as filtering and amplification is performed on the received analog signal, analog filtering is performed according to the system clock and the control signal, the analog signal is converted into a digital signal at a specific digital-to-analog conversion sampling rate, then spectrum shifting to a zero frequency is performed, and the digital signal is down-converted into the digital intermediate frequency signal. If the frequency band information of the input signal includes frequency band information of at least two frequency bands, digital signals on different carriers are shifted to the zero frequency, and then are down-converted into digital intermediate frequency signals of corresponding frequency bands. For example, for the input signal, if a bandwidth of a first frequency band is 20 MHz, a center frequency of the first frequency band is 1.9 GHz, a bandwidth of a second frequency band is 60 MHz, and a center frequency of the second frequency band is 2.35 GHz, after the received analog signal is converted into a digital signal by means of digital-to-analog conversion, there is a signal of a corresponding frequency band on each of a 1.9 GHz carrier and a 2.35 GHz carrier, and during spectrum shifting, the digital signals that are obtained by means of sampling and that are on the two carriers are separately shifted to the zero frequency, and are down-converted, to separately obtain a digital intermediate frequency signal whose bandwidth is 20 MHz and a digital intermediate frequency signal whose bandwidth is 60 MHz.

S24: Process the digital intermediate frequency signal according to the system clock and the control signal, to generate a baseband signal.

In S24, if the frequency band information of the input signal includes frequency band information of at least two frequency bands, down-conversion processing needs to be performed on at least two digital intermediate frequency signals, to generate baseband signals of corresponding frequency bands.

If the digital intermediate frequency signal is a multicarrier signal, signal splitting needs to be performed on the digital intermediate frequency signal before down-conversion processing, that is, spectrum shifting is performed on the digital intermediate frequency signal, and then filtering is performed, to obtain multiple single-carrier signals, and bandwidths of the signals are the same as a bandwidth of the baseband signal. In this way, reconfiguration of the receiver is completed. It can be seen that, according to the present application, a system clock and a digital intermediate frequency processing rate can be flexibly configured according to carriers, bandwidths, and the like of different frequency band signals, so that each frequency band signal is processed at a lowest possible digital intermediate frequency processing rate, which can effectively reduce a digital intermediate frequency processing rate, reduce a system delay, and save resources while ensuring processing performance.

In conclusion, according to the present application, a system adaptive control circuit generates a control signal according to frequency band information of an input signal, where the control signal includes configuration information required for reconfiguring a transmitter, and a system clock circuit generates a system clock according to the control signal. Therefore, a system clock and a digital intermediate frequency processing rate can be flexibly configured according to carriers, bandwidths, and the like of different frequency band signals. A preprocessing circuit preprocesses a received baseband signal according to the system clock and the control signal, to generate a frequency band signal; a digital intermediate frequency processing circuit processes, according to the system clock and the control signal, the frequency band signal generated by the preprocessing circuit, to generate a digital intermediate frequency signal; a digital-to-analog conversion circuit processes, according to the system clock and the control signal, the digital intermediate frequency signal generated by the digital intermediate frequency processing circuit, to generate an analog signal; and an analog transmitting circuit transmits the analog signal generated by the digital-to-analog conversion circuit. In this way, each frequency band signal is processed at a lowest possible digital intermediate frequency processing rate, which can effectively reduce a digital intermediate frequency processing rate, reduce a system delay, and save resources while ensuring processing performance.

The foregoing descriptions are merely embodiments of the present invention, and are not intended to limit the patent scope of the present application. All equivalent structures or equivalent procedure variations that are derived from this specification and content of the accompanying drawings of the present application or that are directly or indirectly applied to other related technical fields are included in the patent protection scope of the present application.

What is claimed is:

1. A reconfigurable transmitter, wherein the transmitter comprises:
    a system adaptive control circuit, configured to generate a control signal according to frequency band information of an input signal, wherein the control signal comprises configuration information required for reconfiguring the transmitter; wherein the configuration information required for reconfiguring the transmitter comprises at least one of: a system clock; a digital intermediate frequency processing rate; a digital-to-analog conversion sampling rate; and an analog-to-digital conversion sampling rate;
    a system clock circuit, configured to generate a system clock according to the control signal generated by the system adaptive control circuit;
    a preprocessing circuit, configured to preprocess a received baseband signal according to the system clock and the control signal, to generate a frequency band signal;
    a digital intermediate frequency processing circuit, configured to process, according to the system clock and the control signal, the frequency band signal generated by the preprocessing circuit, to generate a digital intermediate frequency signal;
    a digital-to-analog conversion circuit, configured to process, according to the system clock and the control signal, the digital intermediate frequency signal generated by the digital intermediate frequency processing circuit, to generate an analog signal;
    an analog transmitting circuit, configured to transmit the analog signal generated by the digital-to-analog conversion circuit;
    wherein the transmitter further comprises a feedback analog-to-digital conversion circuit, configured to process a fed-back analog signal according to the system clock and the control signal, to generate a digital intermediate frequency signal; and
    wherein the digital intermediate frequency processing circuit comprises a digital predistortion coefficient training circuit, configured to: perform, according to the system clock and the control signal, digital predistortion coefficient training on the digital intermediate frequency signal generated by the feedback analog-to-digital conversion circuit, to generate a digital predistortion coefficient.

2. The transmitter according to claim 1, wherein the digital intermediate frequency processing circuit further comprises a digital predistortion circuit, configured to:
    perform, according to the system clock, the control signal, and the digital predistortion coefficient, digital predistortion processing on the frequency band signal generated by the preprocessing circuit, to generate a digital intermediate frequency signal.

3. The transmitter according to claim 1, wherein when the frequency band information of the input signal comprises frequency band information of at least two frequency bands, the system adaptive control circuit separately generates configuration information according to the frequency band information of each of the at least two frequency bands.

4. The transmitter according to claim 3, wherein when the system adaptive control circuit separately generates different configuration information according to the frequency band information of each of the at least two frequency bands, the preprocessing circuit is further configured to:
    generate, according to a system clock corresponding to any baseband signal of at least two baseband signals and according to a control signal corresponding to the any baseband signal of the at least two baseband signals, a frequency band signal corresponding to the any baseband signal of the at least two baseband signals.

5. A method for reconfiguring a transmitter, wherein the method comprises:
generating a control signal according to frequency band information of an input signal, wherein the control signal comprises configuration information required for reconfiguring the transmitter; wherein the configuration information required for reconfiguring the transmitter comprises at least one of: a system clock; a digital intermediate frequency processing rate; a digital-to-analog conversion sampling rate; and an analog-to-digital conversion sampling rate;
generating a system clock according to the control signal;
preprocessing a received baseband signal according to the system clock and the control signal, to generate a frequency band signal;
processing, according to the system clock and the control signal, the preprocessed frequency band signal, to generate a digital intermediate frequency signal;
processing the digital intermediate frequency signal according to the system clock and the control signal, to generate an analog signal;
transmitting the analog signal;
wherein the method further comprises: processing a fed-back analog signal according to the system clock and the control signal, to generate a digital intermediate frequency signal; and
wherein the method further comprises: performing digital predistortion coefficient training on the digital intermediate frequency signal, generated by processing the fed-back analog signal, according to the system clock and the control signal, to generate a digital predistortion coefficient.

6. The method according to claim 5, wherein the step of processing the frequency band signal according to the system clock and the control signal, to generate a digital intermediate frequency signal comprises: performing digital predistortion processing on the frequency band signal, generated by preprocessing the received baseband signal, according to the system clock, the control signal, and the digital predistortion coefficient, to generate a digital intermediate frequency signal.

7. The method according to claim 5, wherein if the frequency band information of the input signal comprises frequency band information of at least two frequency bands, the step of generating a control signal according to frequency band information of an input signal comprises: separately generating configuration information according to the frequency band information of the at least two frequency bands.

8. The method according to claim 7, wherein when different configuration information is separately generated according to the frequency band information of each of the at least two frequency bands, the step of preprocessing a received baseband signal according to the system clock and the control signal, to generate a frequency band signal comprises: generating, according to a system clock corresponding to any baseband signal of the at least two baseband signals and according to a control signal corresponding to the any baseband signal of the at least two baseband signals, a frequency band signal corresponding to the any baseband signal.

* * * * *